(12) United States Patent
Saito et al.

(10) Patent No.: US 6,868,300 B2
(45) Date of Patent: Mar. 15, 2005

(54) ASSEMBLY DEVICE FOR STACKED RING

(75) Inventors: Koji Saito, Sayama (JP); Yoshihiko Suzuki, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/380,217

(22) PCT Filed: Aug. 15, 2001

(86) PCT No.: PCT/JP01/07028
§ 371 (c)(1),
(2), (4) Date: Mar. 12, 2003

(87) PCT Pub. No.: WO02/22305
PCT Pub. Date: Mar. 21, 2002

(65) Prior Publication Data
US 2004/0007311 A1 Jan. 15, 2004

(30) Foreign Application Priority Data
Sep. 12, 2000 (JP) .......... 2000-276324
Sep. 12, 2000 (JP) .......... 2000-276325

(51) Int. Cl.[7] .................................. B23P 21/00
(52) U.S. Cl. ............. 700/117; 700/28; 700/97; 29/428
(58) Field of Search .............. 700/28, 95–97, 700/103, 117, 119; 703/1; 29/33 R, 428, 592, 709, 738, 703

(56) References Cited
U.S. PATENT DOCUMENTS
4,533,342 A * 8/1985 Miranti et al. .......... 474/201
6,578,249 B2 * 6/2003 Fujioka .......... 29/434
6,684,473 B1 * 2/2004 Yamagishi et al. .......... 29/407.01
6,732,423 B2 * 5/2004 Saito et al. .......... 29/709

FOREIGN PATENT DOCUMENTS
| JP | 56-52139 A | 5/1981 |
|---|---|---|
| JP | 61-203232 A | 9/1986 |
| JP | 61-203233 A | 9/1986 |
| JP | 1-321132 A | 12/1989 |
| JP | 7-185960 A | 7/1995 |
| JP | 9-314431 A | 12/1997 |

* cited by examiner

Primary Examiner—Leo Picard
Assistant Examiner—Sean Shechtman
(74) Attorney, Agent, or Firm—Birch, Stewart, Kolasch & Birch, LLP

(57) ABSTRACT

Component data including data of the circumferential length values of ring components 4 stored by a component storage facility 10 are managed by a component data managing unit 15. A processing unit 16 performs combinatorial trial calculations on the component data under a plurality of kinds of combinatorial conditions, generating lamination combinatorial data of component data of all layers of a laminated ring. A combinatorial condition which maximizes the number of generated lamination combinatorial data is used as an adequate combinatorial condition. A set of ring components that make up a laminated ring to be actually assembly is selected and unloaded based on lamination combinatorial data generated under the adequate combinatorial condition, and assembled into a laminated ring. With this arrangement, an increased number of laminated rings can efficiently be produced, and the mass-productivity of laminated rings can be increased.

19 Claims, 23 Drawing Sheets

ASSEMBLY DEVICE FOR STACKED RING

This application is the national phase under 35 U.S.C. §371 of PCT International Application No. PCT/JP01/07028 which has an international filing date of Aug. 15, 2001, which designated the United States of America.

TECHNICAL FIELD

The present invention relates to an apparatus for assembling a laminated ring comprising a plurality of endless ring components, such as a belt for use in a continuously variable transmission (CVT) or the like.

BACKGROUND ART

Belts for use in continuously variable transmissions (CVTs) such as automobile transmissions, for example, comprise a pair of laminated rings each made up of a plurality of endless ring components of metal that are assembled in a laminated form in their transverse direction. Such a laminated ring is manufactured as follows:

Ring components that serve as respective layers of a laminated ring are produced and stored by a component storage facility. The ring component serving as each layer is basically manufactured such that its circumferential length and radius are of design values (which differ from layer to layer). Generally, however, the actual circumferential lengths and radii of the manufactured ring components suffer errors introduced in the manufacturing process. Therefore, the circumferential lengths and radii of the ring components are not always in exact agreement with design values, but tend to vary from design values to a certain extent. Size data representing the circumferential lengths, radii, etc. of the manufactured ring components are separately measured, and the measured data are stored by association with the individual ring components.

Then, ring components to be used for assembling a laminated ring are selected from the manufactured and stored ring components for use as respective layers, and combined into a laminated ring. Such an assembling process is repeated as many times as the number of required laminated rings.

Since the sizes of the ring components as respective layers suffer variations, when ring components of respective layers are arbitrarily or randomly selected and combined, they may not necessarily make a desired laminated ring. Specifically, a laminated ring for use as a belt in a CVT or the like is required to meet predetermined standard requirements such that the difference between the circumferential lengths or radii of adjacent ring components thereof fall in a certain allowable range. To meet such standard requirements, there are predetermined combinatorial conditions to be satisfied for selecting and combining ring components of respective layers.

The combinatorial conditions include a condition for determining which ring component of which layer is to be selected at first to obtain an individual laminated ring and a condition for determining which ring component of a layer adjacent to a selected ring component of a certain layer is to be selected. Those conditions are predetermined on the basis of the sizes, etc. of ring components. For example, the former condition is determined to select a ring component whose measured data are closest to the design values from those ring components belonging to the radially innermost layer of the laminated ring. For example, the latter condition is determined to select one of two ring components belonging to two adjacent layers, the difference between whose circumferential lengths fall in a predetermined range and is closest to the central value of the predetermined range.

Heretofore, it has been customary for the worker to select and combine ring components of respective layers for a laminated ring by seeing a log of the measured data. Therefore, the conventional process of selecting and combining ring components of respective layers has been tedious and time-consuming.

For increased mass-productivity of laminated rings, it is desirable to obtain as many laminated rings as possible from ring components of respective layers that have been manufactured and stored. However, since combinatorial conditions for combining ring components of respective layers have heretofore been fixedly determined, it has frequently been impossible to obtain as many laminated rings as possible from available ring components of respective layers, tending to leave many ring components unselected and uncombined for use in laminated rings.

DISCLOSURE OF THE INVENTION

It is therefore an object of the present invention to provide an apparatus for efficiently assembling as many laminated rings as possible.

To achieve the above object, there is provided in accordance with the present invention an apparatus for assembling a laminated ring of a plurality of laminated endless ring components, comprising component data managing means for storing component data including size data representative of at least respective circumferential length values of a plurality of ring components prepared for each of layers of the laminated ring, combinatorial trial calculation means for variably setting a plurality of kinds of combinatorial conditions to assemble the ring components for all the layers of the laminated ring, and performing combinatorial trial calculations to combine the component data of the layers stored by the component data managing means based on each of the plurality of kinds of combinatorial conditions to generate lamination combinatorial data representing combined component data of all the layers matching the combinatorial conditions, combinatorial condition determining means for evaluating the number of the lamination combinatorial data obtained by the combinatorial trial calculations under the plurality of kinds of combinatorial conditions and determining a combinatorial condition which maximizes the number as an adequate combinatorial condition, and ring component selecting means for selecting ring components of the respective layers to assemble the laminated ring from the lamination combinatorial data under the adequate combinatorial condition, whereby the laminated ring can be assembled of the ring components selected by the ring component selecting means.

The combinatorial trial calculation means sets a plurality of kinds of combinatorial conditions, and performs combinatorial trial calculations on the component data held by the component data managing means, i.e., the component data of ring components of respective layers that have been prepared, generating lamination combinatorial data. The combinatorial condition determining means determines a combinatorial condition which maximizes the number of generated lamination combinatorial data as an adequate combinatorial condition. There is thus found an adequate combinatorial condition for maximizing the number of laminated rings that can be assembled from the ring components prepared in advance.

The ring component selecting means selects ring components to actually assemble the laminated ring from the lamination combinatorial data generated when combinatorial trial calculations are performed under the adequate combinatorial condition. The laminated ring can be assembled of the ring components selected by the ring component selecting means. The adequate combinatorial condition is a combinatorial condition for obtaining an increased number of lamination combinatorial data. Insofar as the number of component data is equal to or smaller than the number of lamination combinatorial data, even if the number of laminated rings required to be assembled is large, a set of ring components of all layers of a laminated ring can be obtained from the prepared ring components.

According to the present invention, therefore, as many laminated rings as possible can be assembled from the prepared ring components, resulting in an increased mass-productivity of laminated rings.

The combinatorial trial calculation means comprises means for performing the combinatorial trial calculations under each of the combinatorial conditions of each of the kinds by performing a particular layer data selecting process of successively selecting a plurality of component data of a predetermined particular layer, one by one, based on the combinatorial conditions, an interlayer selecting process of selecting, sequentially from a layer adjacent to the particular layer, component data of other layers to be combined with the selected component data of the particular layer based on the combinatorial conditions each time the component data of the particular layer are selected, and a process of excluding the component data of the layers of the lamination combinatorial data from component data that can be selected in following cycles of the interlayer selecting process when the lamination combinatorial data are generated by the interlayer selecting process. The combinatorial conditions of each of the kinds include a trial calculation starting point selecting condition that prescribes a sequence in which to select component data of the particular layer in the particular layer data selecting process, and an interlayer selecting condition that prescribes which component data of a layer adjacent to a layer whose component data have been selected by the interlayer selecting process is to be selected. The combinatorial trial calculation means variably sets at least one of the trial calculation starting point selecting condition and the interlayer selecting condition to set the plurality of kinds of combinatorial conditions.

The combinatorial conditions of each of the kinds include a trial calculation starting point selecting condition relative to the particular layer data selecting process and an interlayer selecting condition relative to the interlayer selecting process. One or both of the trial calculation starting point selecting condition and the interlayer selecting condition are variably set to set combinatorial conditions of the kinds. The combinatorial conditions of the kinds can thus easily be set variably. By varying the trial calculation starting point selecting condition or the interlayer selecting condition, the difference between the combinatorial conditions can easily be reflected in the number of generated lamination combinatorial data, making it easy to find an adequate combinatorial condition to maximize the number of generated lamination combinatorial data.

The particular layer may be any layer of the laminated ring. For ease of the construction of an algorithm for combinatorial trial calculations, the particular layer should preferably be an innermost or outermost layer of the laminated ring.

The interlayer selecting condition preferably includes a condition that prescribes the difference between circumferential length values of ring components of at least two layers which are adjacent to each other. Specifically, since the difference between the circumferential length values of ring components of at least two adjacent layers greatly affects the overall size of the laminated ring, including the inside diameter, the outside diameter, the thickness, etc., of the laminated ring that is finally assembled, the interlayer selecting condition should preferably include a condition prescribing the difference between the circumferential length values.

The condition prescribing the difference between the circumferential length values of the adjacent ring components may be a condition prescribing the difference between the circumferential length values itself, or may be a condition prescribing the difference between the radii or diameters of the adjacent ring components because the circumferential length values of the ring components have one-to-one correspondence to the radii or diameters thereof.

The trial calculation starting point selecting condition is preferably determined based on size data representing the circumferential length values of the component data of the particular layer (e.g., the component data of the particular layer are selected sequentially from the component data of the particular layer having size data closer to a predetermined value). If the component data include data indicative of production dates, lot numbers, etc. of the ring components, then the trial calculation starting point selecting condition may be determined in view of those data.

Preferably, the combinatorial trial calculation means variably sets the trial calculation starting point selecting condition depending on a frequency distribution of the size data (specifically, the data of the circumferential length values) of the component data of the particular layer held by the component data managing means. This makes it easy to find a trial calculation starting point selecting condition capable of generating more lamination combinatorial data.

More specifically, if the trial calculation starting point selecting condition comprises a condition for selecting component data of the particular layer in a sequence from component data whose size data are closer to a predetermined value, then the combinatorial trial calculation means sets a plurality of variable parameters each comprising the predetermined value prescribing a kind of the trial calculation starting point selecting condition, such that the number of the variable parameters which differ from each other is greater closer to size data whose frequency in the frequency distribution is large than to size data whose frequency in the frequency distribution is small.

If the trial calculation starting point selecting condition is thus determined and the variable parameters prescribing a kind of the trial calculation starting point selecting condition are made variable to variably set the trial calculation starting point selecting condition, then even when many kinds of variable parameters are set in a range of size data to make the frequency relatively low, selecting sequences of the component data of the particular layer under trial calculation starting point selecting conditions determined by the kinds of the variable parameters are highly likely to be the same as each other. Thus, the lamination combinatorial data obtained under the kinds of the trial calculation starting point selecting conditions are highly likely to be the same as each other.

Conversely, if many kinds of variable parameters are set in a range of size data to make the frequency relatively high, then selecting sequences of the component data of the particular layer under trial calculation starting point selecting conditions determined by the kinds of the variable parameters are highly likely to be different from each other. Thus, it is highly likely to obtain different lamination combinatorial data under the kinds of the trial calculation starting point selecting conditions.

Consequently, predetermined values are set as a plurality of variable parameters to obtain more different predetermined values closer to size data whose frequency is higher than to size data whose frequency is lower. In this manner, relatively many trial calculation starting point selecting conditions to preferentially select component data which make the frequency of size data higher are set, and conversely, relatively few trial calculation starting point selecting conditions to preferentially select component data which make the frequency of size data lower are set. As a result, the number of set kinds of trial calculation starting point selecting conditions can be limited to a necessary value, and the time required for combinatorial trial calculations under all the trial calculation starting point selecting conditions can be shortened to allow the combinatorial trial calculations to be performed efficiently.

The combinatorial trial calculation means comprises means for variably setting the trial calculation starting point selecting condition and the interlayer selecting condition to set a plurality of kinds of combinatorial conditions which include sets of the trial calculation starting point selecting condition and the interlayer selecting condition that differ from each other, and means for repeating the combinatorial trail calculations under combinatorial conditions which comprise one kind of one of the trial calculation starting point selecting condition and the interlayer selecting condition and a plurality of kinds of the other of the trial calculation starting point selecting condition and the interlayer selecting condition, while changing the kind of the one of the selecting conditions. The kind of one of the trial calculation starting point selecting condition and the interlayer selecting condition is variably set, and each time it is set, the kind of one of the selecting conditions is fixed, and the kind of the other selecting condition is variably set to a plurality of kinds to perform combinatorial trial calculations under the combinatorial conditions.

According to the present invention, when carrying out the combinatorial trail calculations while changing the kind of the one of the selecting conditions, the combinatorial trial calculation means determines a kind of the other of the selecting conditions after the kind of the one of the selecting conditions is changed, based on data of the number of the lamination combinatorial data obtained by the combinatorial trial calculations under the combinatorial conditions which comprise one kind of one of the selecting conditions before it is changed and the plurality of kinds of the other of the selecting conditions.

Each time the kind of one of the selecting conditions is changed, the kind of the other selecting condition can be set so as to reflect the result of the combinatorial trial calculation (data of the number of lamination combinatorial data) corresponding to the kind of one of the selecting conditions before it is changed. Therefore, the selecting conditions of the other kind suitable for the kinds of one of the selecting conditions can flexibly be set. As a consequence, it is easy to set combinatorial conditions to increase the number of lamination combinatorial data. Furthermore, combinatorial trial calculations with unnecessary combinatorial conditions being set are prevented from being performed, and hence can be performed efficiently.

Specifically, the trial calculation starting point selecting condition is a condition for selecting the component data of the particular layer in a sequence from the size data of the component data of the particular layer which are closer to a predetermined value, and the interlayer selecting condition is a condition for selecting component data of one layer selected in the interlayer selecting process, whose size data differs from the size data of the component data of a layer adjacent to the one layer by a value which falls within a predetermined standard range and is closer to a predetermined value, from the component data of the adjacent layer. The combinatorial trial calculation means sets the predetermined value relative to the trial calculation starting point selecting condition and the predetermined value relative to the interlayer selecting condition as variable parameters prescribing types of the respective selecting conditions, and variably sets the variable parameter relative to the other selecting condition after the kind of said one selecting condition is changed within a predetermined range having, at its center, the value of the variable parameter relative to the other selecting condition corresponding to a combinatorial condition which maximizes the number of the lamination combinatorial data obtained by the combinatorial trial calculations before the kind of the one selecting condition is changed.

The variable parameter relative to the other selecting condition after the kind of one of the selecting conditions is changed is limited to a value in a range where it is highly likely for the number of lamination combinatorial data generated by the combinatorial trial calculations to be large. Therefore, combinatorial conditions for increasing the number of lamination combinatorial data can be set efficiently while dispensing with unnecessary combinatorial trial calculations.

Each time the kind of one of the selecting conditions is changed, when the kind of the other selecting condition is determined based on the data of the number of lamination combinatorial data in combinatorial trial calculations before the kind of one of the selecting conditions is changed, the combinatorial trial calculation means may set the kind of one of the selecting conditions (e.g., the trial calculation starting point selecting condition) depending on the frequency distribution of the particular layer as described above.

The combinatorial trial calculation means may set the kind of the one selecting condition depending on resultant data of the number of the lamination combinatorial data obtained when the combinatorial trial calculations have been carried out in the past under the plurality of kinds of combinatorial conditions.

Specifically, if the trial calculation starting point selecting condition is a condition for selecting the component data of the particular layer in a sequence from the size data of the component data of the particular layer which are closer to a predetermined value, then the combinatorial trial calculation means sets the predetermined value as a variable parameter prescribing a kind of the trial calculation starting point selecting condition, and variably sets the variable parameter within a predetermined range having, at its center, a value corresponding to the kind of the trial calculation starting point selecting condition which maximizes the number of the lamination combinatorial data in the resultant data.

It is thus possible to set the kind of one of the selecting conditions which is considered to obtain more lamination combinatorial data. As a result, the opportunity of combinatorial trial calculations corresponding to unnecessary kinds of one of the selecting conditions is reduced, allowing combinatorial trial calculations to be carried out efficiently.

For setting the kind of the other selecting condition corresponding to each of the kinds of one of the selecting conditions, the kind of the other selecting condition may be set in view of not only the results of combinatorial trial calculations corresponding to the kind, before being changed, of one of the selecting conditions, but also the resultant data.

Alternatively, according to the present invention, the combinatorial trail calculation means may set the kind of the combinatorial conditions (e.g., one or both of the trial calculation starting point selecting condition and the interlayer selecting condition) depending on the resultant data of the number of the lamination combinatorial data obtained when the combinatorial trial calculations have been performed in the past under a plurality of kinds of combinatorial conditions.

It is thus possible to set kinds of combinatorial conditions that are considered to obtain more lamination combinatorial data from the resultant data, and hence combinatorial trial calculations can be performed efficiently.

Specifically, the trial calculation starting point selecting condition is a condition for selecting the component data of the particular layer in a sequence from the size data of the component data of the particular layer which are closer to a predetermined value, and the interlayer selecting condition is a condition for selecting component data of one layer selected in the interlayer selecting process, whose size data differs from the size data of the component data of a layer adjacent to the one layer by a value which falls within a predetermined standard range and is closer to a predetermined value, from the component data of the adjacent layer. The combinatorial trial calculation means sets the predetermined value relative to the trial calculation starting point selecting condition and the predetermined value relative to the interlayer selecting condition as variable parameters prescribing types of the respective selecting conditions, and variably sets the variable parameters in predetermined ranges having, at their centers, values corresponding to the respective kinds of the trial calculation starting point selecting condition and the interlayer selecting condition which maximize the number of the lamination combinatorial data in resultant data of the number of the lamination combinatorial data obtained when the combinatorial trial calculations have been carried out in the past under the plurality of kinds of combinatorial conditions.

Since both the variable parameters prescribing the kinds of the trial calculation starting point selecting condition and the interlayer selecting condition are variably set to values capable of easily obtaining many lamination combinatorial data based on the resultant data, the process of combinatorial trial calculations for finding a combinatorial condition to generate many lamination combinatorial data can effectively and efficiently be carried out.

According to the present invention, when component data of a layer adjacent to a layer selected in the interlayer selecting process do not match the interlayer selecting condition, the combinatorial trial calculation means preferably regards component data of the one layer as component data not to be selected, and resumes the interlayer selecting process from a layer preceding the one layer.

In the process of generating one lamination combinatorial data (after component data of one layer are selected, when component data of a next layer are selected), if it is determined that any component data matching the interlayer selecting condition is not present, the layer is traced back to select component data again. Thus, it is possible to generate as many lamination combinatorial data as possible while using the process that has been performed so far. By excluding the component data which do not include component data of the next layer that matches the interlayer selecting condition from those component data that can be selected, an unnecessary trial calculation process which would subsequently select the component data again is avoided, thus increasing the efficiency of combinatorial trial calculations under individual combinatorial conditions.

When the combinatorial trial calculation means resumes the interlayer selecting process from the preceding layer, it may resume the interlayer selecting process while holding the interlayer selecting condition constant. However, the combinatorial trial calculation means may change the interlayer selecting condition for selecting one component data of the layer adjacent to the preceding layer temporarily to a predetermined condition, and select one component data of the layer adjacent to the preceding layer based on the changed interlayer selecting condition.

According to this alternative, it is possible to increase the opportunity to be able to generate lamination combinatorial data by temporarily changing the interlayer selecting condition.

According to the present invention, if the laminated ring is used as a pair of laminated rings with the component data of ring components of at least the particular layer satisfying a predetermined requirement, then combinatorial trial calculation means preferably has means for confirming component data which satisfy the predetermined requirement with respect to the component data of the particular layer before the combinatorial trial calculations are performed, the combinatorial trial calculation means performs combinatorial trial calculations on only other component data which satisfy the predetermined requirement of the component data of the particular layer, and, when the lamination combinatorial data are obtained by the combinatorial trial calculations, then performs the combinatorial trial calculations on the component data which satisfy the predetermined requirement with respect to the component data of the particular layer included in the lamination combinatorial data.

Specifically, if two laminated rings are used in a pair (e.g., as laminated rings for use in a belt for a continuously variable transmission (CVT)), then the two laminated rings are generally required to satisfy a certain requirement (e.g., a requirement that the difference between the circumferential length values of ring components of innermost or outermost layers of the laminated ring fall within a certain range). If combinatorial trial calculations are carried out without taking such a requirement into account to find an adequate combinatorial condition which maximizes lamination combinatorial data, and ring components are assembled into a laminated ring based on the adequate combinatorial condition, laminated rings that can be used as a pair may not be obtained. According to the present invention, the combinatorial trial calculations are performed on only those of the component data of the particular layer which have been confirmed in advance to include other component data satisfying the predetermined requirement. When the lamination combinatorial data are obtained by the combinatorial trial calculations, the combinatorial trial calculations are performed on the component data of the particular data included in the lamination combinatorial data and the component data satisfying the predetermined requirement.

A pair of lamination combinatorial data corresponding to two laminated rings in a pair can thus be selected as a set, avoiding the above difficulties. Stated otherwise, many sets of two laminated rings that can be used reliably as pairs can be assembled.

According to the present invention, the apparatus further comprises pre-processing means for recognizing, in advance, component data of the component data held by the component data managing means, which cannot be an element of the lamination combinatorial data under the combinatorial conditions, before the combinatorial trial calculations start being performed by the combinatorial trial calculation means, and the combinatorial trial calculation means preferably performs the combinatorial trial calculations while excluding the component data recognized not as an element of the lamination combinatorial data by the pre-processing means from component data which can be combined.

With the above arrangement, component data which cannot be an element of the lamination combinatorial data are recognized in advance, and excluded from those component data that can be combined in combinatorial trial calculations performed by the combinatorial trial calculation means. Therefore, the combinatorial trial calculation means is prevented from performing unnecessary trial calculations. As a result, the time required for a combinatorial trial calculation can be shortened to allow the combinatorial trial calculation to be performed efficiently.

If the combinatorial conditions include the trial calculation starting point selecting condition and the interlayer selecting condition, then the apparatus further comprises pre-processing means for counting the number of component data which can be selected based on the interlayer selecting condition, of the component data of a layer adjacent to each layer except a layer to be selected finally in the interlayer selecting process, of the component data held by the component data managing means. The combinatorial trial calculation means performs the combinatorial trial calculations while excluding the component data whose combinable number counted by the pre-processing means is zero from component data which can be combined.

Depending on whether the combinable number is zero or not, it is possible to easily recognize component data that cannot be an element of the lamination combinatorial data.

According to the present invention, in the case where the combinable number is counted, when there are a plurality of component data matching the interlayer selecting condition of the component data adjacent to one layer selected in the interlayer selecting process, the combinatorial trial calculation means selects component data whose combinable number counted by the pre-processing means is largest as an element of the lamination combinatorial data from the plurality of component data matching the interlayer selecting condition.

Since many component data of the adjacent layer that can be combined according to the interlayer selecting condition can preferentially be selected by the combinatorial trial calculations, it is possible to generate many lamination combinatorial data that match the combinatorial conditions. That is, it is possible to assemble many laminated rings that match the combinatorial conditions from ring components that are prepared in advance.

Alternatively, when there are a plurality of component data matching the interlayer selecting condition of the component data adjacent to one layer selected in the interlayer selecting process, the combinatorial trial calculation means select component data whose combinable number counted by the pre-processing means is smallest as an element of the lamination combinatorial data from the plurality of component data matching the interlayer selecting condition.

Since few component data of the adjacent layer that can be combined according to the interlayer selecting condition, i.e., component data that are less liable to make up lamination combinatorial data, can preferentially be selected, it is possible to prevent ring components corresponding to such component data from remaining unused without becoming an element of the laminated ring. As a result, ring components that tend to generate lamination combinatorial data are left, easily allowing laminated rings to be mass-produced continuously.

According to the present invention, the ring component selecting means selects a predetermined required number of lamination combinatorial data from the lamination combinatorial data corresponding to the adequate combinatorial condition according to a predetermined priority sequence requirement for selecting lamination combinatorial data corresponding to the laminated ring to be actually assembled, and selects ring components of respective layers corresponding to component data included in the selected lamination combinatorial data as ring components to actually assemble the laminated ring.

If the number of laminated rings required to be assembled (the required number) may be smaller than the number of lamination combinatorial data obtained under the adequate combinatorial condition, then as many lamination combinatorial data as required can be selected according to a desired priority sequence requirement, and a laminated ring can be assembled based on the selected lamination combinatorial data.

The priority sequence requirement may be considered as a requirement as to a variation of the differences between the circumferential length values of adjacent ring components of an individual laminated ring (the number of those differences is "1" smaller than the number of layers of the individual laminated ring), a requirement relative to the differences between the circumferential length values (or the sum of the differences between radii or diameters of adjacent ring components), or a requirement relative to the production dates, log numbers, etc. of ring components that make up each laminated ring. Those lamination combinatorial data with a smaller variation of the differences between the circumferential length values may be selected with priority, those lamination combinatorial data whose sum of differences between the circumferential length values is closer to a predetermined value may be selected with priority, those lamination combinatorial data which include ring components with the oldest production date may be selected with priority, or those lamination combinatorial data which include ring components with a certain lot number may be selected with priority.

The above and other objects, features, and advantages of the present invention will become apparent from the following description when taken in conjunction with the accompanying drawings which illustrate a preferred embodiment of the present invention by way of example.

BEST MODE FOR CARRYING OUT THE INVENTION

Figure 1:
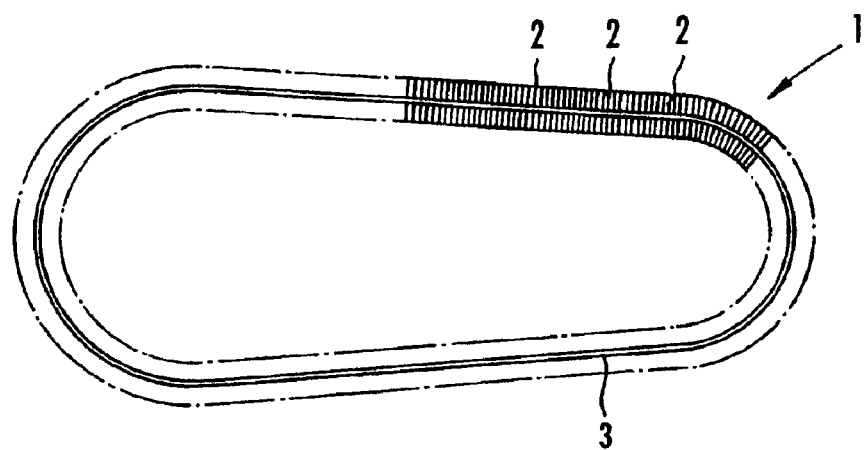
FIGS. 1(a) and 1(b) are views showing a belt for use in a continuously variable transmission, which includes a laminated ring assembled by an apparatus according to the present invention.
Figure 1:
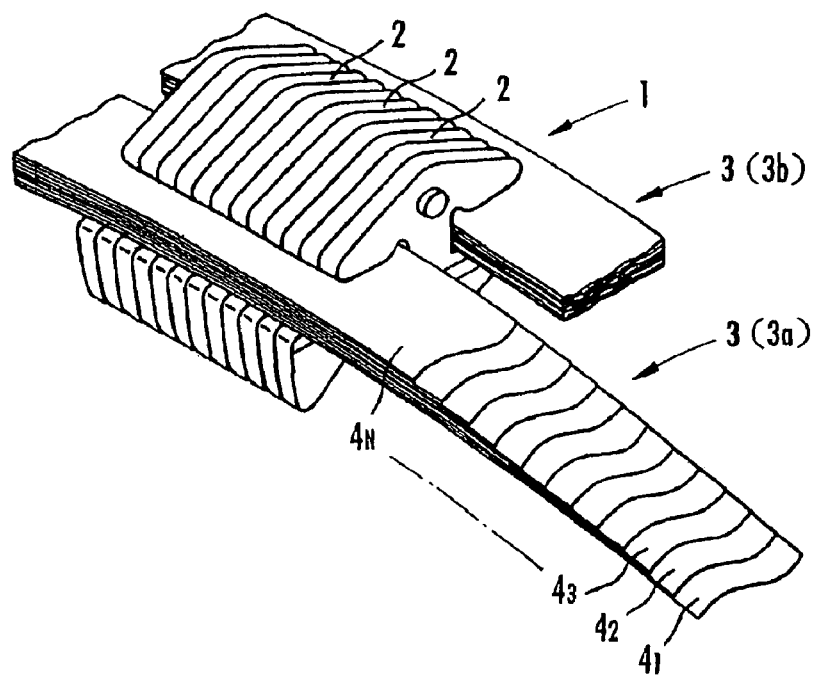

A first embodiment of the present invention will be described below with reference to FIGS. 1 through 8.

The structure of a belt for use in a CVT will first be described briefly below with reference to FIGS. 1(a) and 1(b).

FIG. 1(a) is a side elevational view of a belt for use in a CVT, and FIG. 1(b) is a fragmentary perspective view of the belt. As shown in FIGS. 1(a) and 1(b), the belt, generally denoted at 1, comprises a plurality of plate-like elements 2 engaging a pair of laminated rings 3 and arrayed in an annular form along the laminated rings 3. As shown in FIG. 1(b), each of the laminated rings 3 comprises a plurality of (N) thin endless metal ring components $4_1, 4_2, 4_3, \ldots, 4_N$ laminated in their transverse direction.

The ring components $4_1, 4_2, 4_3, \ldots, 4_N$ will hereinafter be referred to collectively as ring components 4 unless they need to be distinguished from each other, and layers of each of the laminated rings 3 will hereinafter be referred to as a first layer, a second layer, ..., an N layer successively from the radially innermost layer. The set of the ring components $4_1$–$4_N$ of the first through Nth layers of each of the laminated rings 3 will hereinafter be referred to as set ring components (4). If the laminated rings 3 of the belt 1 need to be distinguished from each other, then one of the laminated rings 3 will be referred to as a first laminated ring 3a and the other as a second laminated ring 3b (see FIG. 1(b)).

Figure 2:
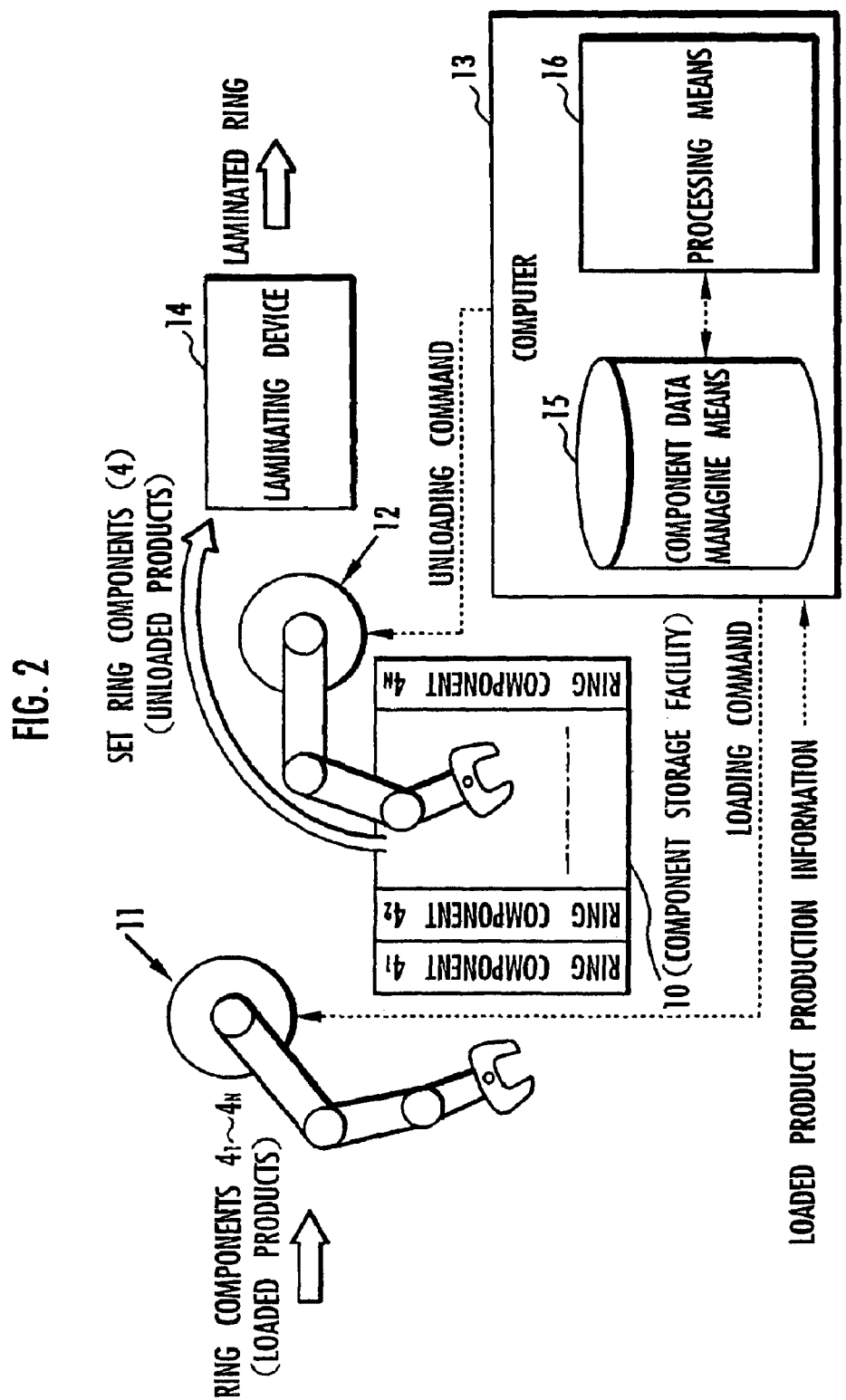
FIG. 2 is a schematic view, partly in block form, of a system arrangement of the apparatus for assembling the laminated ring for the belt shown in FIG. 1.

An apparatus according to the present embodiment serves as an apparatus for assembling the laminated rings 3 of the belt 1. As shown in FIG. 2, the apparatus comprises a component storage facility 10 for classifying and storing ring components $4_1$–$4_N$ of respective layers of laminated rings 3, a loading device 11 for loading ring components $4_1$–$4_N$ of respective layers manufactured in a pre-processing station, not shown, and introduced therefrom into the component storage facility 10, an unloading device 12 for unloading set ring components (4) to assemble each laminated ring 3 from the component storage facility 10, a computer 13 for instructing the loading device 11 and the unloading device 12 to operate, and a laminating device 14 for laminating the ring components $4_1$–$4_N$ unloaded by the unloading device 12 thereby to assemble a laminated ring 3.

Though not shown in detail, the computer 13 includes a basic circuit unit comprising a CPU, a RAM, a ROM, etc., and also includes a recording medium such as a hard disk or the like, input/output devices including a keyboard, a display unit, etc., a communication means (such as a LAN device or the like) for communication with other computers or the like, and software programs for performing various processes. The computer 13 may comprise a single computer or a plurality of personal computers connected together for exchanging data with each other.

The computer 13 has, as its major functional means, a component data managing means 15 for storing and managing component data relative to ring components 4 that are stored by the component storage facility 10, and a processing means 16 for carrying out various processing operations using the component data stored by the component data managing means 15.

The component data stored by the component data managing means 15 are composite data made up of data identifying which layer of a laminated ring 3 each of the ring components 4 in the component storage facility 10 belongs to (hereinafter referred to as layer identifying data), data representing locations where the ring components 4 are stored by the component storage facility 10 (hereinafter referred to as storage address data), measured data of circumferential length values as size data of the ring components 4, data of production dates of the ring components 4, and data of lot numbers of the ring components 4. The size data may comprise radius or diameter data of the ring components 4 rather than the measured data of circumferential length values of the ring components 4, and may include data of thicknesses, widths, etc. of the ring components 4, if necessary.

Of these data stored by the component data managing means 15, the data (indicated as loaded product production information in FIG. 2) except the storage address data are supplied to the computer 13 via the communication means from a computer (not shown) in a production station (not shown) when the ring components 4 are introduced from the production station into the apparatus. The storage address data are determined by the computer 13 while referring to the layer identifying data, etc. of the loaded product production information, when the introduced ring components 4 are loaded into the component storage facility 10 by the loading device 11.

The computer 13 stores data (loaded ring production information) given from the computer of the production station, in combination with the storage address data, into the component data managing means 15. When a ring component 4 is loaded into the component storage facility 10 or set ring components (4) are unloaded from the component storage facility 10, the computer 13 updates the data stored by the component data managing means 15. Specifically, when a new ring component 4 is loaded into the component storage facility 10, the computer 13 stores the component data of the new ring component 4 together with the component data of the ring components 4 already stored by the component storage facility 10, into the component data managing means 15. When set ring components (4) are unloaded from the component storage facility 10, the computer 13 cancels the storage of the component data of the ring components of the 1st through Nth layers of those set ring components (4), and erases those component data from the component data managing means 15.

As described in detail later on, the processing means 16 has functions as a combinatorial trial calculation means, a combinatorial condition determining means, a preprocessing means, and a ring component selecting means.

Operation of the apparatus according to the present embodiment will be described in detail below.

Figure 3:
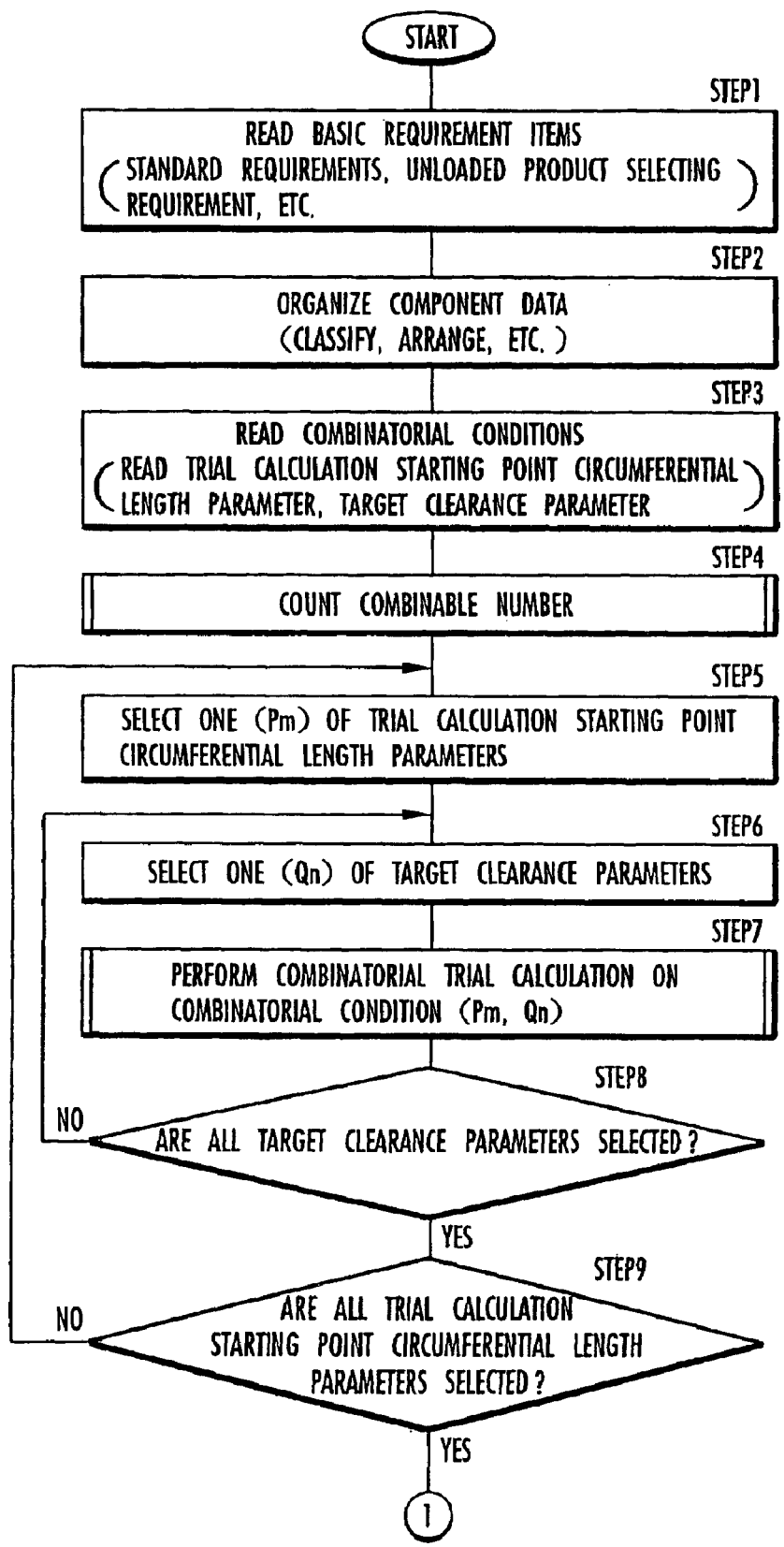
FIGS. 3 and 4 are flowcharts of an operation sequence according to a first embodiment of the present invention.
Figure 4:
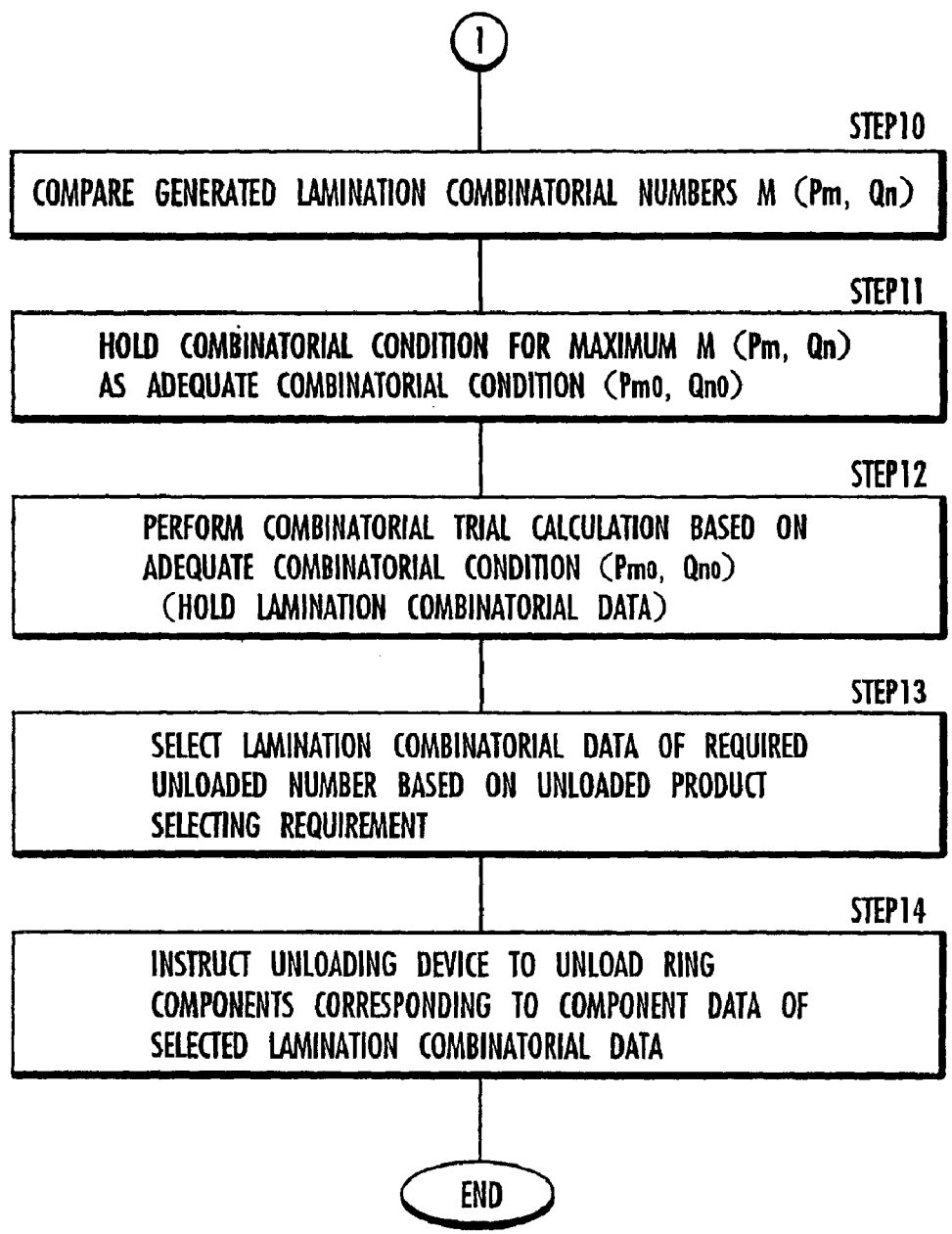

When there is a request to unload set ring components (4), i.e., a request to assemble a laminated ring 3, the computer 13 executes an operation sequence shown in the flowcharts of FIGS. 3 and 4.

The computer 13 reads basic requirement items, which are required for the processing means 16 to perform processes such as a combinatorial trial calculation, etc., as described later on, into the processing means 16 in STEP1. The requirement items represent standard requirements required as a laminated ring 3 for use in a CVT belt 1, a requirement for selecting a ring component 4 to be unloaded (hereinafter referred to as an unloaded product selecting requirement), etc. These requirement items are supplied to the computer 13 in advance, and saved in a hard disk or the like, not shown.

In the present embodiment, the standard requirements required as a laminated ring 3 include a requirement that prescribes the difference between the radii of ring components 4 of two adjacent layers of a laminated ring 3 (hereinafter referred to as an inter-ring clearance $\Delta r$), a requirement that prescribes the sum of inter-ring clearances $\Delta r$ for all layers (hereinafter referred to as a total clearance $\Sigma \Delta r$), and a requirement that prescribes the absolute value of the difference between the circumferential lengths of ring components $4_1$ of the first layers (innermost layers) of a pair of first and second laminated rings $3a$, $3b$ (see FIG. 1) used to make a CVT belt 1 (hereinafter referred to as a first layer circumferential length difference $\Delta L1$).

The requirement that prescribes the inter-ring clearance $\Delta r$ is determined such that the allowable range for the inter-ring clearance $\Delta r$ is $A \pm \alpha [\mu m]$ (where A, $\alpha$ are positive constants), i.e., $A - \alpha \leq \Delta r \leq A + \alpha$. The requirement that prescribes the total clearance $\Sigma \Delta r$ is determined such that the allowable range for the total clearance $\Sigma \Delta r$ is $0 \leq \Sigma \Delta r \leq B$ [$\mu m$] (where B is a positive constant). The requirement that prescribes the first layer circumferential length difference $\Delta L1$ is determined such that the allowable range for the first layer circumferential length difference $\Delta L1$ is $0 \leq \Delta L1 \leq C$ [$\mu m$] (where C is a positive constant).

The inter-ring clearance $\Delta r$ includes N−1 inter-ring clearances which are, specifically, an inter-ring clearance between first and second layers, an inter-ring clearance between second and third layers, . . . , and an inter-ring clearance between (N−1)th and Nth layers. In the present embodiment, the requirement ($A - \alpha \leq \Delta r \leq A + \alpha$) which prescribes the inter-ring clearance $\Delta r$ between any adjacent layers is the same.

Specifically, the inter-ring clearance $\Delta r$ represents the difference between the radius (inside radius) of the inner circumferential surface of the outer one of two adjacent ring components 4 and the radius (outside radius) of the outer circumferential surface of the inner one of two adjacent ring components 4. If the thicknesses of the ring components 4 of the respective layers are constant, then the difference between the inner radii of two adjacent ring components 4, or the difference between the outer radii of two adjacent ring components 4, or the remainder produced when the design value (constant) of the thickness of the ring component 4 of each layer is subtracted from one of these differences. In the present embodiment, the difference between the inner radii of two adjacent ring components 4, which is calculated from the measured values of the circumferential lengths of the inner circumferential surfaces of the ring components 4, is obtained as the inter-ring clearance $\Delta r$ in the process described later on. If the thicknesses of the ring components 4 of the respective layers vary from each other, then it is preferable that the remainder produced when the thickness of the inner ring component 4 is subtracted from the difference between the inner radii of the two adjacent ring components 4 or the remainder produced when the thickness of the outer ring component 4 is subtracted from the difference between the outer radii of the two adjacent ring components 4 be obtained as the inter-ring clearance $\Delta r$.

The unloaded product selecting requirement is a requirement prescribing a priority rank for set ring components (4) to be unloaded. The unloaded product selecting requirement will be described in detail later on.

Then, the computer 13 organizes the component data stored by the component data managing means 15, i.e., organizes the component data of the ring components 4 that are currently stored by the component storage facility 10, in STEP2. Specifically, the computer 13 sorts the component data by classifying the component data by layer or arranging the component data of each layer in the order of the magnitudes of circumferential length data.

Then, the computer 13 reads a plurality of combinatorial conditions for combining component data of respective layers into the processing means 16 in STEP3. Prior to describing the combinatorial conditions, a basic concept of combinatorial trial calculations that are performed by the processing means 16 will first be described below.

In combinatorial trial calculations according to the present embodiment, component data of one ring component $4_1$ are selected from the component data of ring components $4_1$ of the first layer (particular layer) which are stored by the component storage facility 10, and component data of one ring component $4_2$ of the second layer which are to be combined with the selected component data of the ring component $4_1$ are selected. Then, component data of one ring component $4_3$ of the third layer which are to be combined with the selected component data of the first and second layers are selected. Similarly, component data of successive ring components are selected from the component data of ring components of the fourth, fifth, . . . , Nth layers. In this manner, lamination combinatorial data (corresponding to the set ring components (4)) is generated which represents a combination of the component data of all the layers (N layers) of a laminated ring 3. The above process of generating lamination combinatorial data is repeated to generate a plurality of lamination combinatorial data. Each time lamination combinatorial data is generated, the component data of the layers included in the generated lamination combinatorial data are excluded from the component data that can be selected in subsequent processes of generating new lamination combinatorial data.

In the present embodiment, the combinatorial conditions for carrying out the above combinatorial trial calculations include a trial calculation starting point selecting condition that prescribes a sequence in which to select component data of ring components $4_1$ of the first layer, and an interlayer selecting condition that prescribes which component data of an adjacent (i+1)th layer is to be selected when component data of one component of an ith layer (i=1, 2, . . . , N−1) is selected. These selecting conditions are determined as follows:

The trial calculation starting point selecting condition is basically determined in order to select component data of the first layer in a sequence from those having circumferential length value data closer to a particular circumferential length value. In the present embodiment, the particular circumferential length value is used as a variably set parameter, and a plurality of kinds of trial calculation starting point selecting conditions are set by setting the parameter (hereinafter referred to as a trial calculation starting point circumferential length parameter) to a plurality of kinds (e.g., 10 kinds) of values that can be used as values of the trial calculation starting point circumferential length parameter, or set data that prescribe those values, are determined in advance, and stored in the hard disk or the like of the computer 13.

The interlayer selecting condition is basically determined in order to select component data whose inter-ring clearance $\Delta r$ satisfies the standard requirement ($A-\alpha \leq \Delta r \leq A+\alpha$) and is closest to a particular target value with respect to the component data of the selected ith layer (i=1, 2, ..., N-1), from the component data of the (i+1)th layer while the above combinatorial calculations are being carried out. In the present embodiment, the above particular target value for the inter-ring clearance $\Delta r$ is used as a variably set parameter, and a plurality of kinds of interlayer selecting conditions are set by setting the parameter (hereinafter referred to as a target clearance parameter) to a plurality of kinds of values. As with the trial calculation starting point circumferential length parameter, a plurality of kinds (e.g., 10 kinds) of values that can be used as values of the target clearance parameter, or set data that prescribe those values, are determined in advance, and stored in the hard disk or the like of the computer 13.

In STEP3, the computer 13 reads the values of the plural kinds of trial calculation starting point circumferential length parameter and the values of the plural kinds of target clearance parameter as parameters that prescribe a plurality of combinatorial conditions into the processing means 16. The number of kinds of combinatorial conditions including trial calculation starting point selecting conditions and interlayer selecting conditions is represented by the product of the number of kinds of trial calculation starting point selecting conditions (=the number of kinds of values of the trial calculation starting point circumferential length parameter) and the number of kinds of interlayer selecting conditions (=the number of kinds of values of the target clearance parameter), e.g., 10×10=100 kinds.

In the description which follows, the number of kinds of values of the trial calculation starting point circumferential length parameter is represented by X and those values are represented by $P_1, P_2, \ldots, P_X$. Similarly, the number of kinds of values of the target clearance parameter is represented by Y, and those values are represented by $Q_1, Q_2, \ldots, Q_Y$.

Then, the computer 13 performs a process of counting, in advance, the number of component data among the component data of each of the first through (N−1)th layers stored by the component data managing means 15, which can be combined with component data of a next adjacent layer (one of the second through Nth layers), or more specifically the number of component data whose inter-ring clearance $\Delta r$ satisfies the standard requirement ($A-\alpha \leq \Delta r \leq A+\alpha$), i.e., a combinable number counting process, in STEP4.

Figure 5:
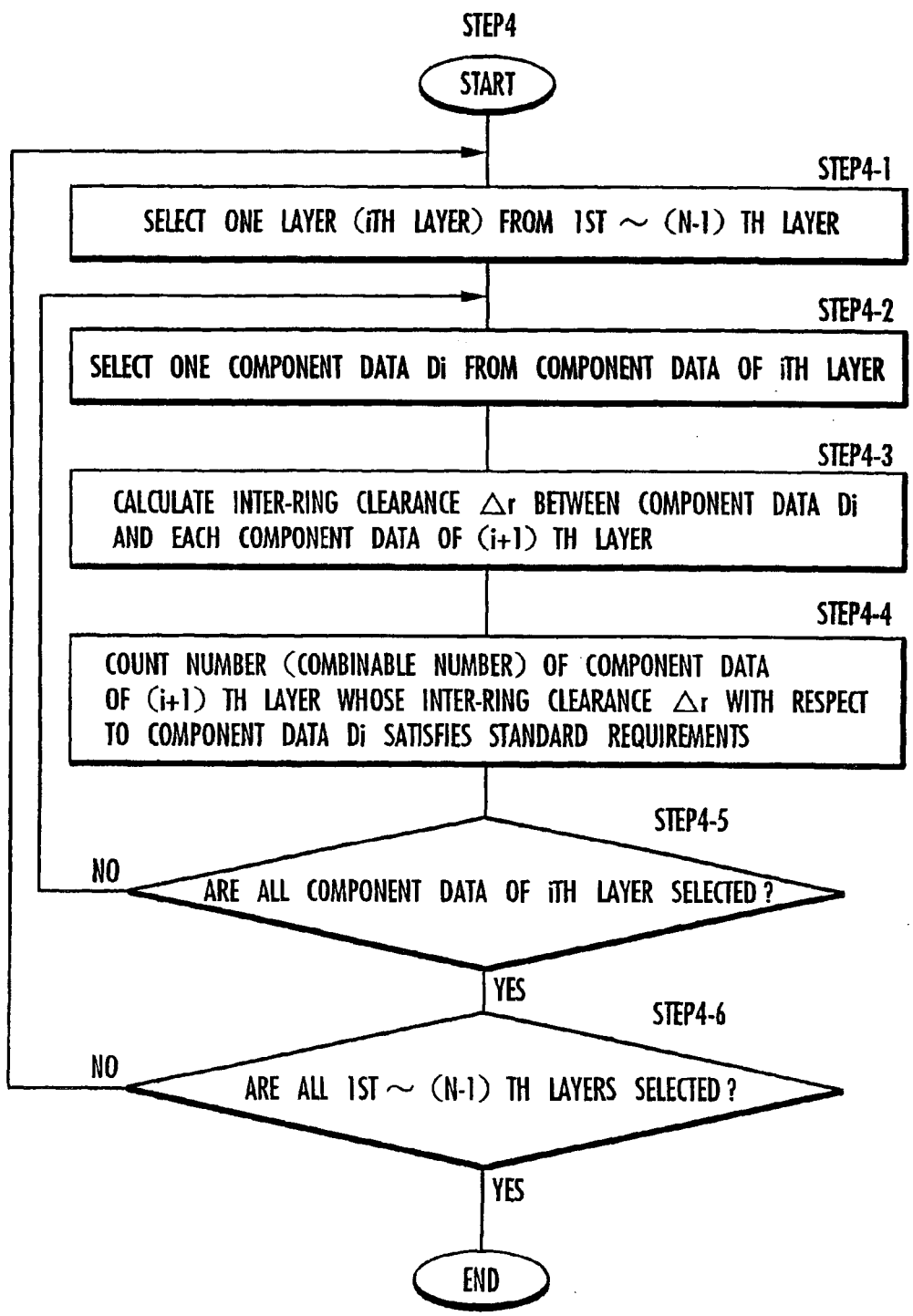
FIGS. 5 through 7 are flowcharts of subroutines of the flowchart shown in FIG. 3.

The combinable number counting process is carried out according to a flowchart shown in FIG. 5.

First, the computer 13 selects one (ith layer) of first through (N−1)th layers in STEP4-1. Then, the computer 13 select one component data Di from the component data of the selected ith layer in STEP4-2.

The computer 13 calculates the inter-ring clearances $\Delta r$ between the component data Di of the selected ith layer and each of the component data of an (i+1)th layer that is adjacent to the ith layer in STEP4-3. The computer 13 then counts the number of component data of the (i+1)th layer whose inter-ring clearance $\Delta r$ satisfies the standard requirement ($A-\alpha \leq \Delta r \leq A+\alpha$), as a combinable number relative to the component data Di of the ith layer in STEP4-4. The inter-ring clearance $\Delta r$ is calculated from the circumferential length value data of the component data Di and the circumferential length value data of each component data of the (i+1)th layer (this calculation is also applicable below).

The counter number is stored by association with the component data Di of the ith layer into the component data managing means 15.

Then, the computer 13 decides whether all the component data of the presently selected ith layer have been selected in STEP4-2 or not in STEP4-5. If there are any unselected component data of the ith layer, then the processing from STEP4-2 is repeated. In this case, the computer 13 selects one of the unselected component data from the component data of the ith layer in STEP4-2.

The computer 13 may selects the component data of the ith layer one by one in STEP4-2 by, for example, selecting the component data of the ith layer according to the sequence in which the component data are stored by the component data managing means 15 with respect to the ith layer, or selecting the component data of the ith layer according to the sequence of the magnitudes of the circumferential value data included in the component data of the ith layer.

If it is confirmed in STEP4-5 that all the component data of the presently selected ith layer have been selected in STEP4-2, then the computer 13 decides whether all the first through (N−1)th layers have been selected in STEP4-1 or not in STEP4-6. If there are any unselected layers, then the computer 13 repeats the processing from STEP4-1. In this case, the computer 13 selects one of the unselected layers from the component data from the first through (N−1)th layers in STEP4-1.

The computer 13 may select the first through (N−1)th layers one by one in STEP4-1 by selecting those layers sequentially from the first layer.

If it is confirmed in STEP4-6 that all the layers have been selected in STEP4-1, then control returns to the main routine shown in FIG. 3.

According to the above processing in STEP4, the number of component data whose inter-ring clearance $\Delta r$ satisfies the standard requirement, among all the component data of each of the first through (N−1)th layers stored by the component data managing means 15, is counted in advance as a combinable number. The combinable number thus counted is stored by association with the component data of each of the first through (N−1)th layers into the component data managing means 15. The component data of the Nth layer are excluded from the processing in STEP4 because they are finally selected and combined in the combinatorial trial calculations whose brief concept has been described above.

Referring back to the flowchart shown in FIG. 3, the processing means 16 of the computer 13 selects one trial calculation starting point circumferential length parameter Pm from the plural (X) trial calculation starting point circumferential length parameters $P_1, P_2, \ldots, P_X$ relative to the plural kinds of trial calculation starting point selecting conditions that have been read in STEP3, in STEP5.

Then, the processing means 16 selects one target clearance parameter Qn from the plural (Y) target clearance parameters $Q_1, Q_2, \ldots, Q_Y$ relative to the plural kinds of interlayer selecting conditions that have been read in STEP3, in STEP6. Now, one combinatorial condition is set from among the plural kinds (X×Y) of combinatorial conditions that are determined by the trial calculation starting point circumferential length parameters and the target clearance parameters.

The processing means 16 then effects a combinatorial trial calculation on the component data stored by the component data managing means 15 based on one kind of combinatorial condition (hereinafter referred to as combinatorial condition (Pm, Qn)) that is determined from the set of the selected trial calculation starting point circumferential length parameter Pm and the selected target clearance parameter Qn in STEP7.

Figure 6:
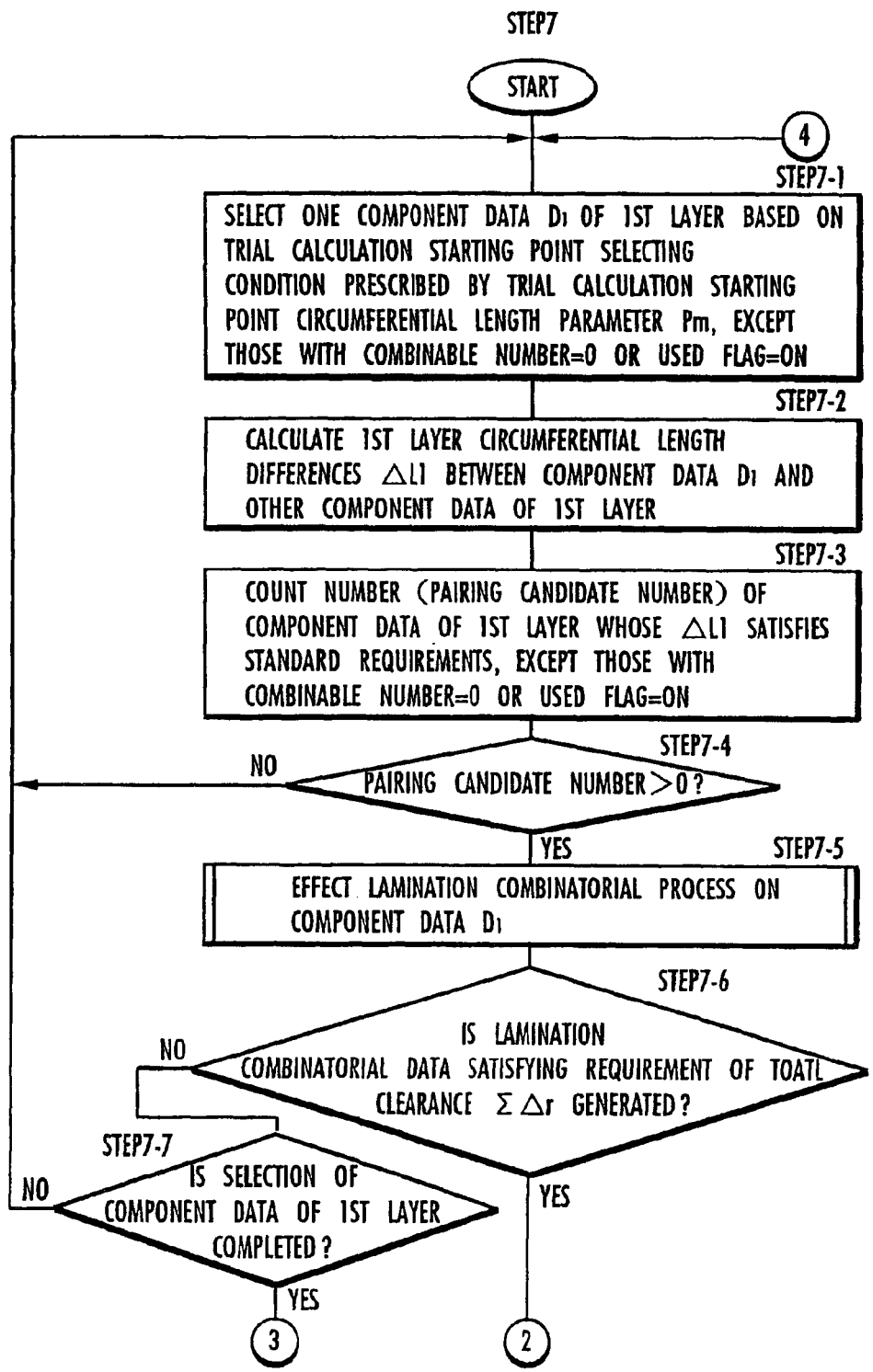
Figure 7:
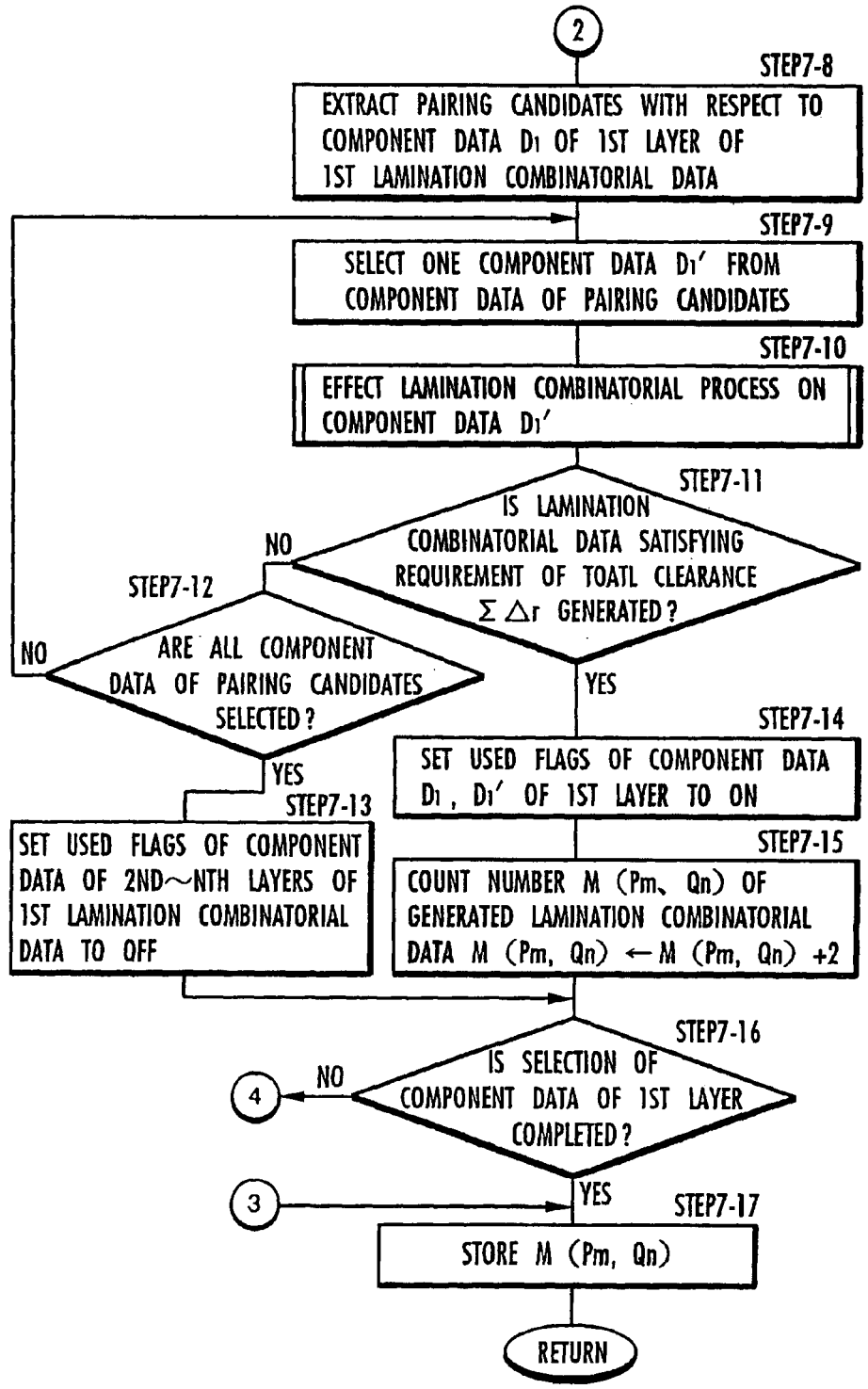
Figure 8:
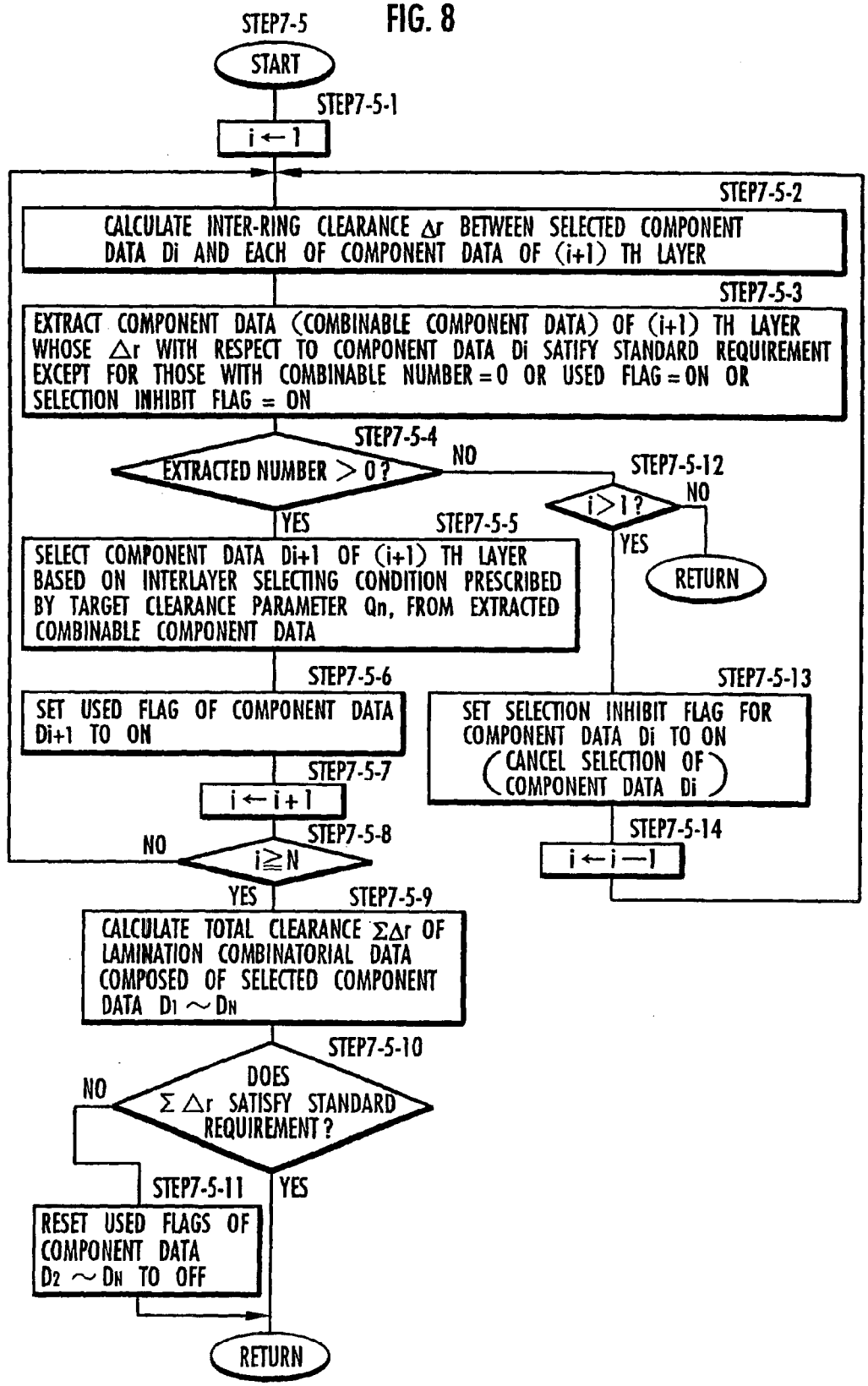
FIG. 8 is a flowchart of a subroutine of the flowchart shown in FIG. 6.

The combinatorial trial calculation is carried out according to flowcharts shown in FIGS. 6 through 8.

In FIG. 6, the processing means 16 selects one component data $D_1$ from the component data of the first layer based on the trial calculation starting point selecting condition prescribed by the trial calculation starting point circumferential length parameter Pm selected in STEP5 in STEP7-1.

Specifically, the trial calculation starting point selecting condition prescribed by the trial calculation starting point circumferential length parameter Pm that is being currently set basically prescribes a sequence in which to select the component data of the first layer as by selecting the component data $D_1$ of the first layer, one by one, in a sequence from those having circumferential length value data closer to the value of the parameter Pm. The processing in STEP7-1 is repeatedly carried out during the combinatorial trial calculation according to one kind of combinatorial condition (Pm, Qn). In STEP7-1, basically, one component data $D_1$ of the first layer is selected according to the selecting sequence that is determined depending on the trial calculation starting point circumferential length parameter Pm as described above each time the processing in STEP7-1 is carried out.

The component data of the first layer whose combinable number counted in advance in STEP4 is "0" or whose used flag is ON are excluded from the component data that can be selected in STEP7-1.

The used flag is set to ON as described later on during the combinatorial trial calculation with respect to the component data of each of the first through Nth layers. When the processing in STEP7 is started, the used flag is initialized to OFF with respect to all the component data of all the layers.

If there are a plurality of component data have the same circumferential length value data in STEP7-1, then one of the component data is selected according to the sequence the component data are stored by the component data managing means 15, or one of the component data is selected in view of the production date data or the lot number data included in the component data.

Then, the processing means 16 calculates the absolute values of the differences between the circumferential length value data of the component data $D_1$ selected in STEP7-1 and the circumferential length value data of all the other component data of the first layer, i.e., the first layer circumferential length differences $\Delta L1$, in STEP7-2. The processing means 16 counts the number (hereinafter referred to as a pairing candidate number) of component data of the first layer, as pairing candidates for the component data $D_1$, whose first layer circumferential length differences $\Delta L1$ satisfy the standard requirement $0 \leq \Delta L1 \leq C$ in STEP7-3.

At this time, the component data whose combinable number counted in advance in STEP4 is "0" or whose used flag is ON are excluded from the pairing candidates that can be counted.

The pairing candidate number thus counted represents the number of other component data of the first layer which can possibly be paired with the component data $D_1$ of the first layer selected in STEP7-1, with respect to the pair of laminated rings 3 that make up the CVT belt 1.

Then, the processing means 16 decides whether the pairing candidate number counted in STEP7-3 is "0" or not in STEP7-4. If the pairing candidate number is "0", i.e., if it is impossible to generate lamination combinatorial data to be paired with generated lamination combinatorial data including the component data $D_1$, then control returns to STEP7-1 to select new component data $D_1$ of the first layer. This is because in the present embodiment two laminated rings 3 are assembled as one set since an individual CVT belt 1 needs a pair of laminated rings 3.

If the component data $D_1$ of the first layer whose pairing candidate number is not "0" is selected in STEP7-1 and that selection is confirmed in STEP7-4, then the processing means 16 performs a lamination combinatorial process to combine the component data of the second through Nth layers, one by one, with the component data D1 of the first layer, thereby generating lamination combinatorial data in STEP7-5.

The lamination combinatorial process is carried out according to a flowchart shown in FIG. 8.

The processing means 16 initializes the value of a parameter i indicative of a layer number to "1" in STEP7-5-1. Then, the processing means 16 calculates the inter-ring clearance $\Delta r$ between the presently selected component data Di of the ith layer and each of the component data of the (i+1)th layer, using the circumferential length value data of the component data, in STEP7-5-2. Since i=1 in an initial stage of the lamination combinatorial process, the component data Di of the ith layer is the component data $D_1$ of the first layer selected in STEP7-1 through STEP7-4.

Then, the processing means 16 extracts component data whose inter-ring clearances $\Delta r$ calculated in STEP7-5-2 satisfy the standard requirement $(A-\alpha \leq \Delta r \leq A+\alpha)$ from the component data of the (i+1)th layer, as combinable component data with respect to the component data Di of the ith layer, in STEP7-5-3.

However, of the component data of the (i+1)th layer, those component data whose combinable number counted in advance in STEP4 is "0" or whose used flag or selection inhibit flag is ON are excluded from the component data that can be extracted.

The selection inhibit flag is set to ON in STEP7-5-13, described later on, if there is no combinable component data with respect to each of the component data of the second through (N–1)th layers. As with the used flag, the selection inhibit flag is initialized to OFF with respect to all the component data of the second through (N–1)th layers when the processing in STEP7 is started.

When i=N–1 in extracting combinable component data in STEP7-5-3, the condition as to whether the combinable number relative to the component data of the (i+1)th layer (=Nth layer) is "0" or not and the condition as to whether the selection inhibit flag is ON or not are ignored. This is because since the component data of the Nth layer are finally selected in obtaining lamination combinatorial data, no combinable number is calculated in STEP4 and the selection inhibit flag is not set to ON in STEP7-5-13. Therefore, when i=N–1 in extracting combinable component data in STEP7-5-3, those component data whose inter-ring clearances $\Delta r$ with respect to the selected component data $D_{N-1}$ of the (N–1)th layer satisfy the standard requirement $(A-\alpha \leqq \Delta r \leqq A+\alpha)$ and whose used flags are not ON are selected from among the component data of the Nth layer (=(i+1)th layer).

Then, the processing means 16 decides whether the number of combinable component data extracted in STEP7-5-3 is "0" or not in STEP7-5-4.

If the number of extracted combinable component data≠0 (>0), i.e., if there is at least one component data of the (i+1)th layer which can be combined with the selected component data Di of the ith layer, then the processing means 16 selects one component data Di+1 to be combined with the already selected component data $D_1$–Di of the first through ith layers based on the interlayer selecting condition prescribed by the present target clearance parameter Qn set in STEP6, from the extracted combinable component data of the (i+1)th layer in STEP7-5-5. That is, the component data Di+1 whose ring clearance Δr calculated in STEP7-5-2 with respect to the component data Di of the ith layer is closest to the value of the presently set target clearance parameter Qn is selected from the extracted combinable component data.

Then, the processing means 16 sets the used flag of the newly selected component data Di+1 of the (i+1)th layer to ON in STEP7-5-6.

The processing means 16 increments the value of the layer number i from the present value by "1" in STEP7-5-7, and then decides whether or not the incremented value of the layer number i is equal to or greater than the number N of the layers of a laminated ring 3 in STEP7-5-8. If i<N, then the processing from STEP7-5-2 is repeated. If i≧N, i.e., if the component data of all the layers ranging from the first through Nth layers have been selected one by one and lamination combinatorial data composed of the component data $D_1$–$D_N$ of each of those layers has been generated, then the processing means 16 calculates a total clearance ΣΔr relative to the generated lamination combinatorial data in STEP7-5-9. The processing means 16 decides whether the calculated total clearance ΣΔr satisfies the standard requirement (0≦ΣΔr≦B) or not in STEP7-5-10. If the calculated total clearance ΣΔr satisfies the standard requirement (0≦ΣΔr≦B), then the processing means 16 finishes the lamination combinatorial process in STEP7-5. Control then returns to the processing sequence shown in FIG. 6.

If the calculated total clearance ΣΔr does not satisfy the standard requirement (0≦ΣΔr≦B) in STEP7-5-10, then the processing means 16 resets the used flag, which has been set to ON with respect to each of the component data of the second through Nth layers in the lamination combinatorial data in STEP7-5-6, to OFF in STEP7-5-11. Control then returns to the processing sequence shown in FIG. 6.

The above processing sequence is a basic sequence of the lamination combinatorial process. As described above, the component data $D_2$–$D_N$ of each of the second through Nth layers are successively selected one by one with respect to the component data $D_1$ of the first layer which has been selected and determined in the processing ranging from STEP7-1 through STEP7-4, and they are combined into one lamination combinatorial data.

If the number of extracted combinable component data is "0" in STEP7-5-4, i.e., if there is no component data of the (i+1)th layer that can be combined with the selected component data Di of the ith layer, then the processing means 16 performs the following processing sequence:

If the number of extracted combinable component data is "0" in STEP7-5-4, then the processing means 16 determines the value of the present layer number i in STEP 7-5-12. If i=1, then since it is impossible to generate lamination combinatorial data including the component data $D_1$ of the first layer, the lamination combinatorial process is finished, and control returns to the processing sequence shown in FIG. 6.

If i>1 in STEP 7-5-12, then the processing means 16 sets the selection inhibit flag relative to the presently selected component data Di of the ith layer to ON in STEP7-5-13. At this time, the selection of the component data Di of the ith layer is canceled, and the component data $D_1$ through Di–1 of the first through (i–1)th layers are selected.

The processing means 16 decrements the value of the layer number i by "1" in step S7-5-14, after which control goes back to the processing in STEP7-5-2.

Specifically, if the number of extracted combinable component data of the (i+1)th layer that can be combined with the selected component data Di of the ith layer (i>1) in STEP7-5-3 is "0", then the selection of the component data Di of the ith layer is canceled, and the processing goes back to a preceding layer (=(i–1)th layer) to extract again combinable component data of the ith layer with respect to the already selected component data Di–1 of the (i–1)th layer. In STEP7-5-5, the component data Di of the ith layer to be combined with the component data Di–1 of the (i–1)th layer is selected from the extracted combinable component data.

Since the selection inhibit flag for the previously selected component data of the ith layer is set to ON in STEP7-5-13, the component data will not subsequently be extracted as combinable component data that can be combined with the component data of the (i–1)th layer, and will not subsequently be extracted as component data making up lamination combinatorial data in STEP7-5-5.

More specifically, with the component data $D_1$ through $D_3$ of the first through third layers, for example, being selected, if the number of combinable component data of the fourth layer which have been extracted in STEP7-5-3 with respect to the component data $D_3$ of the third layer is "0", then combinable component data of the third layer are extracted again with respect to the already selected component data $D_2$ of the second layer. Basically, then, the component data of the third layer which make up lamination combinatorial data are selected again in STEP7-5-5 from the newly extracted combinable component data (which do not include the previously selected component data $D_3$ of the third layer).

When the extracting process in STEP7-5-3 is carried out again as described above, setting the selection inhibit flag for the previously selected component data Di (component data $D_3$ of the third layer in the above example) of the ith layer to ON may possibly cause the number of combinable component data extracted again in STEP7-5-3 to be "0". In this case, control goes through the decision process in STEP7-5-4 to the processing in STEP 7-5-13 and STEP7-5-14 thereby to trace back the layer number i for selecting component data.

Referring back to FIG. 6, after having carried out the lamination combinatorial process in STEP7-5, the processing means 16 decides whether lamination combinatorial data satisfying the standard requirement of the total clearance ΣΔr is generated or not in STEP7-6.

If the lamination combinatorial process in STEP7-5 has been finished via STEP7-5-11 or STEP7-5-12, then no lamination combinatorial data satisfying the standard requirement of the total clearance ΣΔr is generated. In this case, the processing means 16 decides whether all the component data of the first layer (except those with the combinable number="0" or the used flag=ON) have been selected in STEP7-1 or not in STEP7-7. If there are any unselected component data, then control goes back to STEP7-1 to select new component data $D_1$ of the first layer. If there are no unselected component data, then control goes to STEP7-17 described later on.

If lamination combinatorial data satisfying the standard requirement of the total clearance $\Sigma\Delta r$ is generated according to the lamination combinatorial process in STEP7-5, i.e., if the answer to STEP7-5-10 is YES, then the processing means 16 confirms the generation of lamination combinatorial data in STEP7-6, and performs a process of generating lamination combinatorial data to be paired with the above lamination combinatorial data from STEP7-8 shown in FIG. 7. In the following description, the lamination combinatorial data generated in STEP7-5 is associated with the first laminated ring 3a for the CVT belt 1 and referred to as first lamination combinatorial data, and lamination combinatorial data generated as described below is paired with the first lamination combinatorial data and referred to as second lamination combinatorial data (corresponding to the second laminated ring 3b).

After having generated the first lamination combinatorial data in STEP7-5, the processing means 16 extracts the pairing candidates, which have been counted in STEP7-3, with respect to the component data $D_1$ of the first layer of the first lamination combinatorial data, from the component data of the first layer in STEP7-8.

Then, the processing means 16 selects one component data $D_1'$ from the component data of the pairing candidates of the first layer in STEP7-9. While the selected component data $D_1'$ may be any arbitrary component data, one component data having circumferential length value data closer to the value of the circumferential length value data of the component data $D_1'$ of the first layer of the first lamination combinatorial data, for example, is preferentially selected. At this time, it has been confirmed in STEP7-4 that the number of pairing candidates is at least one.

The processing means 16 performs a lamination combinatorial process to combine the component data of the second through Nth layers, one by one, with the component data $D_1'$ of the first layer selected in STEP7-9 to generate lamination combinatorial data in STEP7-10. This lamination combinatorial process is carried out exactly in the same manner as the lamination combinatorial process in STEP7-5.

Then, the processing means 16 decides, in exactly the same manner as with the decision process in STEP7-6, whether lamination combinatorial data (second lamination combinatorial data) satisfying the standard requirement of the total clearance $\Sigma\Delta r$ ($0 \leq \Sigma\Delta r \leq B$) is generated according to the lamination combinatorial process in STEP7-10 or not in STEP7-11.

If no lamination combinatorial data satisfying the standard requirement of the total clearance $\Sigma\Delta r$ is generated, the processing means 16 decides whether all the component data of the pairing candidates extracted in STEP7-8 have been selected in STEP7-9 or not in STEP7-12. If there are any unselected pairing candidates, then control goes back to STEP7-9 in which the processing means 16 selects one new component data $D_1'$ from the component data of the pairing candidates and then to STEP7-10 in which the processing means 16 performs the lamination combinatorial process in. When the processing in STEP7-9 is thus repeated, component data $D_1'$ are selected from the component data of the pairing candidates in a sequence from those having circumferential length value data closer to the circumferential length value data of the component data $D_1'$ of the first layer of the first lamination combinatorial data, for example.

If the selection of all the pairing candidates in STEP7-9 is completed as confirmed in STEP7-12 (in this case, any second lamination combinatorial data satisfying the standard requirement of the total clearance $\Sigma\Delta r$ is not generated), then the processing means 16 resets the used flags (which have been set to ON in STEP7-5) relative to the component data $D_2$–$D_N$ of each of the second through Nth layers of the first lamination combinatorial data to OFF in STEP7-13, after which control goes to STEP7-16 described later on.

If it is confirmed in STEP7-11 that second lamination combinatorial data (lamination combinatorial data to be paired with the first lamination combinatorial data) satisfying the standard requirement of the total clearance $\Sigma\Delta r$ is generated according to the lamination combinatorial process in STEP7-10, then the processing means 16 sets used flags relative to the component data $D_1$ of the first layer of the first lamination combinatorial data and the component data $D_1'$ of the first layer of the second lamination combinatorial data to ON in STEP7-14. Thereafter, the processing means 16 counts the number M (Pm, Qn) of lamination combinatorial data generated up to present with respect to one kind of combinatorial condition (Pm, Qn) set in STEP 5 and STEP6 (see FIG. 3) in STEP7-15. The counting process is carried out by adding "2" which is the number of lamination combinatorial data successively generated in STEP7-5 and STEP7-10 to the present value of the number M (Pm, Qn) (hereinafter referred to as a generated lamination combinatorial number M (Pm, Qn)). The generated lamination combinatorial number M (Pm, Qn) has been initialized to "0" at the time of starting the processing in STEP7, for example.

As described above, the lamination combinatorial data are basically generated as a pair of first and second lamination combinatorial data. If first lamination combinatorial data satisfying the standard requirement of the total clearance $\Sigma\Delta r$ is generated and second lamination combinatorial data to be paired with the first lamination combinatorial data is not generated, then the generated lamination combinatorial number M (Pm, Qn) is not counted up. According to the present embodiment, therefore, the generated lamination combinatorial number M (Pm, Qn) is an even number, and a value produced by dividing the generated lamination combinatorial number M (Pm, Qn) by "2" represents the number of pairs of generated first and second lamination combinatorial data.

If second lamination combinatorial data satisfying the standard requirement of the total clearance $\Sigma\Delta r$ is not generated, then since the used flags relative to the component data $D_2$–$D_N$ of the second through Nth layers of the previously generated first lamination combinatorial data are set to OFF, these component data $D_2$–$D_N$ are left as candidates for component data of the first or second lamination combinatorial data.

If a pair of first and second lamination combinatorial data both satisfying the standard requirement of the total clearance $\Sigma\Delta r$ is generated, then since the used flags relative to the component data $D_1$, $D_1'$ of the first layer of those lamination combinatorial data are set to ON, those component data $D_1$, $D_1'$ of the first layer will not subsequently be selected as elements of lamination combinatorial data in STEP7-1 or STEP7-9. The component data $D_1$ of the first layer of the first lamination combinatorial data generated in STEP7-5 is selected only once in STEP7-1 even if the used flag thereof is OFF (because the component data of the first layer are sequentially selected according to the trial calculation starting point selecting condition in STEP7-1). However, if the used flag of the component data $D_1$ is OFF, then the component data $D_1$ may be selected as component data of the first layer of the second lamination combinatorial data in STEP7-9.

After the generated lamination combinatorial number M (Pm, Qn) has been counted in STEP7-15 or after the processing in STEP7-13 has been carried out without generating second lamination combinatorial data, the processing means 16 decides whether the selection of the component data $D_1$ of the first layer in STEP7-1 has been completed or not, i.e., whether the selection of all the component data $D_1$ of the first layer (except those with the combinable number= "0" or the used flag=ON) based on trial calculation starting point selecting condition has been completed or not, in STEP7-16. If there are unselected component data of the first layer, then the processing from STEP7-1 shown in FIG. 6 is repeated.

If the selection of the component data of the first layer has been completed as confirmed in STEP7-16 or STEP7-7, then the processing means 16 stores the finally obtained value of the generated lamination combinatorial number M (Pm, Qn) in the component data managing means 15 in association with the presently set combinatorial condition (Pm, Qn) in STEP7-17.

The combinatorial trial calculation in STEP7 shown in FIG. 3 (the combinatorial trial calculation based on one combinatorial condition (Pm, Qn)) is thus finished, and the generated lamination combinatorial number M (Pm, Qn) corresponding to the combinatorial condition (Pm, Qn), i.e., the total number of lamination combinatorial data that can be generated based on the combinatorial condition (Pm, Qn), is determined.

Referring back to the flowchart of FIG. 3, after having performed the combinatorial trial calculation based on one kind of combinatorial condition prescribed by the trial calculation starting point circumferential length parameter Pm and the target clearance parameter Qn which are set in STEP5 and STEP6, the processing means 16 decides whether all target clearance parameters $Q_1$ through $Q_Y$ read in STEP3 have been selected in STEP6 or not in STEP8. If there is an unselected target clearance parameter, then the processing means 16 selects the unselected target clearance parameter Qn in STEP6 (at this time, the value of the trial calculation starting point circumferential length parameter Pm remains as it is), and the combinatorial trial calculation in STEP7 is carried out as described above based on a combinatorial condition (Pm, Qn) that is prescribed by the newly selected target clearance parameter Qn and the presently selected trial calculation starting point circumferential length parameter Pm.

The processing means 16 selects the target clearance parameters $Q_1$ through $Q_Y$, one by one, in STEP6 by sequentially selecting the target clearance parameters $Q_1$ through $Q_Y$ in the order of their magnitudes.

If the selection of the target clearance parameters has been completed in STEP6 as confirmed in STEP8, then the processing means 16 decides whether all trial calculation starting point circumferential length parameters $P_1$ through $P_X$ read in STEP3 have been selected in STEP5 or not in STEP9. If there is an unselected trial calculation starting point circumferential length parameter, then the processing means 16 selects the unselected trial calculation starting point circumferential length parameter Pm in STEP5. After one target clearance parameter Qn is selected, the combinatorial trial calculation in STEP7 is carried out as described above based on a combinatorial condition (Pm, Qn) that is prescribed by the trial calculation starting point circumferential length parameter Pm and the target clearance parameter Qn which have thus been selected.

The processing means 16 selects the trial calculation starting point circumferential length parameters Pm, one by one, in STEP5 by sequentially selecting the trial calculation starting point circumferential length parameters $P_1$ through $P_X$ in the order of their magnitudes, as with STEP5.

The combinatorial trial calculation in STEP7 is carried out for each of (X×Y) combinatorial conditions (Pm, Qn) that are prescribed by the X trial calculation starting point circumferential length parameters $P_1$–$P_X$ and the Y target clearance parameters $Q_1$–$Q_Y$ that read in STEP3 to generate lamination combinatorial data that satisfy the standard requirement of the total clearance ΣΔr and determine the number of generated lamination combinatorial data, i.e., the generated lamination combinatorial number M (Pm, Qn).

After the combinatorial trial calculation in STEP7 is carried out with respect to all the (X×Y) combinatorial conditions (Pm, Qn) (YES in STEP9), the processing means 16 compares generated lamination combinatorial numbers M (Pm, Qn) corresponding to various combinatorial conditions (Pm, Qn) with each other in STEP10 and sets a combinatorial condition (Pm, Qn) whose generated lamination combinatorial number M (Pm, Qn) is maximum as an adequate combinatorial condition (Pm0, Qn0) in STEP11, as shown in the flowchart of FIG. 4. If there are two or more combinatorial conditions (Pm, Qn) whose generated lamination combinatorial numbers M (Pm, Qn) are of the same maximum value, then a combinatorial condition (Pm, Qn) having a trial calculation starting point circumferential length parameter Pm closer to the central value of a variable range of trial calculation starting point circumferential length parameters Pm and a target clearance parameter Qn closer to the central value of a variable range of target clearance parameters Qn is preferentially set as an adequate combinatorial condition (Pm0, Qn0).

As with STEP7, combinatorial trial calculations are carried out based on the adequate combinatorial condition thus set, and lamination combinatorial data generated by the combinatorial trial calculations (lamination combinatorial data satisfying the standard requirement of the total clearance ΣΔr) are stored by the component data managing means 15 in STEP12.

The processing in STEP12 may be dispensed with if the generated lamination combinatorial data is stored by association with the combinatorial condition (Pm, Qn) for each of various combinatorial conditions (Pm, Qn) in STEP7.

Then, the processing means 16 selects lamination combinatorial data of the number (hereinafter referred to as a required unloaded number) of laminated rings 3 that are required to be assembled, from the lamination combinatorial data corresponding to the adequate combinatorial condition (Pm0, Qn0) which has been stored as described above in STEP13. In the present embodiment, since a pair of laminated rings 3a, 3b are required to manufacture the CVT belt 1, the required unloaded number is a numerical value in a unit of two (even number). When one of the first and second lamination combinatorial data generated as a pair in the above combinatorial trial calculation is selected, the other is also selected.

The lamination combinatorial data is selected based on the unloaded product selecting requirement read in STEP1. The unloaded product selecting requirement serves to prescribe a priority sequence for selecting lamination combinatorial data. In the present embodiment, items that prescribe the priority sequence include a variation of the inter-ring clearance Δr between adjacent layers in each of the lamination combinatorial data (e.g., a standard deviation of Δr), a total clearance ΣΔr in each of the lamination combinatorial data, production dates of the ring components 4 of the first through Nth layers corresponding to each of the lamination combinatorial data, lot numbers of the ring components 4, etc.

The unloaded product selecting requirement read in STEP1 is determined in order to select, with priority, lamination combinatorial data whose variation of the inter-ring clearance Δr is smaller, or select, with priority, lamination combinatorial data whose total clearance ΣΔr is closer to a predetermined value, or select, with priority, lamination combinatorial data whose production date data include component data corresponding to the oldest ring component 4, or select, with priority, lamination combinatorial data including component data whose lot number data are in agreement with a predetermined value.

In STEP12, lamination combinatorial data of the required unloaded number are selected according to the unloaded product selecting requirement thus determined. For example, if the unloaded product selecting requirement is determined in order to select, with priority, lamination combinatorial data whose variation of the inter-ring clearance Δr is smaller, then both first and second lamination combinatorial data that are paired with each other are selected as many as the required unloaded number in a sequence from those having smaller variations of the inter-ring clearance Δr between those layers, from the lamination combinatorial data generated under the adequate combinatorial condition (Pm0, Qn0).

After the processing means 16 has selected as many lamination combinatorial data as the required unloaded number, the computer 13 instructs the unloading device 12 to remove ring components $4_1$–$4_N$ corresponding to the component data contained in the selected lamination combinatorial data from the component storage facility 10 and supply the removed ring components $4_1$–$4_N$ to the laminating device 14 in STEP14.

The unloading device 12 thus instructed removes a set of ring components $4_1$–$4_N$ corresponding to the component data of the first through Nth layers that make up the selected lamination combinatorial data (more specifically, the pair of first and second lamination combinatorial data), i.e., the set ring components (4), for each data from the component storage facility 10, and supplies the removed ring components $4_1$–$4_N$ to the laminating device 14. The ring components $4_1$–$4_N$ supplied to the laminating device 14 are laminated into the laminated ring 3 by the laminating device 14.

In the present embodiment, as described above, combinatorial trial calculations are performed based on the respective plural (X×Y) combinatorial conditions, and a combinatorial condition for maximizing the generated lamination combinatorial number M (Pm, Qn) is obtained as an adequate combinatorial condition (Pm0, Qn0). In this manner, a combinatorial condition is found which is capable of assembling as many laminated rings 3 as possible from the ring components 4 stored by the component storage facility 10.

As many lamination combinatorial data as the required unloaded number are selected from the lamination combinatorial data that are generated based on the adequate combinatorial condition (Pm0, Qn0). Set ring components (4) corresponding to the selected lamination combinatorial data are actually unloaded from the component storage facility 10, supplied to the laminating device 14, and assembled into laminated rings 3. Therefore, even if the required unloaded number (the number of required laminated rings 3) is large, as many set ring components (4) as the required unloaded number can be supplied to the laminating device 14 to assemble laminated rings 3.

Consequently, the mass-productivity of laminated rings 3 can be increased, and ring components 4 manufactured and loaded into the component storage facility 10 can be used efficiently (with a good yield) to assemble laminated rings 3.

In the present embodiment, it is taken into consideration that a pair of laminated rings 3 is required to manufacture a CVT belt 1 and there is a standard requirement (in this embodiment, a standard requirement for the first layer circumferential length difference ΔL1) for the pair of laminated rings 3. In a combinatorial trial calculation for each combinatorial condition (Pm, Qn), first lamination combinatorial data is generated, and thereafter second lamination combinatorial data which satisfies the above standard requirement is generated. Thus, a pair of first and second lamination combinatorial data is generated as one set. Consequently, it is possible to find an adequate combinatorial condition (Pm0, Qn0) capable of assembling most pairs of laminated rings 3 that can be used as components of the CVT belt 1. By unloading and assembling set ring components (4) corresponding to the lamination combinatorial data that are generated based on the adequate combinatorial condition, many pairs of laminated rings 3 that can reliably be used as components of the CVT belt 1 can be assembled. The mass-productivity of the belt 1 can therefore be increased.

In the present embodiment, before combinatorial trial calculations are performed under each combinatorial condition, the combinable number of component data of each of the first through (N−1)th layers is counted, and those component data whose-combinable number is "0" are excluded from the component data that can be selected in the combinatorial trial calculations. Therefore, unnecessary trial calculations can be eliminated, and the time required to perform combinatorial trial calculations under each combinatorial condition can be reduced.

In the present embodiment, furthermore, in the lamination combinatorial process (STEP7-5 and STEP7-10) repeated in combinatorial trial calculations under each combinatorial condition, if component data Di of the ith layer (1<i<N−1) are selected and there are no component data of the (i+1)th layer that can be combined therewith, i.e., if there are no combinable component data relative to the component data Di, then the layer is traced back and the selection of component data is carried out again. Therefore, the probability that lamination combinatorial data is generated in each lamination combinatorial process is increased, making it possible to generate as many lamination combinatorial data as possible under each combinatorial condition. As a result, an adequate combinatorial condition (Pm, Qn) capable of generating more lamination combinatorial data can be found, and hence the mass-productivity of laminated rings 3 can therefore be increased. At this time, since the selection inhibit flag for the component data Di with no combinable components is set to ON, excluding those component data from being selected during combinatorial trial calculations under a set combinatorial condition, unnecessary trial calculations can be eliminated, and the time required to perform combinatorial trial calculations under each combinatorial condition can be reduced.

A second embodiment of the present invention will be described below with reference to FIG. 9. The apparatus according to the second embodiment is identical to the apparatus according to the first embodiment, but only a portion of the processing carried out by the processing means 16 of the computer 13 according to the second embodiment is different from that according to the first embodiment. Therefore, those structural details and processing details according to the second embodiment which are identical to those of the first embodiment are denoted by identical reference characters in identical figures, and will not be described in detail below.

The present embodiment differs from the first embodiment as to a portion of the lamination combinatorial process (STEP7-5 in FIG. 6 and STEP7-10 in FIG. 7) carried out in combinatorial trial calculations under each combinatorial condition by the processing means 16 of the computer 13.

Figure 9:
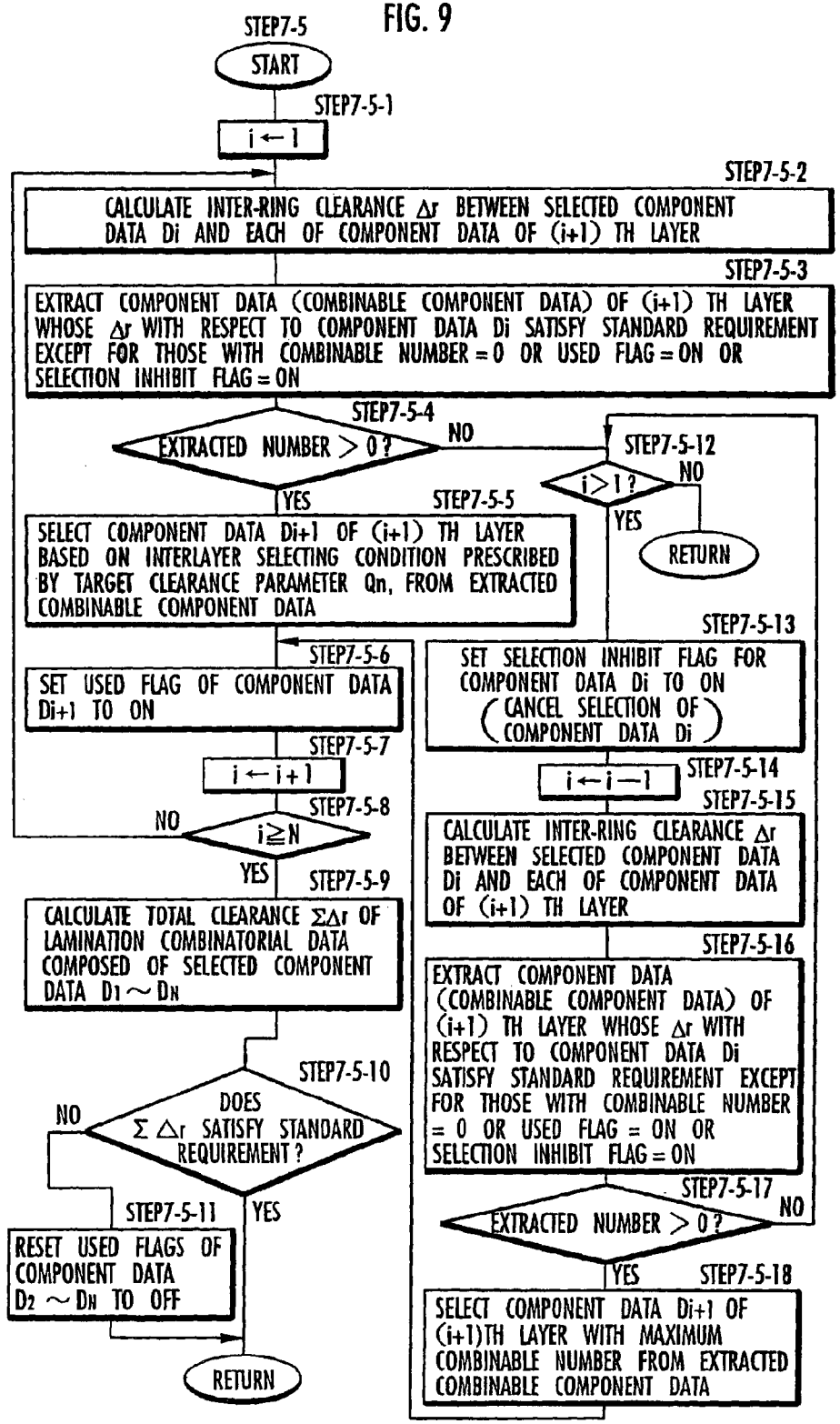
FIG. 9 is a flowchart of an operation sequence according to a second embodiment of the present invention.

FIG. 9 is a flowchart of details of the processing in STEP7-5 according to the present embodiment. Details of the processing in STEP7-5-1 through STEP7-5-14 according to the present embodiment are identical to those of the first embodiment.

After the processing means 16 has decremented the value of the layer number i by "1" to trace back the layer number i of component data to be selected, the processing means 16 carries out the same processing as in STEP7-5-2 and STEP7-5-3 in STEP7-5-15 and STEP7-5-16 to extract combinable component data Di+1 of the (i+1)th layer with respect to the already selected component data Di.

The processing means 16 decides whether the number of extracted combinable component data is "0" or not in STEP7-5-17. If the number of extracted combinable component data is greater than "0" (>0), then the processing means 16 selects again the component data Di+1 of the (i+1)th layer based on a condition different from that in STEP7-5-5 in STEP7-5-18. More specifically, in STEP7-5-18, the processing means 16 selects the component data Di+1 of the (i+1)th layer whose combinable number determined in advance in STEP4 is maximum, from the combinable component data extracted in STEP7-5-16.

After having selected the component data Di+1 of the (i+1)th layer, the processing means 16 performs the processing from STEP7-5-6 described above in the first embodiment. If the number of extracted combinable component data is "0" in STEP7-5-17, then control goes back to the decision processing in STEP7-5-12 to further track back the layer number i unless the present value of the layer number i is "1".

The processing described above is the processing (lamination combinatorial process) in STEP7-5 in the present embodiment. In the present embodiment, the lamination combinatorial process in STEP7-10 shown in FIG. 7 is carried out in the same manner as with the processing in STEP7-5.

Other processing details than described above are identical to those of the first embodiment described above.

In the present embodiment, as described above, if the layer number i is tracked back to select component data again, then component data are selected based on an interlayer selecting condition which is temporarily different from a normal interlayer selecting condition.

In this manner, in the lamination combinatorial process (STEP7-5, STEP7-10) repeated in the combinatorial trial calculations under each combinatorial condition (Pm, Qn), the probability that lamination combinatorial data is generated is increased, making it possible to find an adequate combinatorial condition (Pm, Qn) capable of generating as many lamination combinatorial data as possible.

In the present embodiment, the component data Di+1 whose combinable number is maximum is selected in STEP7-5-18. However, component data of the (i+1)th layer may be selected under another condition (e.g., a condition in view of the production date data or the like).

A third embodiment of the present invention will be described below with reference to FIGS. 10 through 13. The apparatus according to the third embodiment is identical to the apparatus according to the first embodiment, but only the processing carried out by the processing means 16 of the computer 13 according to the third embodiment is different from that according to the first embodiment. Therefore, those structural details according to the third embodiment which are identical to those of the first embodiment are denoted by identical reference characters, and will not be described in detail below.

In the first embodiment, a plurality of values of trial calculation starting point circumferential length parameters which prescribe a plurality of trial calculation starting point selecting conditions and a plurality of values of target clearance parameters which prescribe a plurality of interlayer selecting conditions are fixedly determined. According to the present embodiment, they are variably set.

Figure 10:
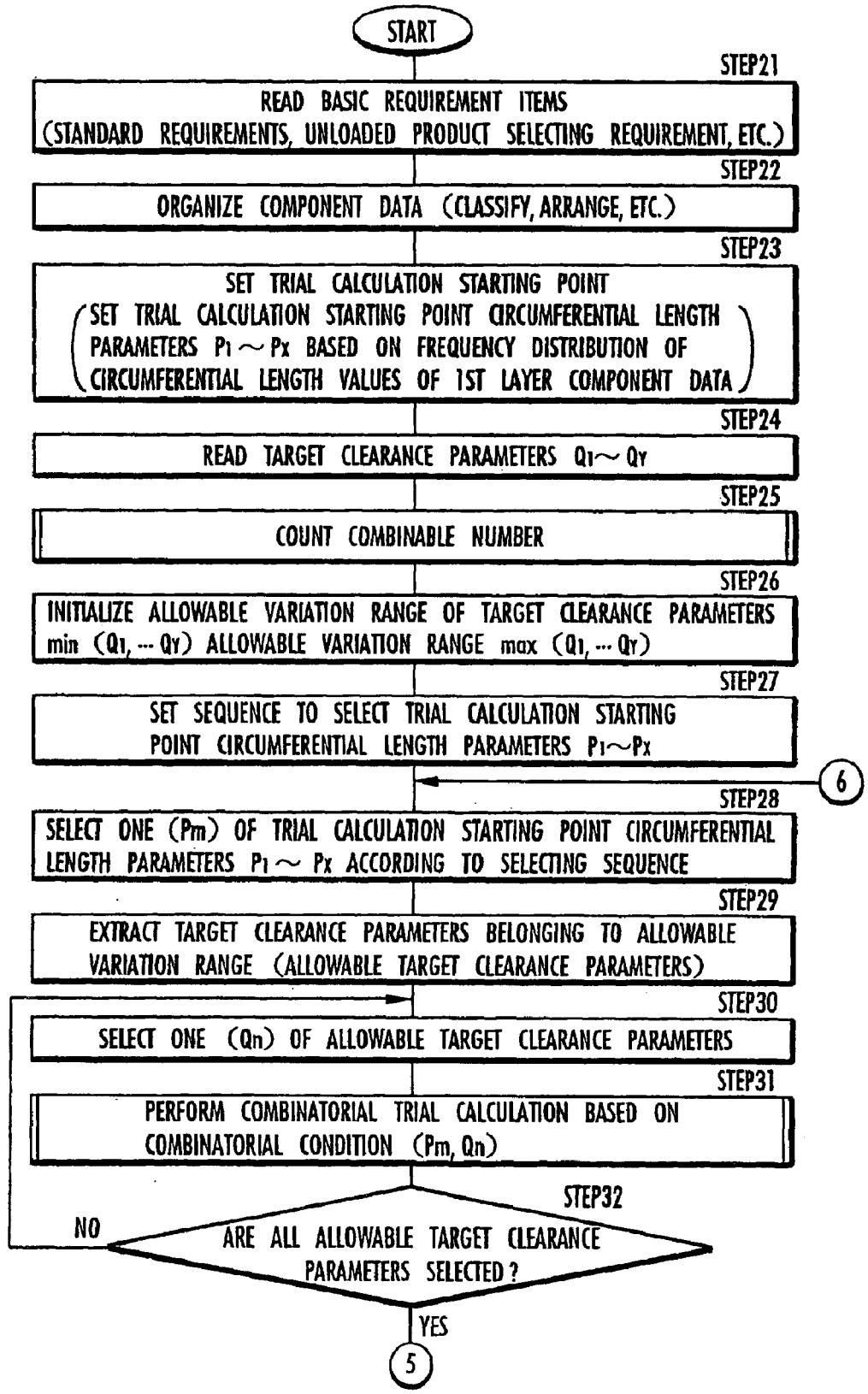
FIGS. 10 and 11 are flowcharts of an operation sequence according to a third embodiment of the present invention.
Figure 11:
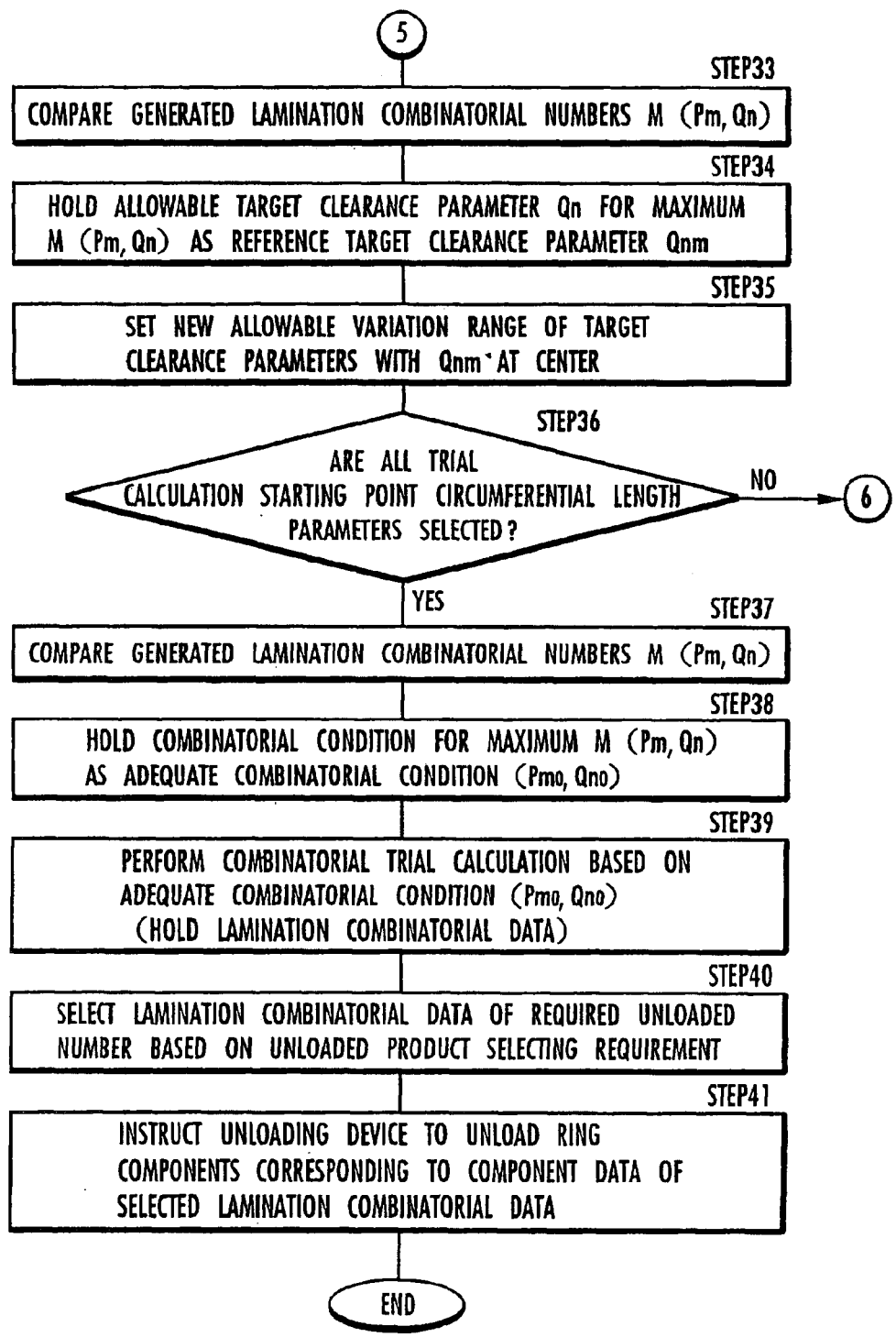

When there is a request to unload set ring components (4), the computer 13 executes an operation sequence shown in the flowcharts of FIGS. 10 and 11.

As shown in FIG. 10, the computer 13 carries out the same processing as in STEP1 and STEP2 (see FIG. 3) according to the first embodiment in STEP21 and STEP22 to read basic requirement items (the standard requirements of an inter-ring clearance $\Delta r$, a total clearance $\Sigma \Delta r$, and a first layer circumferential length difference $\Delta L1$), an unloaded product selecting requirement, etc. into the processing means 16, and organizes the component data stored by the component data managing means 15.

Then, the processing means 16 carries out a trial calculation starting point setting process for setting plural (X) trial calculation starting point circumferential length parameters $P_1$–$P_X$ prescribing the trial calculation starting point selecting conditions in STEP23. The number X of trial calculation starting point circumferential length parameters $P_1$–$P_X$ is determined in advance, e.g., 10, and the X trial calculation starting point circumferential length parameters $P_1$–$P_X$ are set as follows: In the following description of the present embodiment, the magnitudes of the trial calculation starting point circumferential length parameters $P_1$–$P_X$ are related as $P_1 < P_2 < \ldots < P_X$, for example.

Figure 12:
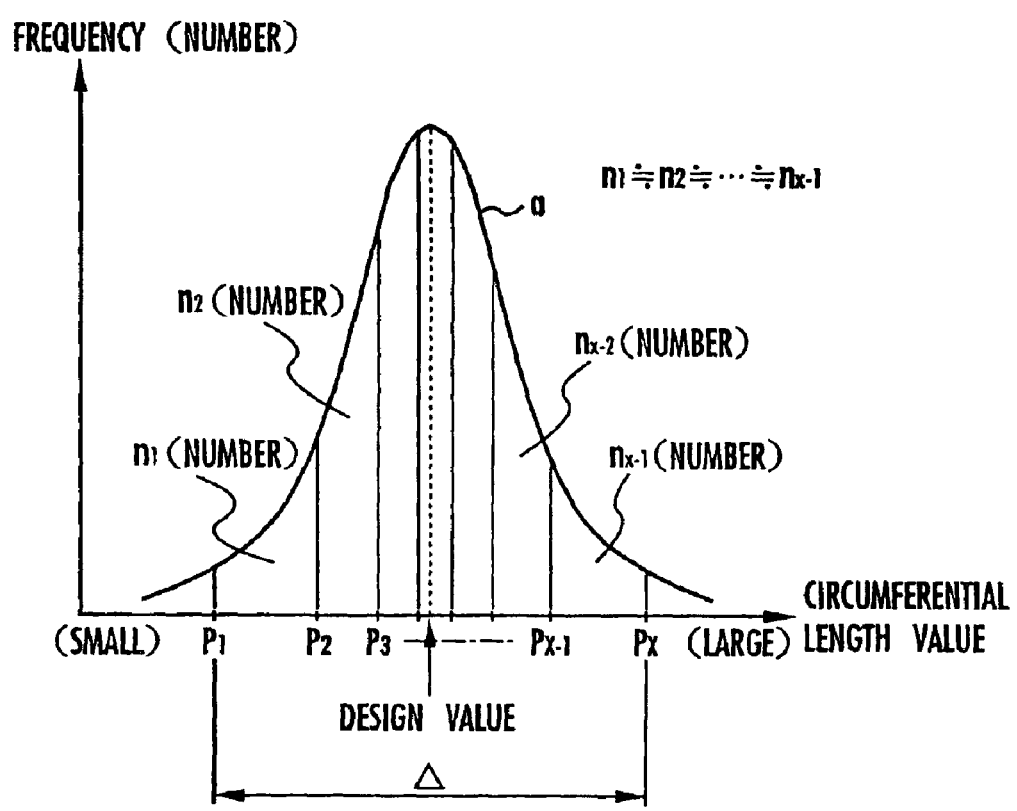
FIG. 12 is a graph illustrative of processing details of a portion of the flowchart shown in FIG. 10.

In STEP23, the processing means 16 generates frequency distribution data representing the relationship between the values of circumferential length value data of component data of the first layer stored by the component data managing means 15 and the number (frequency) of component data having those values. The generated frequency distribution data (which are data representing a frequency distribution of the circumferential length values of the ring component $4_1$ of the first layer stored by the component storage facility 10) are indicated by a curve a, for example, in FIG. 12. As shown in FIG. 12, the frequency distribution data represent such a distribution that the frequency is at a peak in the vicinity of the design value of the circumferential length of the ring component $4_1$ of the first layer, for example.

The processing means 16 then sets trial calculation starting point circumferential length parameters $P_1$–$P_X$ based on the frequency distribution data. More specifically, as shown in FIG. 12, the processing means 16 determines the values of trial calculation starting point circumferential length parameters $P_1$–$P_X$ such that the numbers $n_1, n_2, \ldots, n_{x-1}$ of the component data of the first layer respectively in the zones of (x−1) circumferential length values, i.e., the interval of $P_1$–$P_2$, the interval of $P_2$–$P_3$, ..., the interval of $P_{X-1}$–$P_X$, determined by the values of adjacent trial calculation starting point circumferential length parameters, in a given range Δ which has at its center the design value of the circumferential length of the ring component $4_1$ of the first layer.

When the trial calculation starting point circumferential length parameters $P_1$–$P_X$ are thus determined, in a circumferential length value range where the frequency of the component data of the first layer is relatively high, trial calculation starting point circumferential length parameters are set at relatively short circumferential length value intervals (the set trial calculation starting point circumferential length parameters are dense). Conversely, in a circumferential length value range where the frequency is relatively low, trial calculation starting point circumferential length parameters are set at relatively long circumferential length value intervals (the set trial calculation starting point circumferential length parameters are coarse). Thus, the X trial calculation starting point circumferential length parameters $P_1$–$P_X$ are set in a dense/coarse pattern depending on the frequency distribution data.

After having set the trial calculation starting point circumferential length parameters $P_1$–$P_X$ as described above, the computer 13 reads a plurality of target clearance parameters $Q_1$–$Q_Y$ prescribing the interlayer selecting condition into the processing means 16 in STEP24. In this case, a plurality of (e.g., 10) values that can be used as values of the target clearance parameters are stored in the hard disk or the like of the computer 13, as with the first embodiment.

Then, the computer 13 performs the same processing (combinable number counting process) as in STEP4 (see FIGS. 3 and 5) according to the first embodiment in STEP25 to count the number (combinable number) of component data of adjacent layers (second through Nth layers) that can be combined with the component data of the first through (N−1)th layers.

Then, the computer 13 initializes an allowable variation range of target clearance parameters in STEP26.

In combinatorial trial calculations according to the present embodiment, the trial calculation starting point circumferential length parameters $P_1$–$P_X$ set in STEP23 are successively selected, and an allowable variation range of target clearance parameters is set each time a trial calculation starting point circumferential length parameter is selected, as described later on. While changing the target clearance parameters to a plurality of values in the set allowable variation range with respect to the selected trial calculation starting point circumferential length parameters $P_1$–$P_X$, combinatorial trial calculations for generating lamination combinatorial data are carried out.

The allowable variation range initialized in STEP26 is an allowable variation range of target clearance parameters with respect to a trial calculation starting point circumferential length parameter that is selected at first. The initialized allowable variation range represents a range from minimum values (=min ($Q_1$, ..., $Q_Y$)) to maximum values (=max ($Q_1$, ..., $Q_Y$)) of the target clearance parameters $Q_1$–$Q_Y$ read in STEP24, i.e., a range containing all the target clearance parameters $Q_1$–$Q_Y$.

Then, the computer 13 sets a sequence to select the X trial calculation starting point circumferential length parameters $P_1$–$P_X$ that are set in STEP23 (a selecting sequence for combinatorial trial calculations described later on) in STEP27. In the present embodiment, the selecting sequence is set to the order from smaller values of the trial calculation starting point circumferential length parameters $P_1$–$P_X$, i.e., the order of suffixes of the trial calculation starting point circumferential length parameters $P_1$–$P_X$.

However, the selecting sequence may be set to the order from greater values of the trial calculation starting point circumferential length parameters $P_1$–$P_X$, or the order from values thereof that are closer to the design value of the circumferential length of the ring component $4_1$ of the first layer.

Then, the processing means 16 selects one trial calculation starting point circumferential length parameter (Pm) from the trial calculation starting point circumferential length parameters $P_1$–$P_X$ set in STEP23 according to the selecting sequence in STEP28. In the present embodiment, the first trial calculation starting point circumferential length parameter Pm that is selected is "$P_1$".

Then, the processing means 16 extracts target clearance parameters belonging to the presently set allowable variation range as an allowable target clearance parameter from the target clearance parameters $Q_1$–$Q_Y$ that have been read in STEP24 in STEP29. With the first trial calculation starting point circumferential length parameter ($P_1$ in the present embodiment) being selected in STEP28, the allowable variation range of target clearance parameters is the allowable variation range initialized in STEP26. Therefore, the target clearance parameters extracted with the first trial calculation starting point circumferential length parameter being selected are all the target clearance parameters $Q_1$–$Q_Y$ read in STEP24.

Then, the processing means 16 selects one target clearance parameter Qn from the target clearance parameters extracted in STEP29 in STEP30. Thereafter, the processing means 16 performs a combinatorial trial calculation to generate lamination combinatorial data based on one kind of combinatorial condition (Pm, Qn) that is determined by the selected target clearance parameter Qn and the trial calculation starting point circumferential length parameter Pm selected in STEP28 in STEP31. The combinatorial trial calculation is carried out in exactly the same fashion as with STEP7 (see FIGS. 3, 6 through 8) according to the first embodiment, thus generating lamination combinatorial data corresponding to the combinatorial condition (Pm, Qn) and determining and storing the generated lamination combinatorial number M (Pm, Qn) which represents the number of generated lamination combinatorial data.

Then, the processing means 16 decides whether all allowable target clearance parameters extracted in STE29 have been selected in STEP30 or not in STEP32. If there is an unselected allowable target clearance parameter, then the processing means 16 selects the unselected target clearance parameter Qn in STEP30. At this time, the trial calculation starting point circumferential length parameter Pm selected in STEP28 remains as it is. The combinatorial trial calculation in STEP31 is carried out based on a combinatorial condition that is determined by the newly selected target clearance parameter Qn and the presently selected trial calculation starting point circumferential length parameter Pm.

The processing means 16 selects the allowable target clearance parameter Qn in STEP30 by sequentially selecting the allowable target clearance parameters extracted in STEP29, one by one, in the order of their magnitudes.

After it has been confirmed in STEP32 that all the allowable target clearance parameters extracted in STEP29 are selected in STEP30, the processing means 16 compares generated lamination combinatorial numbers M (Pm, Qn) determined in STEP31 which correspond to various combinatorial conditions (Pm, Qn) that are determined by the present value of the trial calculation starting point circumferential length parameter Pm and the allowable target clearance parameters extracted in STEP29 in STEP33 as shown in the flowchart of FIG. 11. Based on the comparison, of the allowable target clearance parameters (extracted in STEP29) belonging to the presently set allowable variation range, one allowable target clearance parameter whose generated lamination combinatorial number M (Pm, Qn) is maximum is stored as a reference target clearance parameter Qnm relative to the presently selected trial calculation starting point circumferential length parameter Pm in STEP34.

Then, the processing means 16 newly sets a range of a predetermined width which has the reference target clearance parameter Qnm at its center as an allowable variable range of target clearance parameters for a combinatorial trial calculation on a newly selected trial calculation starting point circumferential length parameter in STEP35. If the above predetermined width is represented by D, then the allowable variation range is set to a range indicated by Qnm±(D/2).

The width (=D) of the allowable variation range set in STEP35 may be a predetermined fixed width, for example, or may be set appropriately depending on the variation (e.g., a standard deviation) of circumferential length values of the component data of each layer that are stored by the component data managing means 15. If the variation of circumferential length values of the component data of each layer is relatively large in all layers, then the width of the allowable variation range should preferably be relatively large. Conversely, if the variation is small in all layers, then the width of the allowable variation range should preferably be relatively small.

The allowable variation range set in STEP35 is set to a range smaller than the range (which is the allowable variation range initialized in STEP26) of circumferential length values from minimum to maximum values of the target clearance parameters $Q_1$–$Q_Y$ read in STEP24.

Then, the processing means 16 decides whether all the trial calculation starting point circumferential length parameters $P_1$ through $P_X$ read in STEP23 have been selected in STEP28 or not in STEP36. If there is an unselected trial calculation starting point circumferential length parameter, then the processing means 16 selects the unselected trial calculation starting point circumferential length parameter according to the selecting sequence in STEP28. Then, the processing in STEP29–STEP36 is carried out in the same manner as described above.

In this case (with one trial calculation starting point circumferential length parameter other than the first trial calculation starting point circumferential length parameter being selected), the allowable target clearance parameters extracted in STEP30 are target clearance parameters belonging to the allowable variation range (latest allowable variation range) set in STEP35 with a preceding trial calculation starting point circumferential length parameter Pm being selected. Therefore, the allowable target clearance parameters include the reference target clearance parameter Qnm obtained in STEP34 in association with the preceding trial calculation starting point circumferential length parameter Pm.

Each time one of the trial calculation starting point circumferential length parameters $P_1$–$P_X$ is selected according to the selecting sequence set in STEP27, a combinatorial trial calculation is carried out based on a combinatorial condition that is determined by each of a plurality of allowable target clearance parameters in a latest allowable variation range set immediately before the selection and a trial calculation starting point circumferential length parameter that is being selected. The allowable target clearance parameters for the trial calculation starting point circumferential length parameter in the first rank ($P_1$ in the present embodiment) are all the target clearance parameters $Q_1$–$Q_Y$ read in STEP24. The allowable target clearance parameters for the trial calculation starting point circumferential length parameters $P_2$–$P_X$ in the other ranks are limited to those target clearance parameters (which are fewer than Y) belonging to an allowable variation range having, at its center, the value of a target clearance parameter that maximizes the generated lamination combinatorial number corresponding to a trial calculation starting point circumferential length parameter that is selected immediately before.

Figure 13:
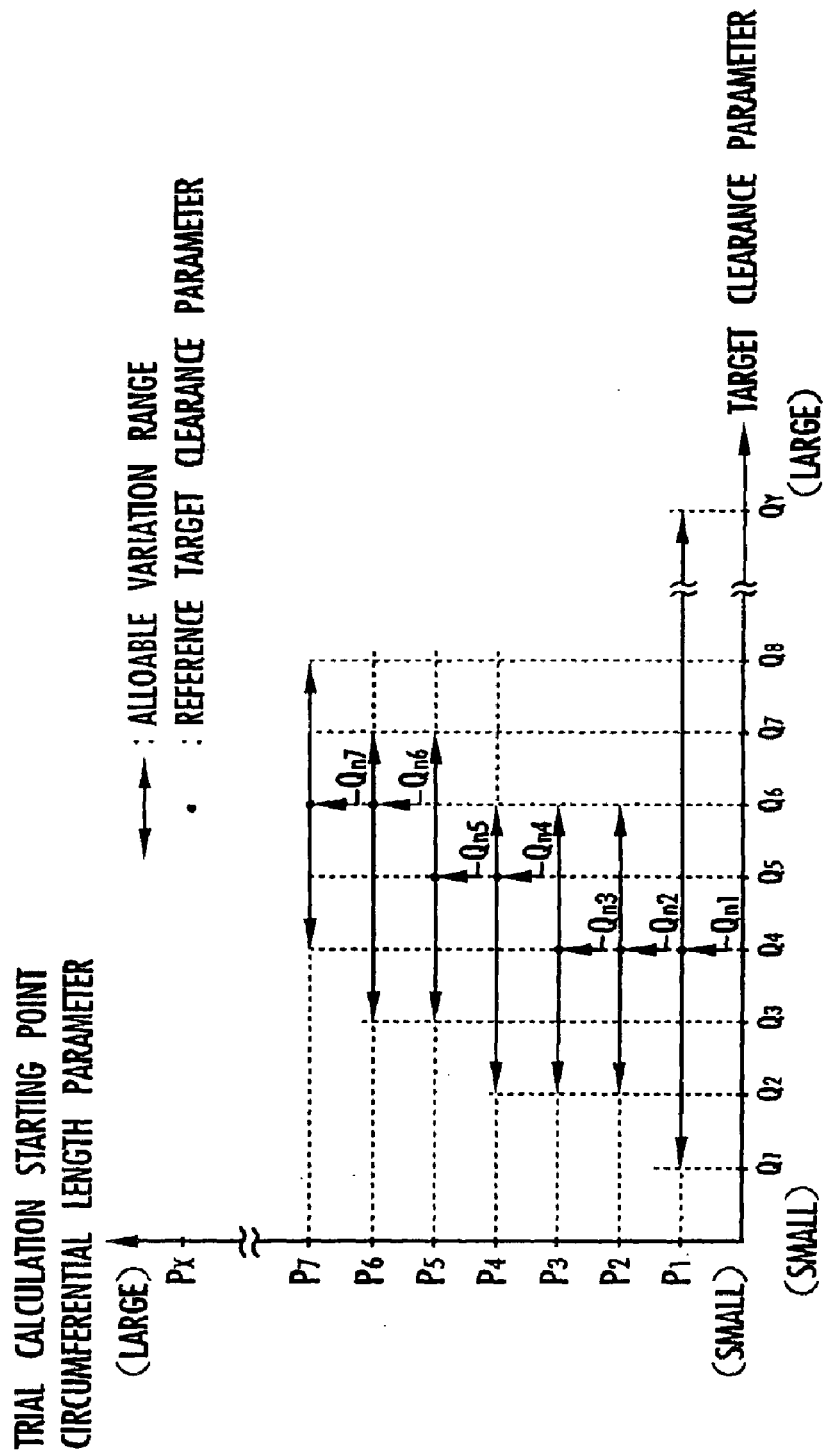
FIG. 13 is a diagram illustrative of processing details of the flowcharts shown in FIGS. 10 and 11.

FIG. 13 shows, by way of example, the manner in which allowable variation ranges of target clearance parameters are successively set in association with the respective trial calculation starting point circumferential length parameters $P_1$–$P_X$. In FIG. 13, it is assumed for illustrative purposes that the target clearance parameters $Q_1$–$Q_Y$ read in STEP24 are of such magnitudes that are related to each other by $Q_1 < Q_2 \ldots < Q_Y$ and the difference $|Qk+1-Qk|$ between adjacent target clearance parameters Qk+1, Qk (k=1, 2, ..., Y−1) and that the widths of the allowable variation ranges of the target clearance parameters corresponding to the trial calculation starting point circumferential length parameters $P_2$–$P_X$ other than the trial calculation starting point circumferential length parameter $P_1$ are constant.

As shown in FIG. 13, the allowable variation range of target clearance parameters with respect to the trial calculation starting point circumferential length parameter $P_1$ in the first rank is set to a range ($Q_1$–$Q_Y$) from the minimum value $Q_1$ to the maximum value $Q_Y$ of the target clearance parameters $Q_1$–$Q_Y$ read in STEP24. Therefore, the target clearance parameters belonging to the allowable variation range ($Q_1$–$Q_Y$) are all the target clearance parameters $Q_1$–$Q_Y$. Thus, when the trial calculation starting point circumferential length parameter P1 is selected, combinatorial trial calculations are carried out under respective Y combinatorial conditions ($P_1$, $Q_1$), ($P_1$, $Q_2$), . . . , ($P_1$, $Q_Y$).

At this time, if the reference target clearance parameter $Q_{n1}$ which maximizes the generated lamination combinatorial number M ($P_1$, Qn) (n=1, 2, . . . , Y) is $Q_4$, for example, then the allowable variation range of target clearance parameters with respect to the trial calculation starting point circumferential length parameter $P_2$ in the second rank is set to a range ($Q_2$–$Q_6$). The target clearance parameters belonging to this allowable variation range are five target clearance parameters $Q_2$, $Q_3$, . . . , $Q_6$. Therefore, when the trial calculation starting point circumferential length parameter $P_2$ is selected, combinatorial trial calculations are carried out under respective five combinatorial conditions ($P_2$, $Q_2$), ($P_2$, $Q_3$), . . . , ($P_2$, $Q_6$).

At this time, if the reference target clearance parameter $Q_{n2}$ which maximizes the generated lamination combinatorial number M ($P_2$, Qn) (n=2, 3, . . . , 6) is $Q_4$, for example, then the allowable variation range of target clearance parameters with respect to the trial calculation starting point circumferential length parameter $P_3$ in the third rank is set to a range ($Q_2$–$Q_6$) as with the allowable variation range with respect to the trial calculation starting point circumferential length parameter $P_2$. When the trial calculation starting point circumferential length parameter $P_3$ is selected, combinatorial trial calculations are carried out under respective five combinatorial conditions $(P_2, Q_2), (P_2, Q_3), \ldots, (P_2, Q_6)$.

Similarly, the allowable variation ranges target clearance parameters with respect to the trial calculation starting point circumferential length parameters $P_4, P_5, \ldots, P_X$ are successively set, and combinatorial trial calculations are carried out under a plurality of combinatorial conditions that are determined by target clearance parameters belonging to the allowable variation ranges and corresponding trial calculation starting point circumferential length parameters.

In the example shown in FIG. 13, the reference target clearance parameters $Q_{n3}, Q_{n4}, Q_{n5}, Q_{n6}, Q_{n7}$ obtained by combinatorial trial calculations with the respective trial calculation starting point circumferential length parameters $P_3, P_4, P_5, P_6, P_7$ selected are respectively the target clearance parameters $Q_4, Q_5, Q_5, Q_6, Q_6$. Consequently, the allowable variation range $(Q_2-Q_6)$ with respect to the trial calculation starting point circumferential length parameters $P_2, P_3, P_4$, the allowable variation range $(Q_3-Q_7)$ with respect to the trial calculation starting point circumferential length parameters $P_5, P_6$, and the allowable variation range $(Q_4-Q_8)$ with respect to the trial calculation starting point circumferential length parameter $P_7$ are different from each other.

Referring back to the flowchart of FIG. 11, if it is confirmed in STEP36 that all the trial calculation starting point circumferential length parameters $P_1-P_X$ set in STEP23 have been selected in STEP28, then the processing means 16 carries out the same processing as in STEP10 through STEP14 (see FIG. 4) according to the first embodiment in STEP37 through STEP41. Specifically, a combinatorial condition (Pm, Qn) which maximizes the generated lamination combinatorial number is set as an adequate combinatorial condition (Pm, Qn), and as many lamination combinatorial data as the required unloaded number are selected from lamination combinatorial data generated under the adequate combinatorial condition (Pm, Qn). Set ring components (4) corresponding to the selected lamination combinatorial data are removed from the component storage facility 10 by the unloading device 12 that is instructed by the computer 13, supplied to the laminating device 14, and assembled into a laminated ring 3 by the laminating device 14.

The apparatus according to the present embodiment offers the same advantages as those according to the first embodiment, and also offers the following advantages: In the present embodiment, the trial calculation starting point circumferential length parameters $P_1-P_X$ that prescribe the trial calculation starting point selecting condition are set in a coarse/dense pattern depending on the frequency distribution of the circumferential length values of the ring components of the first layer that are stored by the product storage facility 10 as shown in FIG. 12.

With respect to the trial calculation starting point selecting condition, even if many trial calculation starting point circumferential length parameters Pm are set in a circumferential length value range where the frequency is relatively low, the selecting sequences of the component data of the first layer that are prescribed by the values of the trial calculation starting point circumferential length parameters Pm are highly likely to be the same as each other. As a result, it is highly likely to generate identical lamination combinatorial data in combinatorial trial calculations with respect to trial calculation starting point circumferential length parameters Pm that are different from each other. Therefore, the possibility of unnecessary combinatorial trial calculations is high. Conversely, even if many trial calculation starting point circumferential length parameters Pm are set in a circumferential length value range where the frequency is relatively high, the selecting sequences of the component data of the first layer that are prescribed by the values of the trial calculation starting point circumferential length parameters Pm are highly likely to be different from each other. As a result, it is highly likely to generate different lamination combinatorial data in combinatorial trial calculations with respect to trial calculation starting point circumferential length parameters Pm that are different from each other. According to the present embodiment, in a circumferential length value range where the frequency is relatively high, many trial calculation starting point circumferential length parameters are set, and in a circumferential length value range where the frequency is relatively low, the number of set trial calculation starting point circumferential length parameters is reduced.

As a consequence, it is easy to find a combinatorial condition to increase the generated lamination combinatorial number M (Pm, Qn), and unnecessarily many trial calculation starting point circumferential length parameters are prevented from being set, thus preventing combinatorial trial calculations from being performed based on unnecessarily many combinatorial conditions, so that an adequate combinatorial condition M (Pm0, Qn0) can be found efficiently.

In the present embodiment, with respect to the first trial calculation starting point circumferential length parameter ($P_1$ in the present embodiment) selected for combinatorial trial calculations, of the trial calculation starting point circumferential length parameters $P_1-P_X$, combinatorial trial calculations are performed under Y combinatorial conditions combining predetermined Y target clearance parameters $Q_1-Q_Y$. With respect to the second and subsequent trial calculation starting point circumferential length parameters selected for combinatorial trial calculations, combinatorial trial calculations are performed under combinatorial conditions combining only those target clearance parameters belonging to an allowable variation range set based on the results of the combinatorial trial calculation relative to the trial calculation starting point circumferential length parameter selected in the preceding rank.

Specifically, when a change in the value of a trial calculation starting point circumferential length parameter for changing the combinatorial condition is small, the generated lamination combinatorial numbers M (Pm, Qn) with respect to trial calculation starting point circumferential length parameters before and after the change are considered to tend not to differ largely from each other. For example, it is assumed that a target clearance parameter that maximizes the generated lamination combinatorial number when a combinatorial trial calculation is performed in combination with a trial calculation starting point circumferential length parameter Pj selected in the jth rank is represented by Qk. At this time, a target clearance parameter that maximizes the generated lamination combinatorial number when a combinatorial trial calculation is performed in combination with a trial calculation starting point circumferential length parameter Pj+1 (whose value is close to Pj) selected in the (j+1)th rank is highly likely to have a value close to Qk. Therefore, by setting an allowable variable range of target clearance parameters according to the present invention, the number of target clearance parameters selected to change the combinatorial condition can be limited to a necessary number. As a result, the time required for a combinatorial trial calculation can be shortened to allow the combinatorial trial calculation to be performed efficiently.

In the present embodiment, the process of setting trial calculation starting point circumferential length parameters depending on the frequency distribution of circumferential length values of the ring components 41 of the first layer and the process of appropriately setting an allowable variable range of target clearance parameters with respect to each of the trial calculation starting point circumferential length parameters are performed together. However, only one of these processes may be performed.

A fourth embodiment of the present invention will be described below with reference to FIGS. 14 and 15. The apparatus according to the fourth embodiment is identical to the apparatus according to the first embodiment, but only the processing carried out by the processing means 16 of the computer 13 according to the fourth embodiment is different from that according to the first embodiment. Therefore, those structural details according to the fourth embodiment which are identical to those of the first embodiment are denoted by identical reference characters, and will not be described in detail below.

Figure 14:
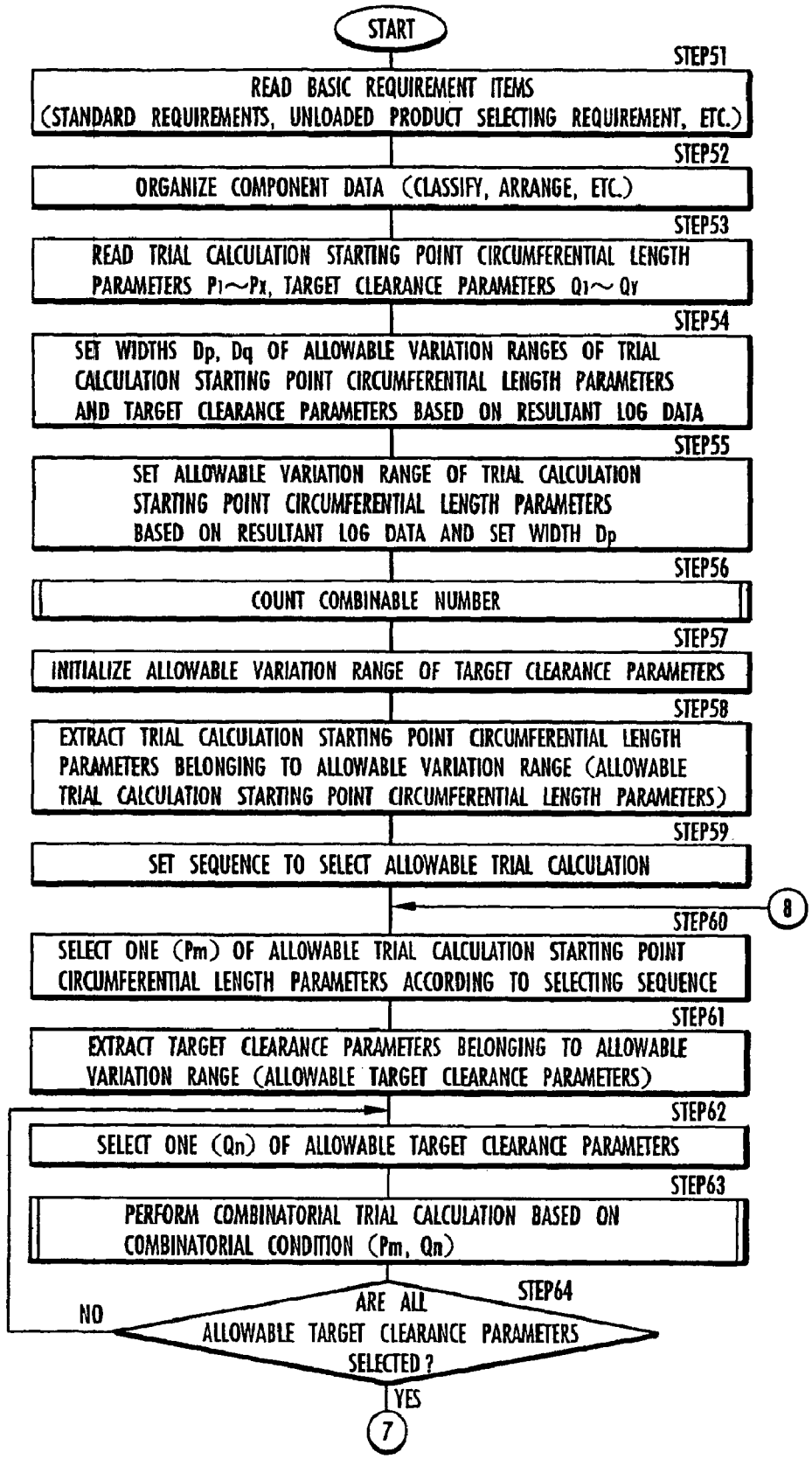
FIGS. 14 and 15 are flowcharts of an operation sequence according to a fourth embodiment of the present invention.
Figure 15:
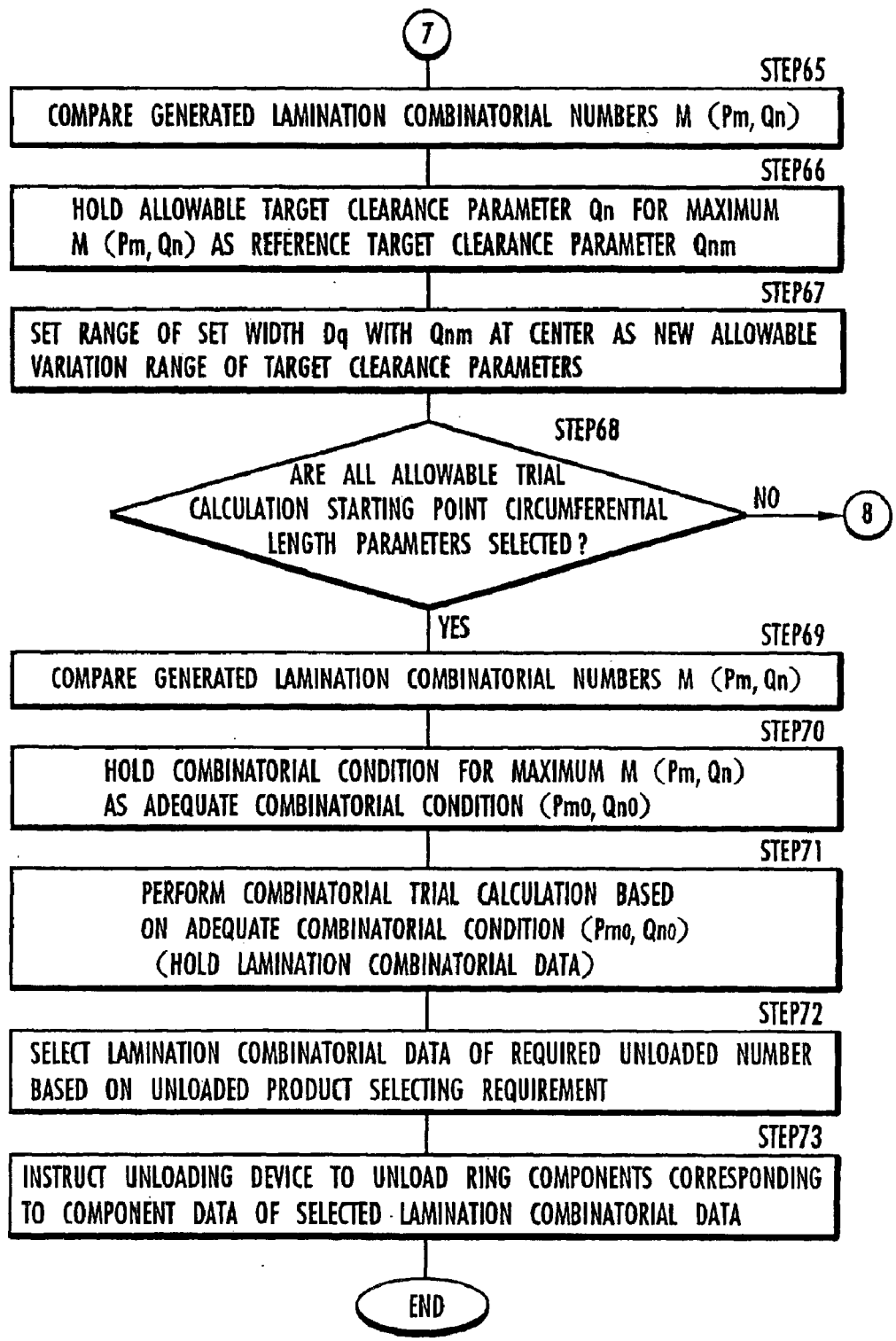

When there is a request to unload set ring components (4), the computer 13 executes an operation sequence shown in the flowcharts of FIGS. 14 and 15.

As shown in FIG. 14, the computer 13 carries out the same processing as in STEP1 and STEP2 (see FIG. 3) according to the first embodiment in STEP51 and STEP52 to read basic requirement items (the standard requirements of an inter-ring clearance $\Delta r$, a total clearance $\Sigma \Delta r$, and a first layer circumferential length difference $\Delta L1$), an unloaded product selecting requirement, etc. into the processing means 16, and organizes the component data stored by the component data managing means 15.

The computer 13 reads a plurality of (X) trial calculation starting point circumferential length parameters $P_1-P_X$ stored in the hard disk or the like as values which can be taken by trial calculation starting point circumferential length parameters prescribing a trial calculation starting point selecting condition, and a plurality of (Y) target clearance parameters $Q_1-Q_Y$ stored in the hard disk or the like as values which can be taken by target clearance parameters prescribing an interlayer selecting condition, into the processing means 16 in STEP53.

Then, the computer 13 refers to resultant log data obtained when a combinatorial trial calculation was performed, as described later on, upon a preceding unloading request, and sets the width Dp of an allowable variation range of trial calculation starting point circumferential length parameters and the width Dq of an allowable variation range of target clearance parameters based on the resultant log data in STEP54.

The allowable variation range of target clearance parameters has the same meaning as the allowable variation range described with respect to the third embodiment, and prescribes a variation range of the values of target clearance parameters that are actually selected in combinatorial trial calculations. The same holds true for the allowable variation range of trial calculation starting point circumferential length parameters.

The resultant log data are data representative of the relationship between each of a plurality of combinatorial conditions (Pm, Qn) prescribed by the plural values of trial calculation starting point circumferential length parameters and the plural values of target clearance parameters and the number of lamination combinatorial data generated under each of the combinatorial conditions, i.e., the generated lamination combinatorial number M (Pm, Qn), and were obtained when the process according to the present invention was carried out upon a preceding unloading request.

In STEP54, the width Dp of an allowable variation range of trial calculation starting point circumferential length parameters and the width Dq of an allowable variation range of target clearance parameters are set, using a predetermined data table or the like, from the magnitude of the maximum value of the generated lamination combinatorial number M (Pm, Qn) in the resultant log data, i.e., the magnitude of the generated lamination combinatorial number M (Pm, Qn) relative to the adequate combinatorial condition (Pm0, Qn0) obtained upon a preceding unloading request. Either of the widths Dp, Dq of these allowable variation ranges is set to a smaller value as the maximum value of the generated lamination combinatorial number M (Pm, Qn) in the resultant log data is larger, and set to a greater value as the maximum value of the generated lamination combinatorial number M (Pm, Qn) is smaller.

Then, the computer 13 sets an allowable variation range of trial calculation starting point circumferential length parameters based on the resultant log data and the width Dp of the allowable variation range set in STEP54 in STEP55. More specifically, a range having the width Dp set in STEP54 which has, at its center, the value of the trial calculation starting point circumferential length parameter which maximizes the generated lamination combinatorial number M (Pm, Qn), i.e., the value of the trial calculation starting point circumferential length parameter Pm0 relative to the adequate combinatorial condition (Pm0, Qn0) in the resultant log data, is set as an allowable variation range of trial calculation starting point circumferential length parameters. If the value of the trial calculation starting point circumferential length parameter which maximizes the generated lamination combinatorial number M (Pm, On) is represented by Pk, then an allowable variation range of trial calculation starting point circumferential length parameters is set to a range expressed by Pk±(Dp/2).

Then, the processing means 16 performs the same processing (combinable number counting process) as in STEP4 (see FIGS. 3 and 5) according to the first embodiment in STEP56 to count the number (combinable number) of component data of adjacent layers (second through Nth layers) that can be combined with the component data of the first through (N−1)th layers.

Then, the computer 13 performs the same processing as in STEP26 (see FIG. 10) according to the third embodiment in STEP57 to initialize an allowable variation range of target clearance parameters. Specifically, an allowable variation range of target clearance parameters relative to a first trial calculation starting point circumferential length parameter selected for a combinatorial trial calculation as described later on, is set to a range that contains all target clearance parameters $Q_1-Q_Y$ read in STEP 53.

Then, the computer 13 extracts trial calculation starting point circumferential length parameters belonging to the allowable variation range set in STEP55 as allowable trial calculation starting point circumferential length parameters, from the X trial calculation starting point circumferential length parameters $P_1-P_X$ read in STEP53 in STEP58.

Then, the computer 13 sets a sequence to select the extracted allowable trial calculation starting point circumferential length parameters in STEP59. The selecting sequence is set to the order from values closer to the value (Pk) of the trial calculation starting point circumferential length parameter which maximizes the generated lamination combinatorial number M (Pm, Qn), i.e., the central value of the allowable variation range of the trial calculation starting point circumferential length parameters.

Then, the computer 13 selects one allowable trial calculation starting point circumferential length parameter (Pm) from the allowable trial calculation starting point circumferential length parameters extracted in STEP58 in STEP60. Thereafter, the processing means 16 performs the same processing as in STEP30 through STEP33 (see FIG. 10) according to the third embodiment in STEP61 through STEP64. Specifically, the processing means 16 successively selects target clearance parameters (allowable target clearance parameters) belonging to the presently set allowable variation range (which is the allowable variation range set in STEP57 with the allowable trial calculation starting point circumferential length parameter in the first rank being selected), of the Y target clearance parameters $Q_1-Q_Y$ read in STEP53. Each time the processing means 16 successively selects a target clearance parameter, the processing means 16 performs the combinatorial trial calculation as described above in the first embodiment based on the combinatorial condition (Pm, Qn) determined by the selected allowable target clearance parameter Qn and the previously selected allowable trial calculation starting point circumferential length parameter Pm.

If the processing means 16 has selected all the allowable target clearance parameters extracted in STEP61 in STEP64 (YES), then the processing means 16 performs the same processing as in STEP33 and STEP34 according to the third embodiment in STEP65 and STEP66 as shown in FIG. 15. Specifically, the processing means 16 stores the allowable target clearance parameter which maximizes the generated lamination combinatorial number M (Pm, Qn) determined in STEP63 which corresponds to various combinatorial conditions (Pm, Qn) that are determined by one trial calculation starting point circumferential length parameter Pm selected in STEP60 and each of the allowable target clearance parameters belonging to the allowable variation range presently set with respect to the target clearance parameters, as a reference target clearance parameter Qnm corresponding to the presently selected trial calculation starting point circumferential length parameter Pm.

Then, the processing means 16 sets a range which has the reference target clearance parameter Qnm at its center and the width Dq set in STEP54, i.e., a range indicated by Qnm±(Dq/2), as a new allowable variable range of target clearance parameters at the time an allowable trial calculation starting point circumferential length parameter in a next rank is selected in STEP67.

Then, the processing means 16 decides whether all the allowable trial calculation starting point circumferential length parameters extracted in STEP58 have been selected in STEP60 or not in STEP68. If there is an unselected allowable trial calculation starting point circumferential length parameter, then the processing means 16 selects the unselected trial calculation starting point circumferential length parameter according to the selecting sequence in STEP60. Then, the processing in STEP61-STEP68 is carried out in the same manner as described above.

If it is confirmed in STEP68 that all the allowable trial calculation starting point circumferential length parameters have been selected in STEP60, then the processing means 16 carries out the same processing as in STEP10 through STEP14 according to the first embodiment in STEP69 through STEP73. Specifically, a combinatorial condition (Pm, Qn) which maximizes the generated lamination combinatorial number is set as an adequate combinatorial condition (Pm, Qn), and as many lamination combinatorial data as the required unloaded number are selected from lamination combinatorial data generated under the adequate combinatorial condition (Pm, Qn). Set ring components (4) corresponding to the selected lamination combinatorial data are removed from the component storage facility 10 by the unloading device 12 that is instructed by the computer 13, supplied to the laminating device 14, and assembled into a laminated ring 3 by the laminating device 14.

The apparatus according to the present embodiment offers the same advantages as those according to the first embodiment, and also offers the following advantages: In the present embodiment, an allowable variation range of trial calculation starting point circumferential length parameters is determined based on resultant log date upon a preceding unloading request. Specifically, if a required unloaded number upon a preceding unloading request is smaller than the total number of ring components stored by the component storage facility 10, then it is highly possible that the generated lamination combinatorial number is maximum when a trial calculation starting point circumferential length parameter in the vicinity of the value of the trial calculation starting point circumferential length parameter Pm0 relative to the adequate combinatorial condition (Pm0, Qn0) found in the combinatorial trial calculation upon the preceding unloading request is selected for the combinatorial trial calculation. In the present embodiment, an allowable variation range of trial calculation starting point circumferential length parameters relative to the present combinatorial trial calculation is set to a starting point circumferential length parameter Pm0 recognized by preceding resultant log data, and an allowable variation range of trial calculation starting point circumferential length parameters in that allowable variation range is actually selected for the combinatorial trial calculation. In the present embodiment, the width Dp of the allowable variation range of trial calculation starting point circumferential length parameters is set depending on the magnitude of the generated lamination combinatorial number relative to the adequate combinatorial condition (Pm0, Qn0) in the preceding resultant log data. As a result, the number of trial calculation starting point circumferential length parameters selected for the combinatorial trial calculation can be limited to a necessary value, and the time required for a combinatorial trial calculation can be shortened to allow the combinatorial trial calculation to be performed efficiently.

According to the present embodiment, as with the third embodiment, the allowable variation range of target clearance parameters is variably set with respect to each of the trial calculation starting point circumferential length parameters. The width Dq of the allowable variation range is set depending on the magnitude of the generated lamination combinatorial number relative to the adequate combinatorial condition (Pm0, Qn0) in the preceding resultant log data. As a result, the number of trial calculation starting point circumferential length parameters selected for the combinatorial trial calculation can be limited to a necessary value, and the time required for a combinatorial trial calculation can be shortened to allow the combinatorial trial calculation to be performed efficiently.

In the present embodiment, target clearance parameters are varied with respect to each of the trial calculation starting point circumferential length parameters in combinatorial trial calculations. However, for example, an allowable variation range of target clearance parameters may be set based on the preceding resultant log data, and combinatorial trial calculations may be performed while changing trial calculation starting point circumferential length parameters relative to each of target clearance parameters belonging to the allowable variation range.

A fifth embodiment of the present invention will be described below with reference to FIGS. 16 and 17. The apparatus according to the fifth embodiment is identical to the apparatus according to the first embodiment, but only the processing carried out by the processing means 16 of the computer 13 according to the fifth embodiment is different from that according to the first embodiment. Therefore, those structural details according to the fifth embodiment which are identical to those of the first embodiment are denoted by identical reference characters, and will not be described in detail below.

Figure 16:
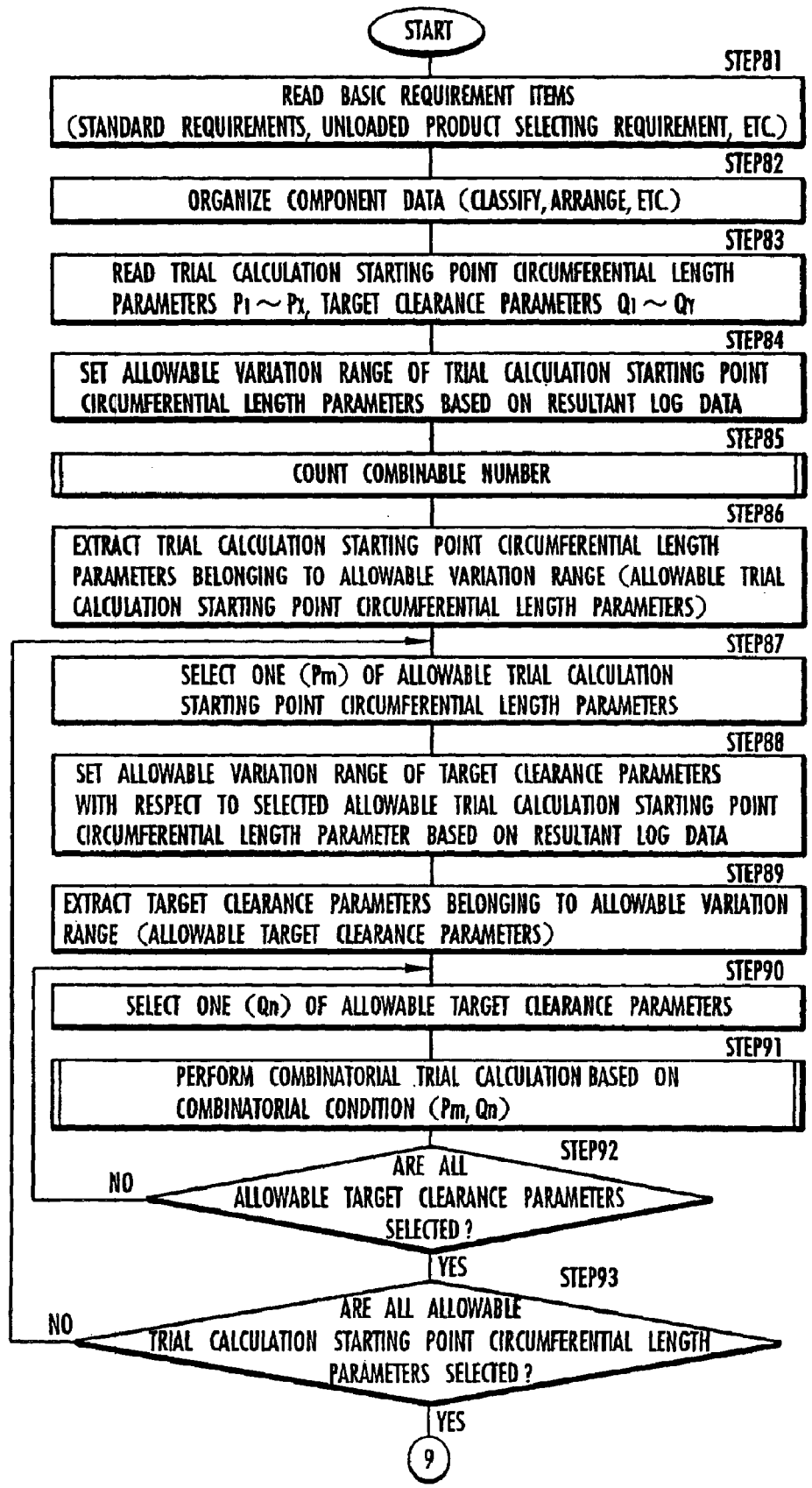
FIGS. 16 and 17 are flowcharts of an operation sequence according to a fifth embodiment of the present invention.
Figure 17:
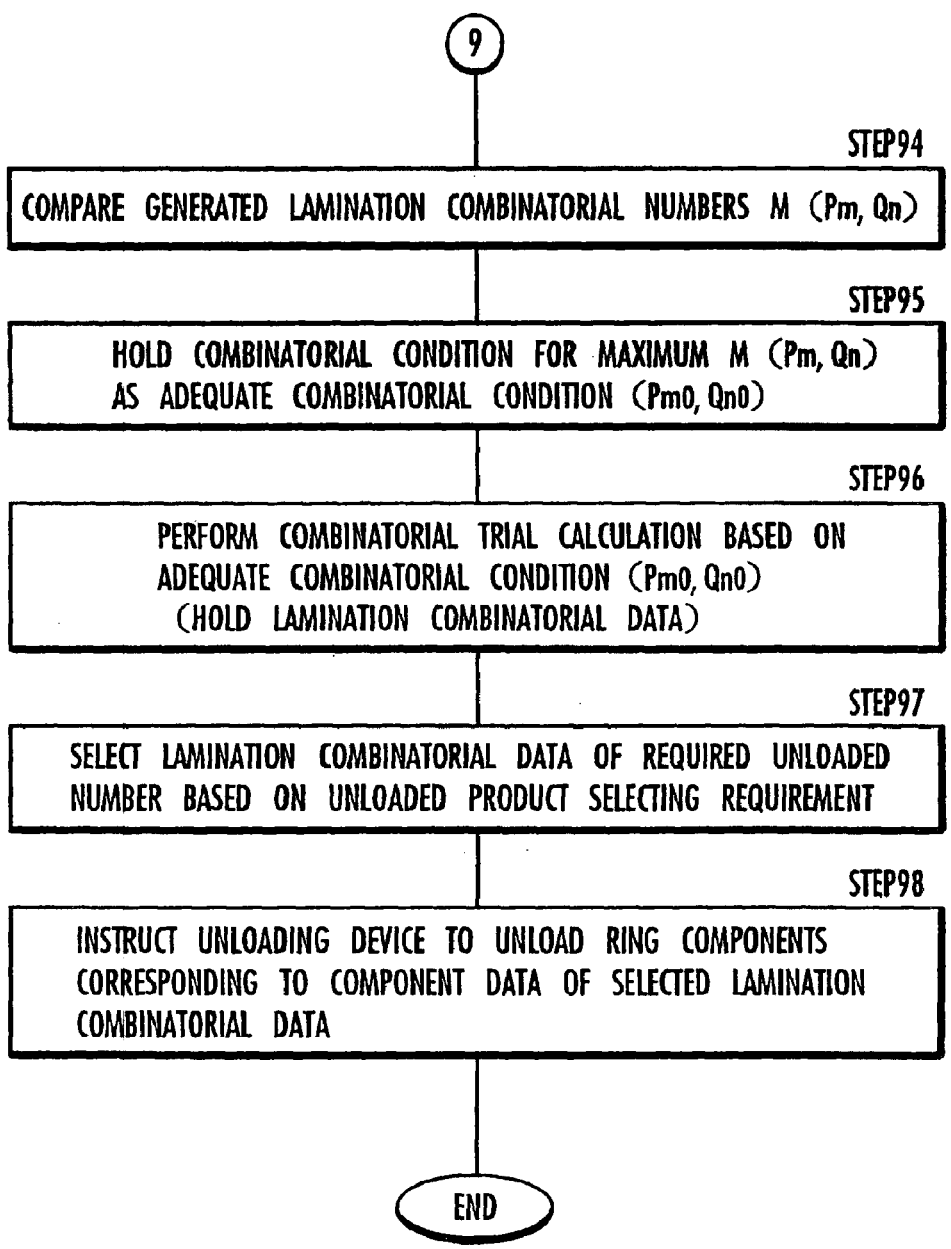

When there is a request to unload set ring components (4), the computer 13 executes an operation sequence shown in the flowcharts of FIGS. 16 and 17.

As shown in FIG. 16, the computer 13 carries out the same processing as in STEP1 and STEP2 (see FIG. 3) according to the first embodiment in STEP81 and STEP82 to read basic requirement items (the standard requirements of an inter-ring clearance Δr, a total clearance ΣΔr, and a first layer circumferential length difference ΔL1), an unloaded product selecting requirement, etc. into the processing means 16, and organizes the component data stored by the component data managing means 15.

The computer 13 reads a plurality of (X) trial calculation starting point circumferential length parameters $P_1-P_X$ stored in the hard disk or the like as values which can be taken by trial calculation starting point circumferential length parameters prescribing a trial calculation starting point selecting condition, and a plurality of (Y) target clearance parameters $Q_1-Q_Y$ stored in the hard disk or the like as values which can be taken by target clearance parameters prescribing an interlayer selecting condition, into the processing means 16 in STEP83.

Then, the computer 13 refers to resultant log data obtained when a combinatorial trial calculation was performed, as described later on, upon a preceding unloading request, and sets an allowable variation range of trial calculation starting point circumferential length parameters based on the resultant log data in STEP84.

In the present embodiment, it is assumed that combinatorial trial calculations have been performed according to the first embodiment upon a preceding unloading request. Specifically, upon a preceding unloading request, combinatorial trial calculations have been carried out under X×Y combinatorial conditions using all X trial calculation starting point circumferential length parameters $P_1-P_X$ and Y target clearance parameters $Q_1-Q_Y$. The resultant log data are data representative of the relationship between the X×Y combinatorial conditions (Pm, Qn) and the number of lamination combinatorial data generated under the combinatorial conditions (Pm, Qn) (=generated lamination combinatorial number M (Pm, Qn)).

In STEP84, an allowable variation range of trial calculation starting point circumferential length parameters is set based on the resultant log data as an allowable variation range having a predetermined width and also having, at its center, the value of a trial calculation starting point circumferential length parameter which maximizes the generated lamination combinatorial number M (Pm, Qn) in the resultant log data, for example. Specifically, if he value of a trial calculation starting point circumferential length parameter which maximizes the generated lamination combinatorial number M (Pm, Qn) in the resultant log data is represented by Pk and the predetermined width by Dp in the resultant log data, then the allowable variation range of trial calculation starting point circumferential length parameters is set to a range expressed by Pk±(Dp/2).

The width (=Dp) of the allowable variation range may be a predetermined fixed width or may be determined depending on the magnitude of the maximum value of the generated lamination combinatorial number M (Pm, Qn) in the resultant log data, as described above with respect to the fourth embodiment.

Then, the processing means 16 performs the same processing (combinable number counting process) as in STEP4 (see FIGS. 3 and 5) according to the first embodiment in STEP85 to count the number (combinable number) of component data of adjacent layers (second through Nth layers) that can be combined with the component data of the first through (N−1)th layers.

Then, the processing means 16 extracts trial calculation starting point circumferential length parameters belonging to the allowable variation range set in STEP84 as allowable trial calculation starting point circumferential length parameters, from the trial calculation starting point circumferential length parameters $P_1-P_X$ read in STEP83 in STEP86.

Then, the processing means 16 selects one allowable trial calculation starting point circumferential length parameter (Pm) from the allowable trial calculation starting point circumferential length parameters extracted in STEP86 in STEP87. While the processing means 16 may select the allowable trial calculation starting point circumferential length parameters in any sequence, it selects them in the order of the magnitudes of their values, for example.

Then, the processing means 16 sets an allowable variation range of target clearance parameters corresponding to the allowable trial calculation starting point circumferential length parameter Pm selected in STE87 based on the resultant log data used in STEP84 in STEP88. More specifically, a range having a predetermined width and also having, at its center, the value of the target clearance parameter relative to the maximum generated lamination combinatorial number of generated lamination combinatorial numbers M (Pm, $Q_1$), M (Pm, $Q_2$), ..., M (Pm, $Q_Y$) corresponding to the presently selected allowable trial calculation starting point circumferential length parameter Pm in the resultant log data, is selected as an allowable variation range of target clearance parameters corresponding to the presently selected allowable trial calculation starting point circumferential length parameter Pm. For example, if M (Pm, $Q_4$) represents the maximum one of the generated lamination combinatorial numbers M (Pm, $Q_1$), M (Pm, $Q_2$), ..., M (Pm, $Q_Y$) in the resultant log data, then a range having a predetermined width and also having, at its center, the value of the target clearance parameter $Q_4$ is set as an allowable variation range of target clearance parameters.

The predetermined width is set depending on the magnitude of the maximum value of the generated lamination combinatorial numbers M (Pm, $Q_1$), M (Pm, $Q_2$), ..., M (Pm, $Q_Y$), for example (the predetermined width is greater as the maximum value is smaller).

After having set an allowable variation range of target clearance parameters corresponding to the presently selected allowable trial calculation starting point circumferential length parameter Pm, the processing means 16 performs the same processing as in STEP29 through STEP32 (see FIG. 10) according to the third embodiment in STEP89 through STEP92. Specifically, the processing means 16 successively selects target clearance parameters (allowable target clearance parameters) belonging to the allowable variation range belonging to the allowable variation range set in STEP82, of the Y target clearance parameters $Q_1$–$Q_Y$ read in STEP83. Each time the processing means 16 successively selects a target clearance parameter, the processing means 16 performs the combinatorial trial calculation as described above in the first embodiment based on the combinatorial condition (Pm, Qn) determined by the selected allowable target clearance parameter Qn and the previously selected allowable trial calculation starting point circumferential length parameter Pm.

If the processing means 16 has selected all the allowable target clearance parameters extracted in STEP89 in STEP92 (YES), then the processing means 16 decides whether all the allowable trial calculation starting point circumferential length parameters extracted in STEP86 have been selected in STEP87 or not in STEP93. If there is an unselected allowable trial calculation starting point circumferential length parameter, then the processing means 16 selects the unselected trial calculation starting point circumferential length parameter in STEP87. Then, the processing in STEP88–STEP93 is carried out in the same manner as described above.

If it is confirmed in STEP87 that all the allowable trial calculation starting point circumferential length parameters have been selected in STEP93, then the processing means 16 carries out the same processing as in STEP10 through STEP14 according to the first embodiment in STEP94 through STEP98. Specifically, a combinatorial condition (Pm, Qn) which maximizes the generated lamination combinatorial number is set as an adequate combinatorial condition (Pm0, Qn0), and as many lamination combinatorial data as the required unloaded number are selected from lamination combinatorial data generated under the adequate combinatorial condition (Pm0, Qn0). Set ring components (4) corresponding to the selected lamination combinatorial data are removed from the component storage facility 10 by the unloading device 12 that is instructed by the computer 13, supplied to the laminating device 14, and assembled into a laminated ring 3 by the laminating device 14.

The apparatus according to the present embodiment offers the same advantages as those according to the first embodiment, and also offers the same advantages as those according to the fourth embodiment.

Specifically, allowable variation ranges of trial calculation starting point circumferential length parameters and target clearance parameters are determined based on resultant log date upon a preceding unloading request. The widths of the allowable variation ranges are set depending on the maximum value of the generated lamination combinatorial numbers in the resultant log data. As a result, the numbers of trial calculation starting point circumferential length parameters and target clearance parameters can be limited to necessary values, and the time required for a combinatorial trial calculation can be shortened.

A sixth embodiment of the present invention will be described below with reference to FIGS. 18 through 22. The apparatus according to the sixth embodiment is identical to the apparatus according to the first embodiment, but only the processing carried out by the processing means 16 of the computer 13 according to the sixth embodiment is different from that according to the first embodiment. Therefore, those structural details according to the sixth embodiment which are identical to those of the first embodiment are denoted by identical reference characters, and will not be described in detail below.

Figure 18:
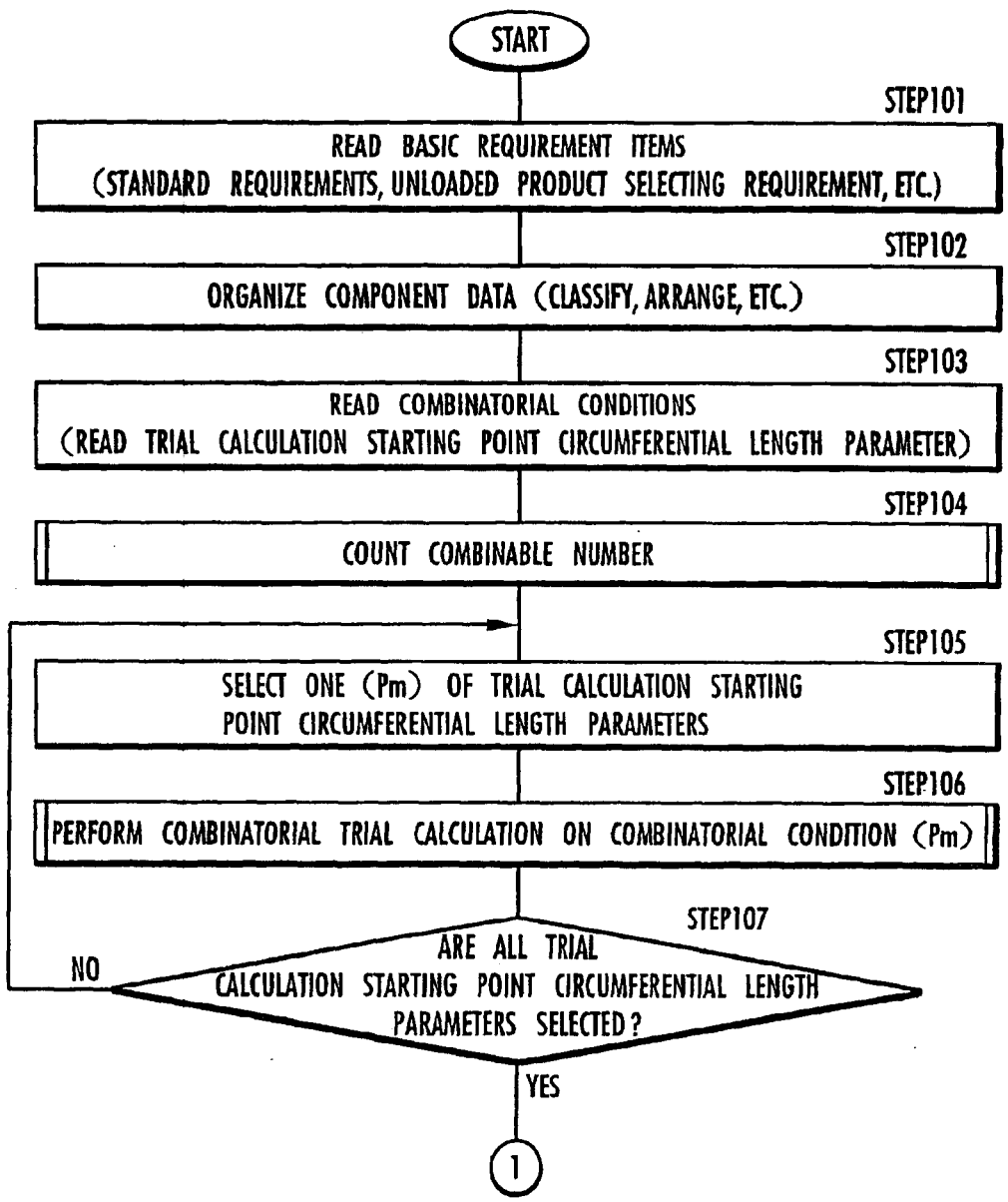
FIGS. 18 through 22 are flowcharts of an operation sequence according to a sixth embodiment of the present invention.
Figure 19:
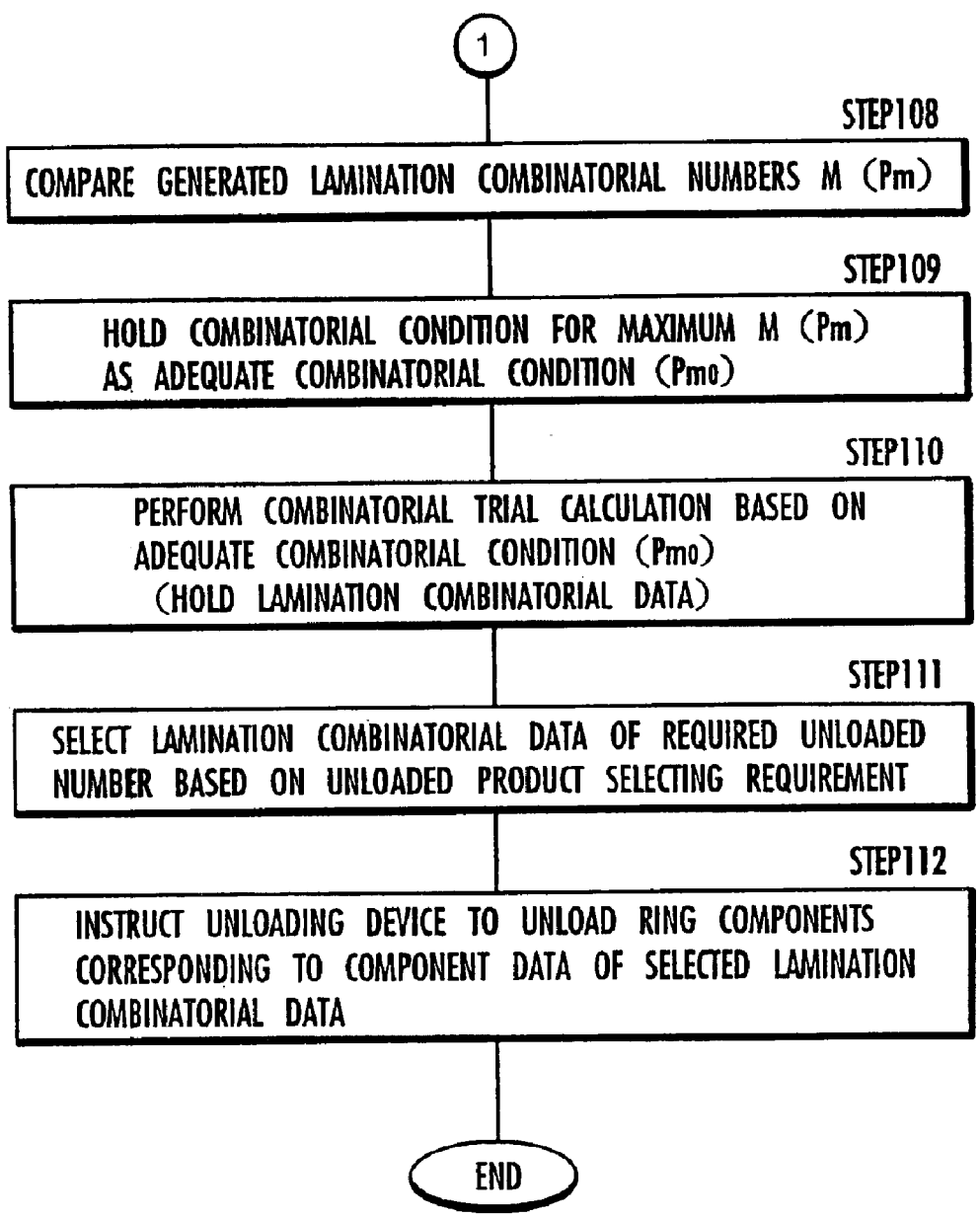

When there is a request to unload set ring components (4), the computer 13 executes an operation sequence shown in the flowcharts of FIGS. 18 and 19.

As shown in FIG. 18, the computer 13 carries out the same processing as in STEP1 and STEP2 (see FIG. 3) according to the first embodiment in STEP101 and STEP102 to read basic requirement items (the standard requirements of an inter-ring clearance $\Delta r$, a total clearance $\Sigma \Delta r$, and a first layer circumferential length difference $\Delta L1$), an unloaded product selecting requirement, etc. into the processing means 16, and organizes the component data stored by the component data managing means 15.

Then, the computer 13 reads a plurality of combinatorial conditions for combining component data of respective layers into the processing means 16 in STEP103. In the present embodiment, basically, combinatorial trial calculations are performed under combinatorial conditions comprising a trial calculation starting point selecting condition and an interlayer selecting condition, as with the first embodiment. In the present embodiment, however, the interlayer selecting condition is a fixed condition determined to select those of component data of a selected ith layer (i=1, 2, ..., N−1) whose inter-ring clearance $\Delta r$ satisfies the standard requirement (A−α≦$\Delta r$≦A+α). In the present embodiment, the trial calculation starting point selecting condition is a combinatorial condition variably set according to trial calculation starting point circumferential length parameters as with the first embodiment. In STEP103, the computer 13 reads a plurality of (X) trial calculation starting point circumferential length parameters $P_1$–$P_X$ stored in the hard disk or the like as values that can be taken by trial calculation starting point circumferential length parameters prescribing the trial calculation starting point selecting condition, into the processing means 16.

Then, the processing means 16 performs the same processing (combinable number counting process) as in STEP4 (see FIGS. 3 and 5) according to the first embodiment in STEP104 to count the number (combinable number) of component data of adjacent layers (second through Nth layers) that can be combined with the component data of the first through (N−1)th layers.

Then, the processing means 16 selects one (Pm) of the trial calculation starting point circumferential length parameters read in STEP103 in STEP105. One combinatorial condition (hereinafter referred to as a combinatorial condition (Pm)) is now set which is determined by the selected trial calculation starting point circumferential length parameter Pm. While the processing means 16 may select the allowable trial calculation starting point circumferential length parameters in any sequence, it selects them in the order of the magnitudes of their values, for example.

The processing means 16 then effects a combinatorial trial calculation on the component data stored by the component data managing means 15 based on the combinatorial condition Pm that is determined from the selected trial calculation starting point circumferential length parameter Pm in STEP106.

Figure 20:
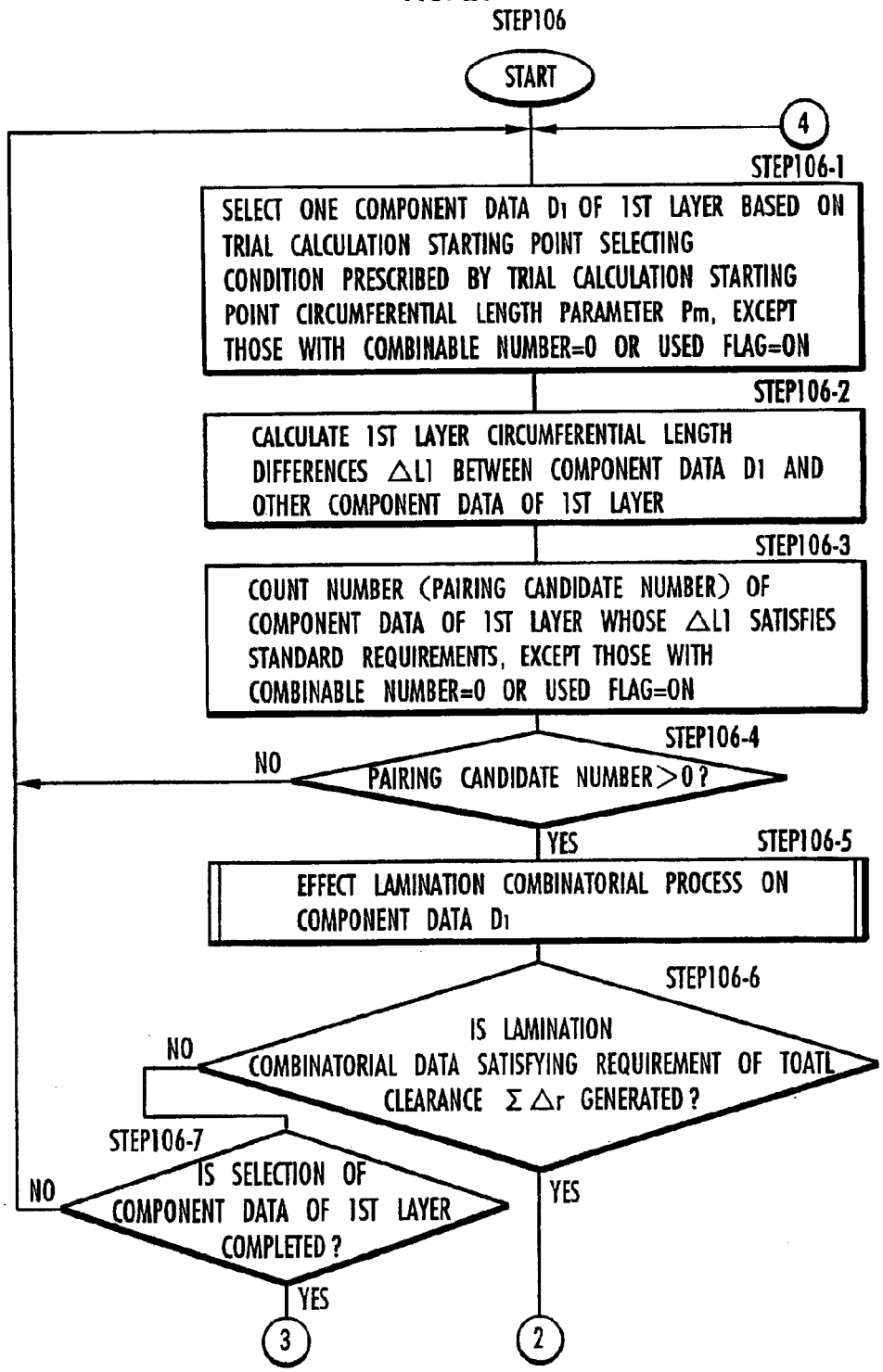
Figure 21:
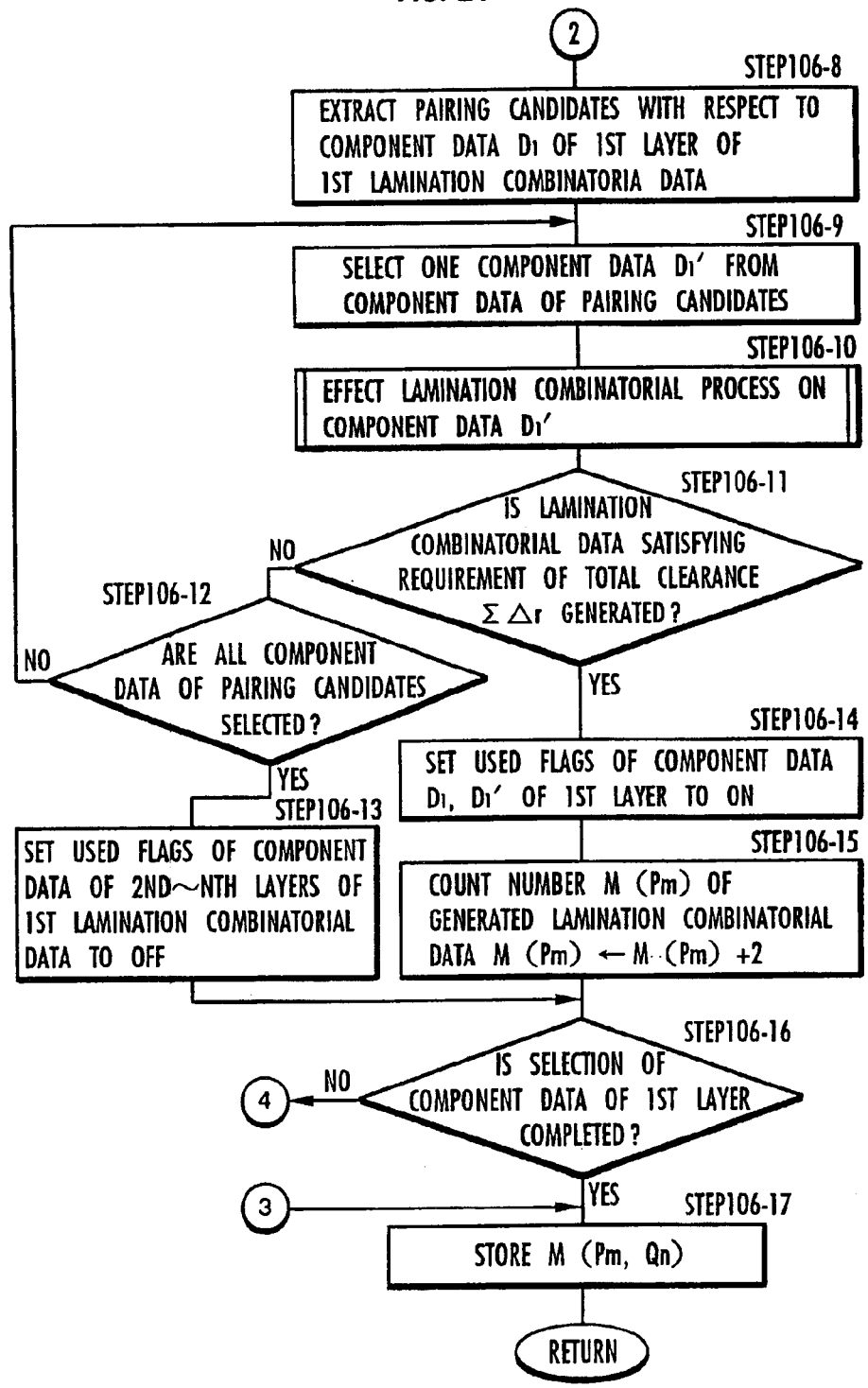

The combinatorial trial calculation is carried out according to flowcharts shown in FIGS. 20 and 21. Basic process of the combinatorial trial calculation is the same as the process of the combinatorial trial calculation (see FIGS. 6 and 7) according to the first embodiment except that only a portion of the lamination combinatorial process in STEP106-5 shown in FIG. 20 and a portion of the lamination combinatorial process STEP106-10 shown in FIG. 21 (which correspond respectively to STEP7-5 shown in FIG.

6 and STEP7-10 shown in FIG. 7) are different. Other processing details shown in FIGS. 20 and 21 (STEP106-1 through STEP106-4, STEP106-6 through STEP106-9, and STEP106-11 through STEP106-17) are identical to those according to the first embodiment. In the present embodiment, only the trial calculation starting point selecting condition is a variably set condition, and the number of generated lamination combinatorial data in STEP106-15 and STEP106-17 shown in FIG. 21 is represented by M (Pm).

Figure 22:
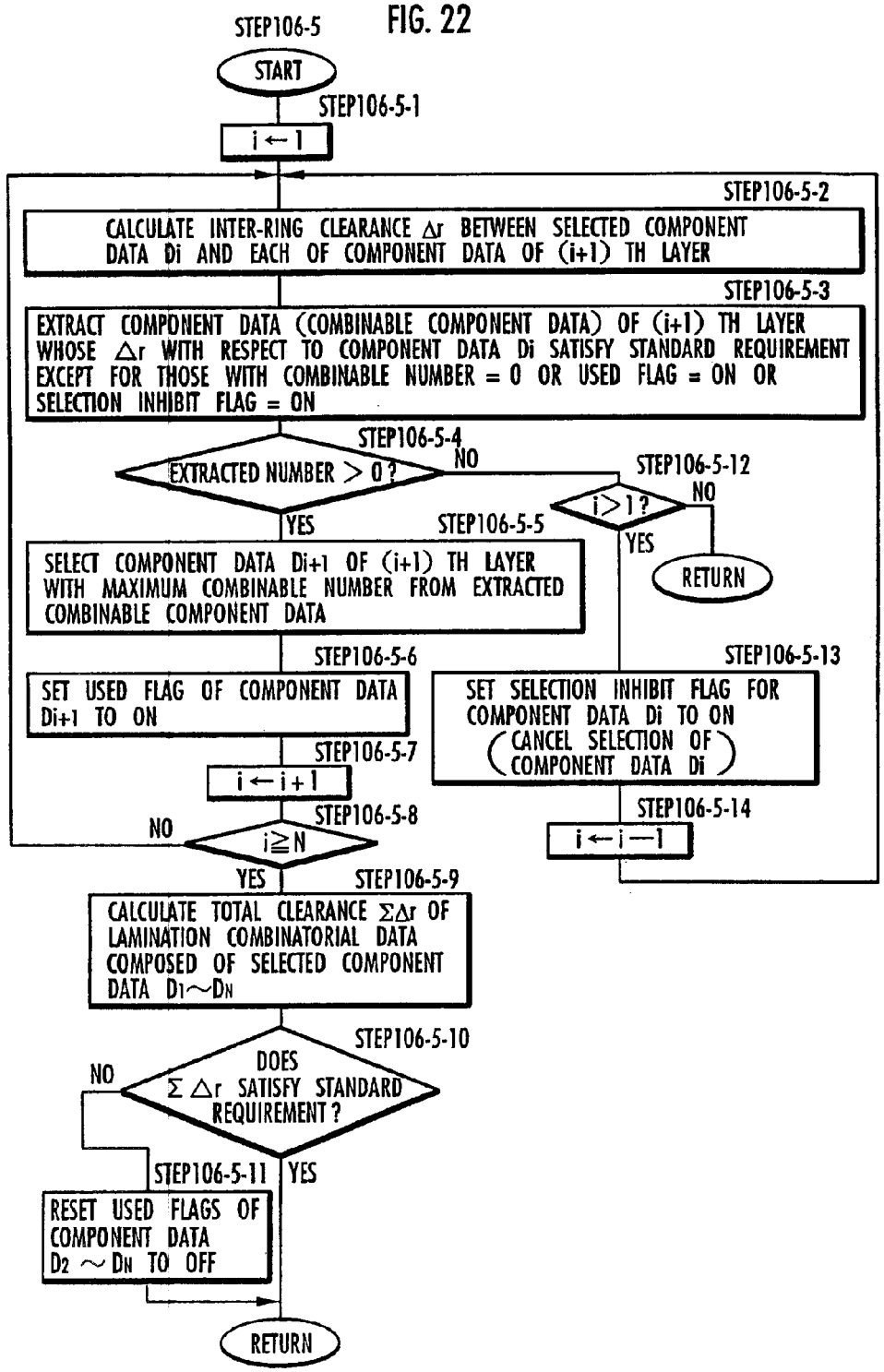

The lamination combinatorial process in STEP106-5 which is partly different from the lamination combinatorial process according to the first embodiment, i.e., the lamination combinatorial process on the component data $D_1$ of the first layer selected in STEP106-1 is carried out according to a flowchart shown in FIG. 22. Of STEP106-5-1 through STEP106-5-14 shown in FIG. 22, only STEP106-5-5 (corresponding to STEP7-5-5 shown in FIG. 8) differs from the lamination combinatorial process according to the first embodiment shown in FIG. 8. Specifically, in the present embodiment, after the processing means 16 extracts combinable component data of (i+1)th layer whose inter-ring clearances $\Delta r$ satisfy the standard requirement ($A-\alpha \leq \Delta r \leq A+\alpha$), which is the interlayer selecting condition in the present embodiment, with respect to the component data Di of the ith layer in STEP106-5-3, if the number of extracted of combinable component data is "1" in STEP106-5-4 (YES), then component data Di+1 with the greatest combinable number calculated in STEP104, of the extracted combinable component data, is selected as component data to be combined with the component data $D_1$ through Di of the first through ith layers in STEP106-5-5. If there are two or more component data with the greatest combinable number of the combinable component data of the (i+1)th layer, then the component data Di+1 whose inter-ring clearance $\Delta r$ with respect to the selected component data Di of the ith layer is closer to the central value A of the allowable range ($A-\alpha \leq \Delta r \leq A+\alpha$) is selected. If the number of combinable component data extracted in STEP106-5-3 is "1", then that extracted component data Di+1 is selected.

The lamination combinatorial process in STEP106-5 shown in FIG. 20 is the same as the lamination combinatorial process according to the first embodiment except the processing in STEP106-5-5. The lamination combinatorial process in STEP106-10 shown in FIG. 21, i.e., the lamination combinatorial process on component data $D_1'$ of the first layer selected in STEP106-9 (component data relative to the second lamination combinatorial data) is performed in exactly the same manner as the lamination combinatorial process in STEP106-5.

When the combinatorial trial calculation in STEP106 shown in FIG. 18 (the combinatorial trial calculation based on one combinatorial condition (Pm, Qn)) is thus carried out, the generated lamination combinatorial number M (Pm, Qn) corresponding to the combinatorial condition (Pm, Qn), i.e., the total number of lamination combinatorial data that can be generated based on the combinatorial condition (Pm), is determined.

Referring back to the flowchart of FIG. 18, after having performed the combinatorial trial calculation based on one kind of combinatorial condition (trial calculation starting point selecting condition) prescribed by the trial calculation starting point circumferential length parameter Pm which is set in STEP105, the processing means 16 decides whether all the trial calculation starting point circumferential length parameters $P_1-P_X$ read in STEP103 have been selected in STEP105 or not in STEP107. If there is an unselected trial calculation starting point circumferential length parameter, then the processing means 16 selects the unselected trial calculation starting point circumferential length parameter Pm in STEP105, and carries out the combinatorial trial calculation in STEP106 as described above based on a combinatorial condition (Pm) that is prescribed by the selected trial calculation starting point circumferential length parameter Pm.

The processing means 16 selects the trial calculation starting point circumferential length parameters Pm, one by one, in STEP105 by sequentially selecting the trial calculation starting point circumferential length parameters $P_1-P_X$ in the order of their magnitudes.

If the selection of the trial calculation starting point circumferential length parameters $P_1-P_X$ has been completed in STEP105 as confirmed in STEP107, then the processing means 16 carries out the same processing as in STEP10 through STEP14 (see FIG. 4) according to the first embodiment in STEP108 through STEP112. Specifically, a combinatorial condition (Pm) which maximizes the generated lamination combinatorial number M (Pm) is set as an adequate combinatorial condition (Pm0), and as many lamination combinatorial data as the required unloaded number are selected from lamination combinatorial data generated under the adequate combinatorial condition (Pm0). Set ring components (4) corresponding to the selected lamination combinatorial data are removed from the component storage facility 10 by the unloading device 12 that is instructed by the computer 13, supplied to the laminating device 14, and assembled into a laminated ring 3 by the laminating device 14.

In the present embodiment, while the interlayer selecting condition is a fixed condition, combinatorial trial calculations are carried out based on a plurality of combinatorial conditions (trial calculation starting point selecting conditions) determined by the plural (X) trial calculation starting point circumferential length parameters $P_1-P_X$ to obtain a combinatorial condition which maximizes the generated lamination combinatorial number M (Pm) is obtained as an adequate combinatorial condition (Pm0). In this manner, a combinatorial condition is found which is capable of assembling as many laminated rings 3 as possible from the ring components 4 stored by the component storage facility 10.

As many lamination combinatorial data as the required unloaded number are selected from lamination combinatorial data generated based on the adequate combinatorial condition (Pm0), and set ring components (4) corresponding to the selected lamination combinatorial data are actually unloaded from the component storage facility 10, supplied to the laminating device 14, and assembled into laminated rings 3. Therefore, even if the required unloaded number (the number of required laminated rings 3) is large, as many set ring components (4) as the required unloaded number can be supplied to the laminating device 14 to assemble laminated rings 3.

Consequently, as with the first embodiment and other embodiments, the mass-productivity of laminated rings 3 can be increased, and ring components 4 manufactured and loaded into the component storage facility 10 can be used efficiently (with a good yield) to assemble laminated rings 3.

In the present embodiment, if there are a plurality of extracted combinable component data when component data of the second through (N−1)th layers are selected in the lamination combinatorial process (STEP106-5, STEP106-10), component data with the maximum combinable number determined in STEP104 is selected. Therefore, it is possible to generate an increased number of lamination combinatorial data, and hence to assemble an increased number of laminated rings 3 from the ring components 4 stored by the component storage facility 10.

In the present embodiment, the process of counting a combinable number prior to a combinatorial trial calculation (STEP104 shown in FIG. 18) and the process of generating lamination combinatorial data to be paired (STEP106-9, STEP106-10 shown in FIG. 21) are performed in the same manner as with the first embodiment and other embodiments. Therefore, the present embodiment offers the same advantages as those of the first embodiment with respect to these processes. In the lamination combinatorial process (STEP106-5 and STEP106-10 in FIGS. 20 and 21) for combinatorial trial calculations, if there is no component data of the (i+1)th layer that can be combined with the selected component data Di of the ith layer, then the layer is traced back to select component data again (STEP106-5-13 and STEP106-5-14 shown in FIG. 22). Therefore, the present embodiment offers the same advantages as those of the first embodiment with respect to this process.

A seventh embodiment of the present invention will be described below with reference to FIG. 23. The apparatus according to the seventh embodiment is identical to the apparatus according to the sixth embodiment, but only a portion of the processing carried out by the processing means 16 of the computer 13 according to the seventh embodiment is different from that according to the first embodiment. Therefore, those structural details and processing details according to the seventh embodiment which are identical to those of the sixth embodiment are denoted by identical reference characters in identical figures, and will not be described in detail below.

In the present embodiment, a portion of the lamination combinatorial process (STEP106-5 shown in FIG. 20 and STEP106-10 shown in FIG. 21) carried out in a combinatorial trial calculation that is performed under each combinatorial condition by the processing means 16 of the computer 13 is different from the lamination combinatorial process according to the sixth embodiment.

Figure 23:
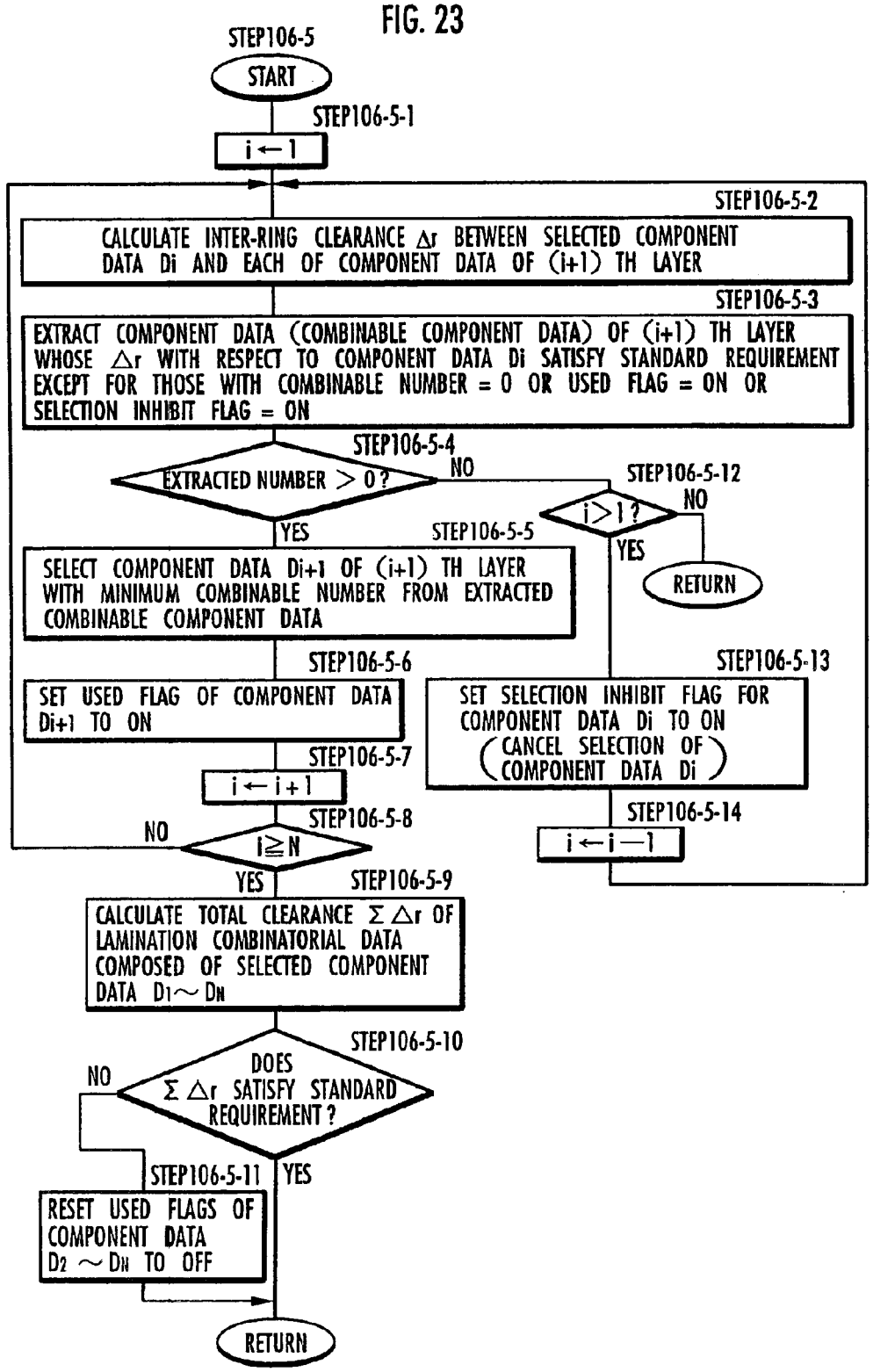
FIG. 23 is a flowchart of an operation sequence according to a seventh embodiment of the present invention.

FIG. 23 is a flowchart of details of the processing in STEP106-5 according to the present embodiment. In the present embodiment, only the processing in STEP106-5-5' corresponding to STEP106-5-5 according to the sixth embodiment is different from the first embodiment.

In the processing in STEP106-5-5' according to the present embodiment, the processing means 16 of the computer 13 selects one component data Di+1 whose combinable number calculated in STEP104 (see FIG. 18) is the smallest, as component data to be combined with the already selected component data $D_1$ through Di of the first through ith layers, from the combinable component data of the (i+1)th layer extracted in STEP106-5-3 (which satisfy the standard requirement of the inter-ring clearance $\Delta r$ as the interlayer selecting condition with respect to the selected component data Di of the first layer). At this time, if there are two or more component data with the smallest combinable number of the combinable component data of the (i+1)th layer, then the component data Di+1 whose inter-ring clearance $\Delta r$ with respect to the selected component data Di of the ith layer is closer to the central value A of the allowable range ($A-\alpha \leq \Delta r \leq A+\alpha$) is selected.

Other processing details than STEP106-5-5' are identical to those according to the sixth embodiment. The processing in STEP106-5 according to the present embodiment is also carried out in STEP106-10 shown in FIG. 19.

In the present embodiment, when lamination combinatorial data are to be generated, if there are a plurality of allowable component data of the (i+1)th layer that satisfy the inter-ring clearance $\Delta r$ with respect to the selected component data Di of the ith layer, component data whose combinable number calculated in STEP104 is smaller (except component data with the combinable number=0) is preferentially selected as an element of the lamination combinatorial data. Thus, the tendency of ring components 4 corresponding to such component data to remain unselected as an element of a laminated ring 3 in the component storage facility 10 is minimized. As a result, the circumferential length values of the ring components 4 in the component storage facility 10 can be of such a distribution as to be able to continuously obtain an increased number of laminated rings 3.

Industrial Applicability

As described above, the present invention is useful as an apparatus of assembling a laminated ring for use in a belt for a CVT (continuously variable transmission) on a production line or the like of the belt.

What is claimed is:

1. An apparatus for assembling a laminated ring of a plurality of laminated endless ring components, comprising:

component data managing means for storing component data including size data representative of at least respective circumferential length values of a plurality of ring components prepared for each of layers of said laminated ring;

combinatorial trial calculation means for variably setting a plurality of kinds of combinatorial conditions to assemble the ring components for all the layers of said laminated ring, and performing combinatorial trial calculations to combine the component data of the layers stored by said component data managing means based on each of the plurality of kinds of combinatorial conditions to generate lamination combinatorial data representing combined component data of all the layers matching the combinatorial conditions;

combinatorial condition determining means for evaluating the number of said lamination combinatorial data obtained by said combinatorial trial calculations under said plurality of kinds of combinatorial conditions and determining a combinatorial condition which maximizes said number as an adequate combinatorial condition; and ring component selecting means for selecting ring components of the respective layers to assemble said laminated ring from said lamination combinatorial data under said adequate combinatorial condition;

whereby said laminated ring can be assembled of the ring components selected by said ring component selecting means.

2. An apparatus according to claim 1, wherein said combinatorial trial calculation means comprises means for performing said combinatorial trial calculations under each of the combinatorial conditions of each of said kinds by performing a particular layer data selecting process of successively selecting a plurality of component data of a predetermined particular layer, one by one, based on the combinatorial conditions, an interlayer selecting process of selecting, sequentially from a layer adjacent to said particular layer, component data of other layers to be combined with the selected component data of the particular layer based on said combinatorial conditions each time the component data of the particular layer are selected, and a process of excluding the component data of the layers of the lamination combinatorial data from component data that can be selected in following cycles of the interlayer selecting process when the lamination combinatorial data are generated by said interlayer selecting process;

wherein said combinatorial conditions of each of said kinds include a trial calculation starting point selecting condition that prescribes a sequence in which to select component data of said particular layer in said particular layer data selecting process, and an interlayer selecting condition that prescribes which component data of a layer adjacent to a layer whose component data have been selected by said interlayer selecting process is to be selected; and wherein said combinatorial trial calculation means variably sets at least one of said trial calculation starting point selecting condition and said interlayer selecting condition to set said plurality of kinds of combinatorial conditions.

3. An apparatus according to claim 2, wherein said interlayer selecting condition includes a condition that prescribes the difference between circumferential length values of ring components of at least two layers which are adjacent to each other.

4. An apparatus according to claim 2, wherein said combinatorial trial calculation means variably sets said trial calculation starting point selecting condition depending on a frequency distribution of the size data of the component data of said particular layer held by said component data managing means.

5. An apparatus according to claim 4, wherein said trial calculation starting point selecting condition comprises a condition for selecting component data of the particular layer in a sequence from component data whose size data are closer to a predetermined value; and wherein said combinatorial trial calculation means sets a plurality of variable parameters each comprising said predetermined value prescribing a kind of said trial calculation starting point selecting condition, such that the number of said variable parameters which differ from each other is greater closer to size data whose frequency in said frequency distribution is large than to size data whose frequency in said frequency distribution is small.

6. An apparatus according to claim 2, wherein said combinatorial trial calculation means comprises means for variably setting said trial calculation starting point selecting condition and said interlayer selecting condition to set a plurality of kinds of combinatorial conditions which include sets of said trial calculation starting point selecting condition and said interlayer selecting condition that differ from each other, and means for repeating said combinatorial trail calculations under combinatorial conditions which comprise one kind of one of said trial calculation starting point selecting condition and said interlayer selecting condition and a plurality of kinds of the other of said trial calculation starting point selecting condition and said interlayer selecting condition, while changing the kind of said one of the selecting conditions; and wherein when carrying out said combinatorial trail calculations while changing the kind of said one of the selecting conditions, said combinatorial trial calculation means determines a kind of the other of the selecting conditions after the kind of said one of the selecting conditions is changed, based on data of the number of the lamination combinatorial data obtained by said combinatorial trial calculations under the combinatorial conditions which comprise one kind of one of the selecting conditions before it is changed and the plurality of kinds of the other of the selecting conditions.

7. An apparatus according to claim 6, wherein said trial calculation starting point selecting condition is a condition for selecting the component data of the particular layer in a sequence from the size data of the component data of the particular layer which are closer to a predetermined value, and said interlayer selecting condition is a condition for selecting component data of one layer selected in said interlayer selecting process, whose size data differs from the size data of the component data of a layer adjacent to said one layer by a value which falls within a predetermined standard range and is closer to a predetermined value, from the component data of said adjacent layer; and wherein said combinatorial trial calculation means sets said predetermined value relative to said trial calculation starting point selecting condition and said predetermined value relative to said interlayer selecting condition as variable parameters prescribing types of the respective selecting conditions, and variably sets said variable parameter relative to said other selecting condition after the kind of said one selecting condition is changed within a predetermined range having, at its center, the value of said variable parameter relative to said other selecting condition corresponding to a combinatorial condition which maximizes the number of the lamination combinatorial data obtained by said combinatorial trial calculations before the kind of said one selecting condition is changed.

8. An apparatus according to claim 6, wherein said combinatorial trial calculation means sets the kind of said one selecting condition depending on resultant data of the number of the lamination combinatorial data obtained when said combinatorial trial calculations have been carried out in the past under the plurality of kinds of combinatorial conditions.

9. An apparatus according to claim 8, wherein said trial calculation starting point selecting condition is a condition for selecting the component data of the particular layer in a sequence from the size data of the component data of the particular layer which are closer to a predetermined value; and wherein said combinatorial trial calculation means sets said predetermined value as a variable parameter prescribing a kind of said trial calculation starting point selecting condition, and variably sets said variable parameter within a predetermined range having, at its center, a value corresponding to the kind of said trial calculation starting point selecting condition which maximizes the number of the lamination combinatorial data in said resultant data.

10. An apparatus according to claim 1, wherein said combinatorial trial calculation means sets a kind of said combinatorial conditions depending on resultant data of the number of said lamination combinatorial data obtained when said combinatorial trial calculations have been carried out in the past under the plurality of kinds of combinatorial conditions.

11. An apparatus according to claim 2, wherein said trial calculation starting point selecting condition is a condition for selecting the component data of the particular layer in a sequence from the size data of the component data of the particular layer which are closer to a predetermined value, and said interlayer selecting condition is a condition for selecting component data of one layer selected in said interlayer selecting process, whose size data differs from the size data of the component data of a layer adjacent to said one layer by a value which falls within a predetermined standard range and is closer to a predetermined value, from the component data of said adjacent layer; and wherein said combinatorial trial calculation means sets said predetermined value relative to said trial calculation starting point selecting condition and said predetermined value relative to said interlayer selecting condition as variable parameters prescribing types of the respective selecting conditions, and variably sets said variable parameters in predetermined ranges having, at their centers, values corresponding to the respective kinds of said trial calculation starting point selecting condition and said interlayer selecting condition which maximize the number of the lamination combinatorial data in resultant data of the number of the lamination combinatorial data obtained when said combinatorial trial calculations have been carried out in the past under the plurality of kinds of combinatorial conditions.

12. An apparatus according to claim 2, wherein when component data of a layer adjacent to a layer selected in said interlayer selecting process do not match said interlayer selecting condition, said combinatorial trial calculation means regards component data of said one layer as component data not to be selected, and resumes said interlayer selecting process from a layer preceding said one layer.

13. An apparatus according to claim 12, wherein when said combinatorial trial calculation means resumes said interlayer selecting process from the layer preceding said one layer, said combinatorial trial calculation means temporarily changes the interlayer selecting condition for selecting one component data of a layer adjacent to the preceding layer to a predetermined condition, and selects one component data of the layer adjacent to the preceding layer based on the changed interlayer selecting condition.

14. An apparatus according to claim 2, wherein said laminated ring is used as a pair of laminated rings with the component data of ring components of at least said particular layer satisfying a predetermined requirement, and wherein said combinatorial trial calculation means has means for confirming component data which satisfy said predetermined requirement with respect to the component data of said particular layer before said combinatorial trial calculations are performed, said combinatorial trial calculation means performs combinatorial trial calculations on only other component data which satisfy said predetermined requirement of the component data of said particular layer, and, when said lamination combinatorial data are obtained by said combinatorial trial calculations, then performs said combinatorial trial calculations on the component data which satisfy said predetermined requirement with respect to the component data of said particular layer included in said lamination combinatorial data.

15. An apparatus according to claim 1, further comprising:

preprocessing means for recognizing, in advance, component data of said component data held by said component data managing means, which cannot be an element of said lamination combinatorial data under said combinatorial conditions, before said combinatorial trial calculations start being performed by said combinatorial trial calculation means;

wherein said combinatorial trial calculation means performs said combinatorial trial calculations while excluding the component data recognized not as an element of said lamination combinatorial data by said preprocessing means from component data which can be combined.

16. An apparatus according to claim 2, further comprising:

preprocessing means for counting the number of component data which can be selected based on said interlayer selecting condition, of the component data of a layer adjacent to each layer except a layer to be selected finally in said interlayer selecting process, of said component data held by said component data managing means;

wherein said combinatorial trial calculation means performs said combinatorial trial calculations while excluding the component data whose combinable number counted by said preprocessing means is zero from component data which can be combined.

17. An apparatus according to claim 16, wherein when there are a plurality of component data matching said interlayer selecting condition of the component data adjacent to one layer selected in said interlayer selecting process, said combinatorial trial calculation means select component data whose combinable number counted by said preprocessing means is largest as an element of said lamination combinatorial data from said plurality of component data matching said interlayer selecting condition.

18. An apparatus according to claim 16, wherein when there are a plurality of component data matching said interlayer selecting condition of the component data adjacent to one layer selected in said interlayer selecting process, said combinatorial trial calculation means selects component data whose combinable number counted by said preprocessing means is smallest as an element of said lamination combinatorial data from said plurality of component data matching said interlayer selecting condition.

19. An apparatus according to claim 1, wherein said ring component selecting means selects a predetermined required number of lamination combinatorial data from said lamination combinatorial data corresponding to said adequate combinatorial condition according to a predetermined priority sequence requirement for selecting lamination combinatorial data corresponding to said laminated ring to be actually assembled, and selects ring components of respective layers corresponding to component data included in the selected lamination combinatorial data as ring components to actually assemble said laminated ring.

* * * * *